US009904043B2

(12) United States Patent
Shimomura et al.

(10) Patent No.: US 9,904,043 B2
(45) Date of Patent: Feb. 27, 2018

(54) ZOOM LENS AND IMAGE PICKUP APPARATUS INCLUDING THE SAME

(71) Applicant: CANON KABUSHIKI KAISHA, Tokyo (JP)

(72) Inventors: Kazuya Shimomura, Utsunomiya (JP); Tomoyuki Nakamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/297,566

(22) Filed: Oct. 19, 2016

(65) Prior Publication Data
US 2017/0108677 A1    Apr. 20, 2017

(30) Foreign Application Priority Data

Oct. 20, 2015 (JP) .................. 2015-206172
Mar. 30, 2016 (JP) .................. 2016-067561

(51) Int. Cl.
*G02B 15/14* (2006.01)
*G02B 9/60* (2006.01)
(Continued)

(52) U.S. Cl.
CPC .......... *G02B 15/173* (2013.01); *G02B 15/20* (2013.01); *G02B 5/005* (2013.01); *G02B 9/60* (2013.01);
(Continued)

(58) Field of Classification Search
CPC .. G02B 13/0045; G02B 27/0025; G02B 9/60; G02B 13/18; G02B 15/20; G02B 13/009;
(Continued)

(56) References Cited

U.S. PATENT DOCUMENTS 9,264,638 B2   2/2016  Nakamura et al.
9,268,120 B2   2/2016  Shimomura et al.
(Continued)

FOREIGN PATENT DOCUMENTS

JP    H06-242378 A    9/1994
JP    H07-248449 A    9/1995
(Continued)

OTHER PUBLICATIONS

Partial European Search Report for corresponding European Application No. 16002240.6 dated Feb. 21, 2017.
(Continued)

*Primary Examiner* — Evelyn A Lester
(74) *Attorney, Agent, or Firm* — Carter, Deluca, Farrell & Schmidt, LLP

(57) ABSTRACT

A zoom lens includes, in order from object side: a positive first unit not moving for zooming; a second unit moving during zooming; a positive third unit; a positive fourth unit; and a rear unit including at least one unit, the second unit including one or more lens sub-units and having a negative refractive power as a whole, the fourth unit moving during zooming, the zoom lens including a stop between the second and third units or between the third and fourth units. Lateral magnifications of the second unit at a wide angle end and a telephoto end when beam enters from infinity, focal lengths at the wide angle end and the telephoto end, a focal length of the first unit, and a focal length of the second unit at the wide angle end are appropriately set.

19 Claims, 39 Drawing Sheets

(51) Int. Cl.
    *G02B 13/18*         (2006.01)
    *G02B 15/173*       (2006.01)
    *G02B 15/20*         (2006.01)
    *G02B 13/00*         (2006.01)
    *G02B 5/00*          (2006.01)
    *G02B 27/00*         (2006.01)
    *G02B 15/16*         (2006.01)

(52) U.S. Cl.
    CPC ........ *G02B 13/009* (2013.01); *G02B 13/0015* (2013.01); *G02B 13/0045* (2013.01); *G02B 13/18* (2013.01); *G02B 15/16* (2013.01); *G02B 27/0025* (2013.01)

(58) Field of Classification Search
    CPC .... G02B 15/16; G02B 5/005; G02B 13/0015; G02B 15/173
    USPC ....... 359/676, 683–687, 713, 714, 740, 755, 359/756, 764
    See application file for complete search history.

(56) References Cited

U.S. PATENT DOCUMENTS

| | | | |
|---|---|---|---|
| 9,310,592 | B2 | 4/2016 | Wakazono et al. |
| 9,329,372 | B2 | 5/2016 | Shimomura |
| 9,400,374 | B2 | 7/2016 | Yoshimi et al. |
| 2010/0053765 | A1 | 3/2010 | Eguchi |
| 2010/0271601 | A1 | 10/2010 | Amano |
| 2012/0320251 | A1* | 12/2012 | Saito .................... G02B 15/173 359/683 |
| 2013/0120640 | A1* | 5/2013 | Taki ...................... G02B 15/14 359/684 |
| 2013/0250435 | A1 | 9/2013 | Hagiwara |
| 2014/0078598 | A1 | 3/2014 | Akiyama et al. |
| 2014/0118607 | A1* | 5/2014 | Takemoto ............ G02B 15/177 359/684 |
| 2014/0118840 | A1 | 5/2014 | Enomoto |
| 2014/0320977 | A1 | 10/2014 | Yakita |
| 2015/0097995 | A1* | 4/2015 | Wada .................. G02B 15/173 359/683 |
| 2015/0131164 | A1 | 5/2015 | Wakazono et al. |
| 2015/0131165 | A1 | 5/2015 | Nakamura et al. |
| 2016/0161725 | A1 | 6/2016 | Shimomura |

FOREIGN PATENT DOCUMENTS

| | | |
|---|---|---|
| JP | 2007-219473 A | 8/2007 |
| JP | 2009-128491 A | 6/2009 |
| JP | 2011-081062 A | 4/2011 |
| JP | 2014-063026 A | 4/2014 |

OTHER PUBLICATIONS

European Search Report dated Jun. 8, 2017 in corresponding European Patent Application No. 16002240.6, 22 pages.

\* cited by examiner

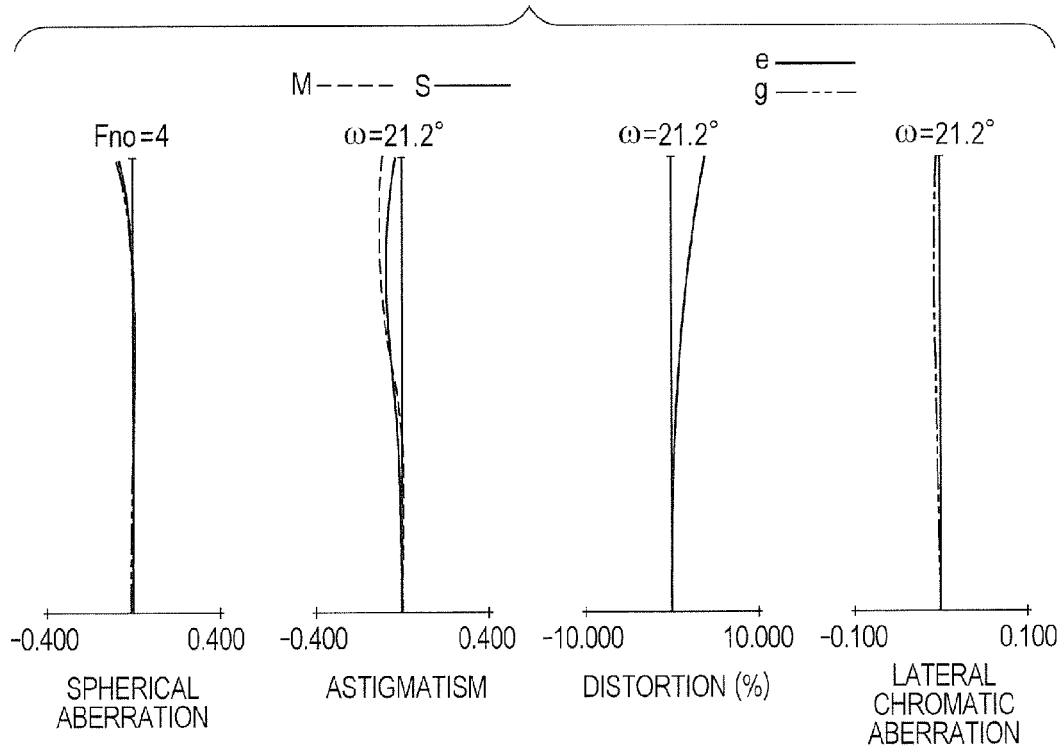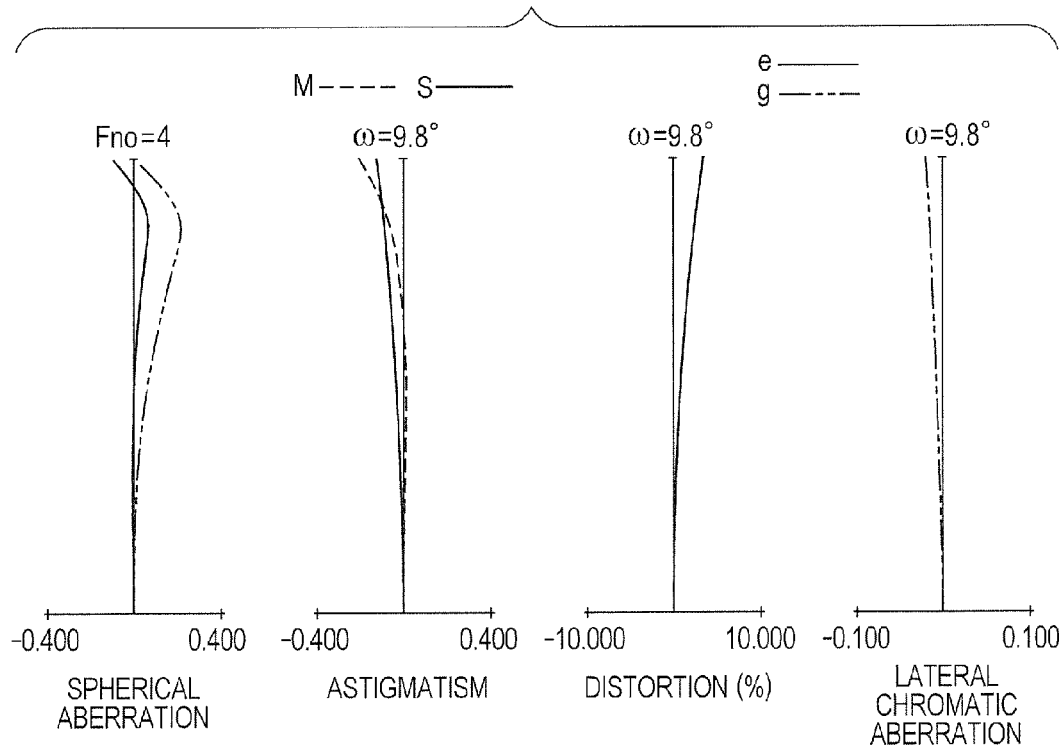

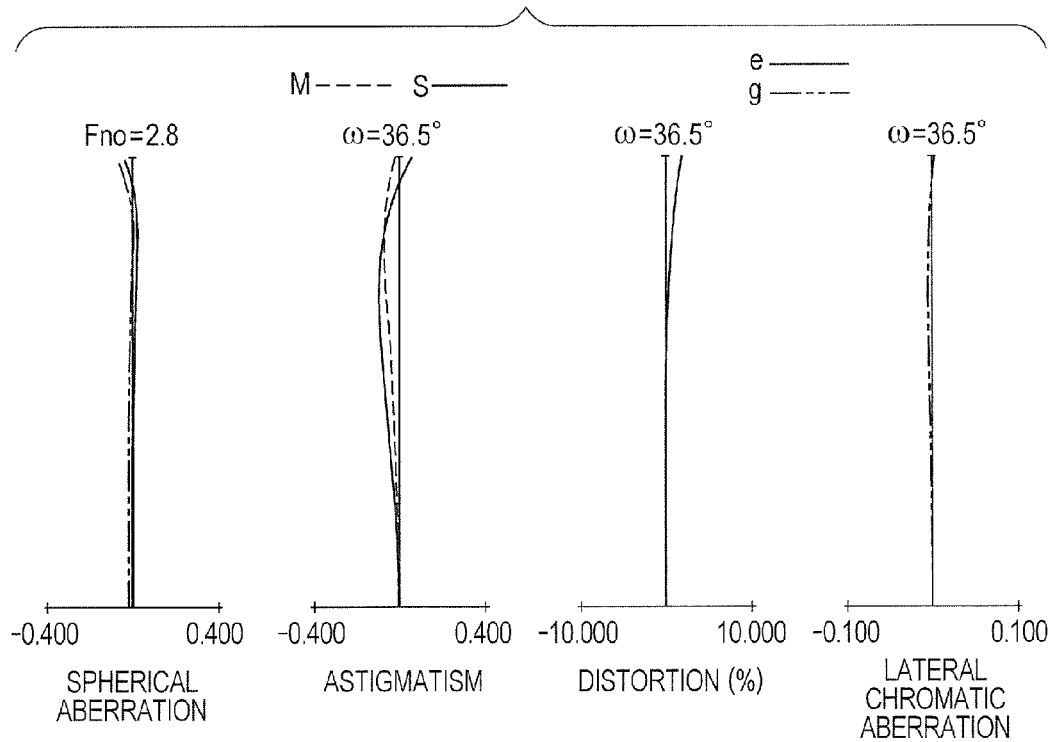
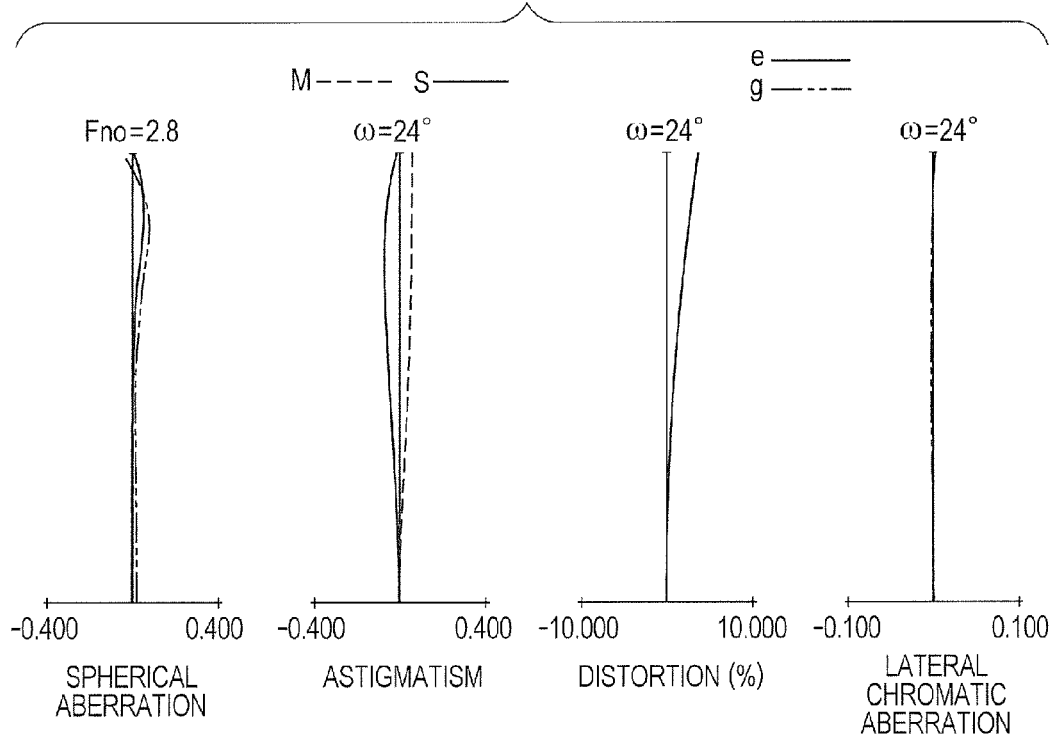

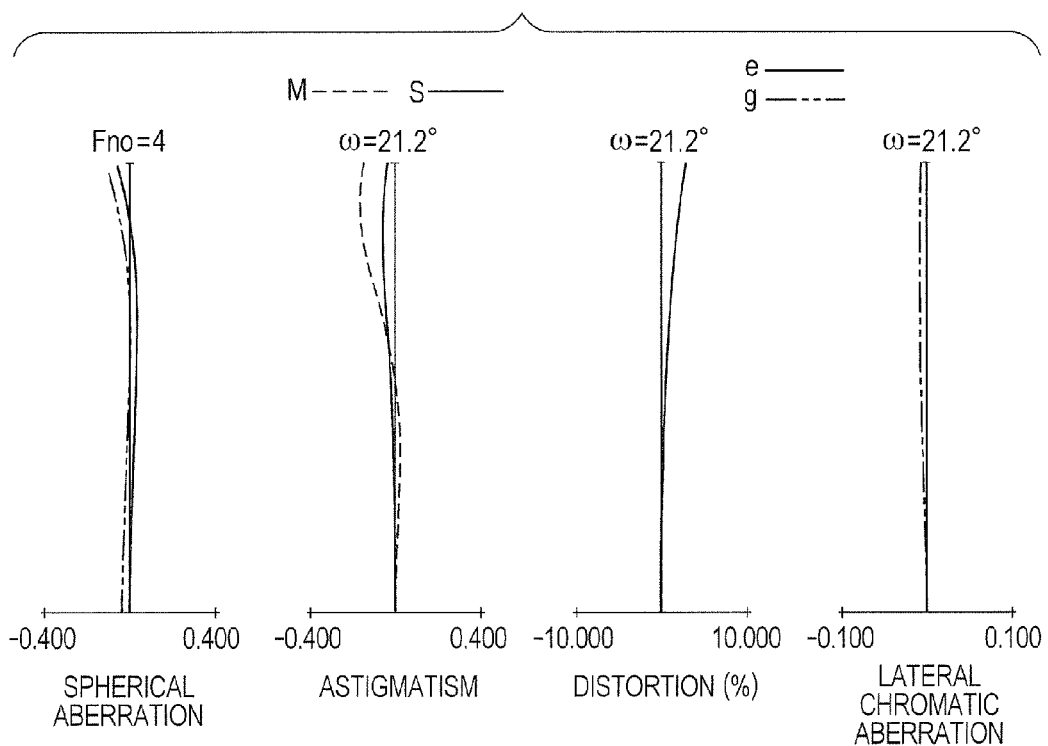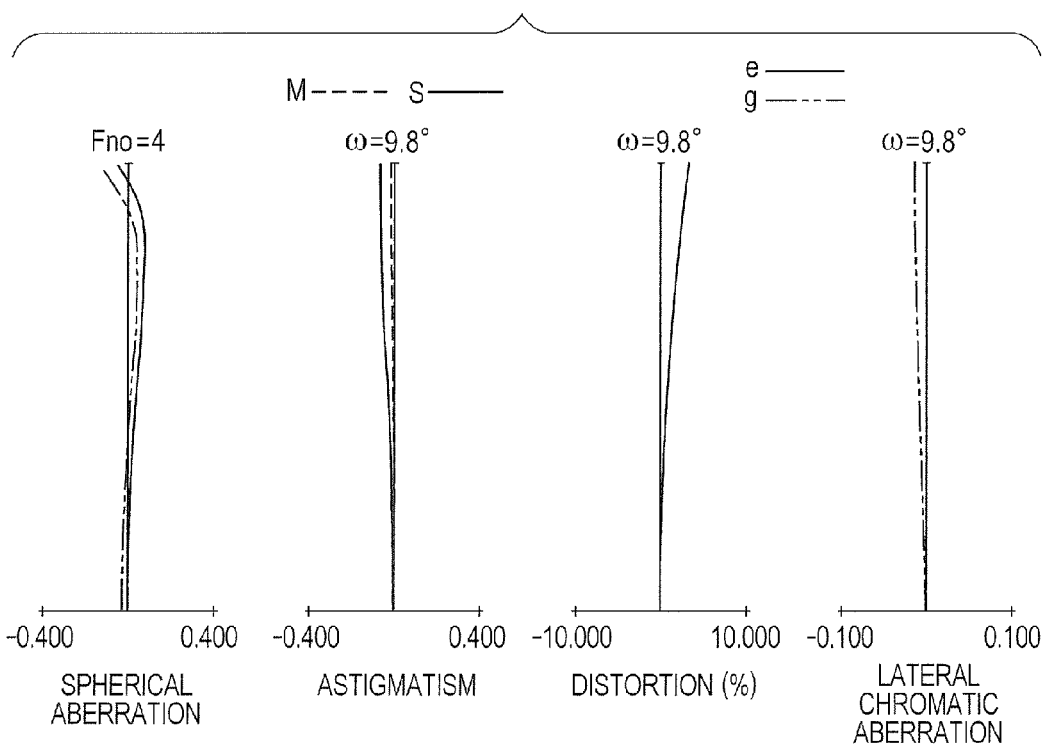

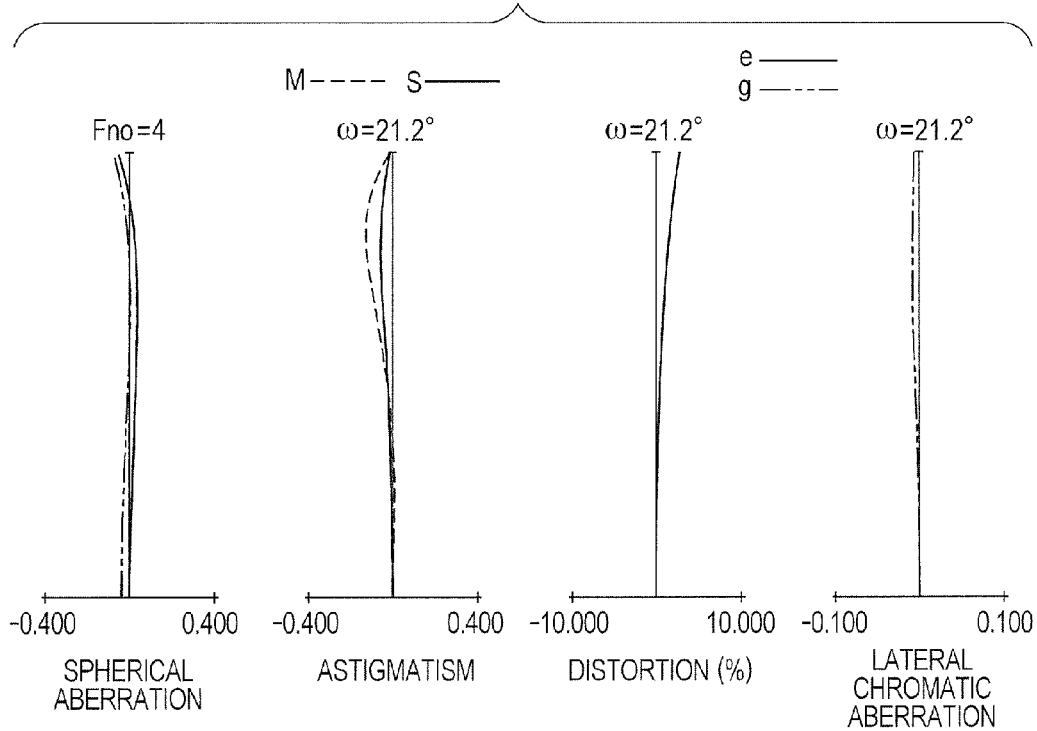
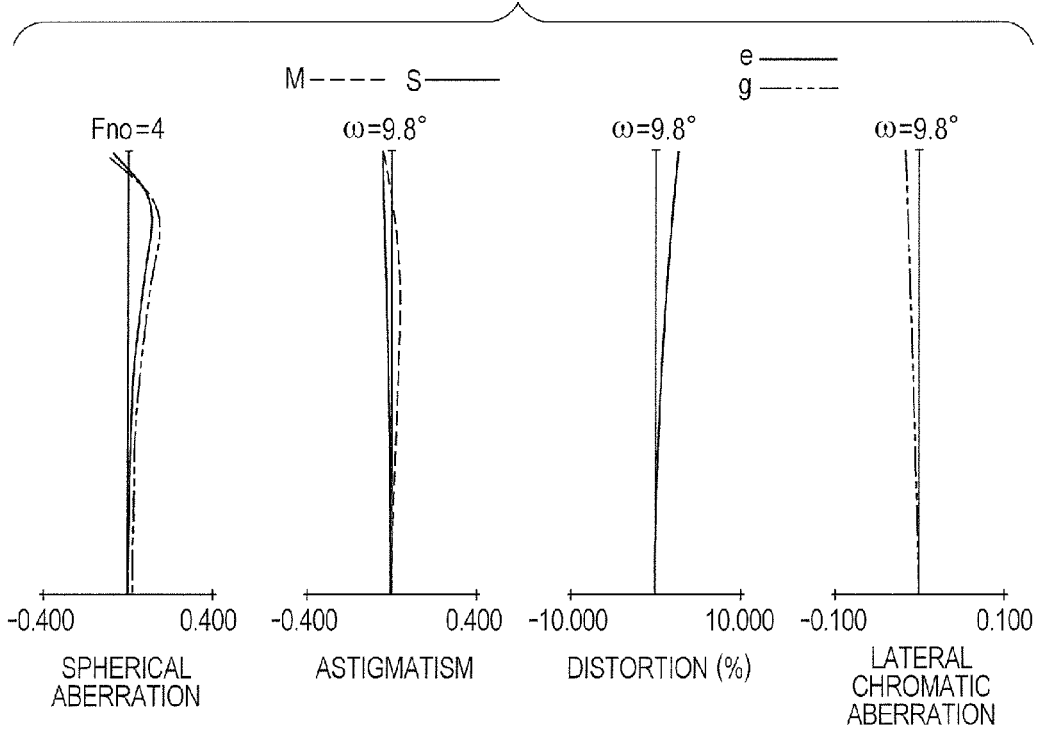

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, and more particularly, to a zoom lens suited for use in a broadcasting television camera, a cinema camera, a video camera, a digital still camera, a monitoring camera, and a silver-halide film camera.

Description of the Related Art

In recent years, a zoom lens having a wide angle of view, a high zoom ratio, and high optical performance is desired for use in an image pickup apparatus, e.g., a television camera, a cinema camera, a film camera, a silver-halide film camera, a digital camera, or a video camera. In particular, an image pickup device, e.g., a charge coupled device (CCD) or a complementary metal oxide semiconductor (CMOS), which is used in a television or cinema camera serving as a professional moving image pickup system, has a substantially uniform resolution over the entire image pickup range. Therefore, a zoom lens using the image pickup device is required to have a substantially uniform resolution from the center to the periphery of the screen. There are also needs for reductions in size and weight for an image pickup mode that places emphasis on mobility and operability. Meanwhile, an exchangeable lens for use in a television or cinema camera needs to secure a satisfactorily long back focus.

As a zoom lens having a wide angle of view and a high zoom ratio, there is known a positive lead type zoom lens in which a first lens unit having a positive refractive power and a second lens unit having a negative refractive power for zooming are arranged in order from an object side. For example, in Japanese Patent Application Laid-Open No. H06-242378, there is described a zoom lens having a zooming ratio of about 8 and an angle of view of about 87 degrees at a wide angle end, and including, on the image side of a second lens unit, a third lens unit for correcting an image plane variation accompanying zooming, and a stop configured not to move during zooming. Moreover, in Japanese Patent Application Laid-Open No. 2014-63026, there is described a zoom lens having a zooming ratio of about 11 and an angle of view of about 76 degrees at a wide angle end, and including, between a second lens unit and a lens unit on an image side of the second lens unit, a stop configured to move during zooming.

As a zoom lens having a wide angle of view and a high zooming ratio, there is known a positive lead type five-unit zoom lens including five lens units, of which a lens unit having a positive refractive power is arranged closest to an object side, and in which the following three movable lens units: a second lens unit having a negative refractive power, a third lens unit having a positive refractive power, and a fourth lens unit having a positive refractive power are configured to vary magnification and to correct an image plane variation accompanying the zooming (Japanese Patent Application Laid-Open No. H07-248449 and Japanese Patent Application Laid-Open No. 2009-128491).

In Japanese Patent Application Laid-Open No. H07-248449, there is disclosed a zoom lens having a zooming ratio of about 17× and a photographing angle of view of about 70 degrees at a wide angle end. In Japanese Patent Application Laid-Open No. 2009-128491, there is disclosed a zoom lens having a zooming ratio of about 54× and an angle of view of about 60 degrees at a wide angle end.

The positive lead type zoom lens having the above-mentioned structure is relatively easy to realize a wide angle of view, but in order to realize both high optical performance and downsizing, it is important to appropriately set refractive power arrangement of the lenses. In particular, an off axial ray passes through the first lens unit, which is closest to the object side, at a position farthest from the optical axis. Therefore, in order to realize both the optical performance and the downsizing, it is important to appropriately set a position of the stop in the optical system, shares of zooming among lens units configured to move during zooming, and a refractive power and a configuration of the first lens unit.

In the zoom lens described in Japanese Patent Application Laid-Open No. H06-242378, the stop is arranged on the image side of the second and third lens units, which are responsible for zooming. Therefore, the stop is away from the first lens unit, resulting in increases in lens diameter and number of lenses of the first lens unit. Moreover, in the zoom lens described in Japanese Patent Application Laid-Open No. 2014-63026, the stop, which is configured to move during zooming, is arranged between the second lens unit and the third lens unit in a manner that is advantageous in downsizing the first lens unit. However, the refractive power of the first lens unit is small, and a paraxial arrangement appropriate for realizing an even wider angle of view and downsizing is not obtained.

The positive lead type zoom lens disclosed in each of Japanese Patent Application Laid-Open No. H07-248449 and Japanese Patent Application Laid-Open No. 2009-128491 is relatively easy to realize a wide angle of view and a high zooming ratio, but in order to realize both a wide angle of view and downsizing, it is important to appropriately set refractive power arrangement of the lenses. In particular, an off axial ray passes through the first lens unit, which is closest to the object side, at a position farthest from the optical axis, and hence the first lens unit tends to become larger than other lens units. Therefore, it is important to appropriately set refractive powers of the first lens unit and the second lens unit. Moreover, appropriate setting of refractive powers and movement loci of the lens units configured to move during zooming may bring the off axial ray closer to the optical axis on the wide angle side of the first lens unit, and reduce an aberration variation during zooming, with the result that both the optical performance and the downsizing may be realized. In the zoom lens disclosed in each of Japanese Patent Application Laid-Open No. H07-248449 and Japanese Patent Application Laid-Open No. 2009-128491, of the second to fourth lens units, which are responsible for zooming, the second lens unit is configured to move monotonously from the object side to the image side, and the third and fourth lens units are configured to move substantially monotonously from the image side to the object side. The third lens unit and the fourth lens unit have relatively close movement loci, and hence are suitable for increasing the zooming ratio. However, the refractive powers of the respective lens units tend to become larger, and a manufacturing error tends to affect the optical performance.

SUMMARY OF THE INVENTION

It is an object of the present invention to provide, by appropriately setting a position of a stop and refractive powers of respective lens units, a zoom lens having a wide angle of view, a high zoom ratio, a small size, a light weight, and high optical performance over the entire zoom range, and securing a sufficiently long back focus. Specifically, it is an object of the present invention to provide a zoom lens having an angle of view of from about 70 degrees to about 115 degrees at a wide angle end, an angle of view of from about 8 degrees to about 60 degrees at a telephoto end, a zooming ratio of from about 2.5 to about 10, the small size, the light weight, and the high optical performance.

In order to achieve the object described above, according to one embodiment of the present invention, there is provided a zoom lens, including, in order from an object side to an image side: a first lens unit having a positive refractive power; a second lens unit; a third lens unit having a positive refractive power; a fourth lens unit having a positive refractive power; and a rear lens unit including at least one lens unit, the second lens unit including one or more lens sub-units, and having a negative refractive power as a whole, the first lens unit that does not move for zooming, the second lens unit that moves during zooming, the fourth lens unit that moves during zooming, the zoom lens including a stop between the second lens unit and the third lens unit or between the third lens unit and the fourth lens unit, the zoom lens satisfying the following expressions:

$$0.50 < (ft \times \beta 2w^2)/(fw \times \beta 2t^2) < 1.40$$

$$-2.45 < f1/f2 < -0.50$$

where $\beta 2w$ and $\beta 2t$ respectively represent lateral magnifications of the second lens unit at a wide angle end and a telephoto end, when a light beam enters from infinity, fw and ft respectively represent focal lengths of the zoom lens at the wide angle end and the telephoto end, f1 represents a focal length of the first lens unit, and f2 represents a focal length of the second lens unit at the wide angle end.

According to another embodiment of the present invention, there is provided a zoom lens, including, in order from an object side to an image side: a first lens unit having a positive refractive power that does not move for zooming; a second lens unit having a negative refractive power that moves during zooming; a third lens unit having a positive refractive power that moves during zooming; a fourth lens unit having a positive refractive power that moves during zooming; and a fifth lens unit, in which an interval between each pair of all of the first lens unit, the second lens unit, the third lens unit, the fourth lens unit, and the fifth lens unit is changed during zooming, the third lens unit that moves during zooming, along a locus having a zoom position at which a distance between a surface closest to the image side of the first lens unit and a surface closest to the object side of the third lens unit on an optical axis is longer than that at a wide angle end, the zoom lens satisfying the following conditions:

$$1.0 < Lw/Lt < 10.0$$

$$1.0 < Dw/Dt < 100.0$$

$$-5.0 < f1/f2 < -0.5$$

where Lw and Lt respectively represent distances between the surface closest to the image side of the first lens unit and a surface closest to the object side of the fourth lens unit on the optical axis at the wide angle end and a telephoto end, Dw and Dt respectively represent distances between a surface closest to the image side of the third lens unit and the surface closest to the object side of the fourth lens unit on the optical axis at the wide angle end and the telephoto end, and f1 and f2 respectively represent focal lengths of the first lens unit and the second lens unit.

Through appropriate setting of the position of the stop and the refractive powers of the respective lens units, there can be obtained the zoom lens having the wide angle of view, the high zoom ratio, the small size, the light weight, and the high optical performance over the entire zoom range, and securing the sufficiently long back focus, and an image pickup apparatus including the zoom lens.

Further features of the present invention will become apparent from the following description of exemplary embodiments with reference to the attached drawings.

BRIEF DESCRIPTION OF THE DRAWINGS

FIG. 2B is an aberration diagram in the state in which focus is at infinity at an intermediate zoom position according to Numerical Embodiment 1.

FIG. 2C is an aberration diagram in the state in which focus is at infinity at a telephoto end according to Numerical Embodiment 1.

FIG. 6B is an aberration diagram in the state in which focus is at infinity at an intermediate zoom position according to Numerical Embodiment 3.

FIG. 6C is an aberration diagram in the state in which focus is at infinity at a telephoto end according to Numerical Embodiment 3.

FIG. 14B is an aberration diagram in the state in which focus is at infinity at an intermediate zoom position according to Numerical Embodiment 7.

FIG. 14C is an aberration diagram in the state in which focus is at infinity at a telephoto end according to Numerical Embodiment 7.

FIG. 16B is an aberration diagram in the state in which focus is at infinity at an intermediate zoom position according to Numerical Embodiment 8.

FIG. 16C is an aberration diagram in the state in which focus is at infinity at a telephoto end according to Numerical Embodiment 8.

DESCRIPTION OF THE EMBODIMENTS

Figure 1:
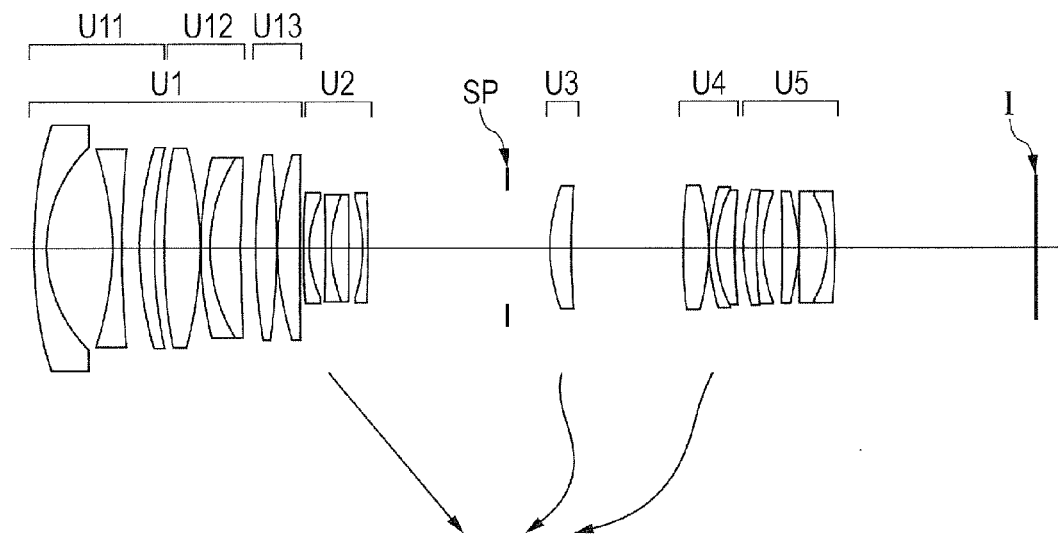
FIG. 1 is a lens cross-sectional view in a state in which focus is at infinity at a wide angle end according to Embodiment 1 (Numerical Embodiment 1) of the present invention.

Now, exemplary embodiments of the present invention are described in detail with reference to the attached drawings.

First, features of a zoom lens according to Embodiments 1 to 12 of the present invention are described along with conditional expressions. In the zoom lens according to the present invention, in order to attain a zoom lens having a wide angle of view, a high zoom ratio, a small size, a light weight, and high optical performance over the entire zoom range, and securing a sufficiently long back focus, shares of zooming among lens units configured to move during zooming, and a refractive power of a first lens unit are defined.

The zoom lens according to the present invention includes, in order from an object side to an image side: a first lens unit having a positive refractive power; a second lens unit; a third lens unit having a positive refractive power; a fourth lens unit having a positive refractive power; and a rear lens unit including at least one lens unit. The second lens unit includes one or more lens sub-units, and has a negative refractive power as a whole. The first lens unit is configured not to move for zooming, and the second lens unit is configured to move during zooming. At least the fourth lens unit of the third lens unit, the fourth lens unit, and the rear lens unit is configured to move during zooming. The zoom lens includes a stop between the second lens unit and the third lens unit or between the third lens unit and the fourth lens unit. Moreover, the rear lens unit includes three or more lenses, and when lateral magnifications of the second lens unit at a wide angle end and a telephoto end are represented by β2w and β2t, respectively, when a light flux enters from infinity, focal lengths of the zoom lens at the wide angle end and the telephoto end are represented by fw and ft, respectively, a focal length of the first lens unit is represented by f1, and a focal length of the second lens unit at the wide angle end is represented by f2, the following expressions are satisfied:

$$0.50 < (ft \times \beta 2w^2)/(fw \times \beta 2t^2) < 1.40 \quad (1)$$

$$-2.45 < f1/f2 < -0.50 \quad (2).$$

The zoom lens according to the present invention is a positive lead type zoom lens in which the first lens unit having the positive refractive power and the second lens unit for zooming, which has the negative refractive power, are arranged. The first lens unit having the positive refractive power is advantageous in downsizing the second lens unit, which is configured to move during zooming, and in suppressing a movement amount of the second lens unit. Moreover, at least the fourth lens unit is configured to move during zooming, and shares the zooming ratio with the second lens unit. The second lens unit has the negative refractive power as a whole, and may share the negative refractive power among a plurality of lens units. However, it is more preferred that the second lens unit desirably include one lens unit.

The conditional expression (1) defines shares of the zooming among lens units configured to move during zooming. The conditional expression (1) is satisfied to achieve reductions in size and weight of the zoom lens. The conditional expression (1) indicates a ratio between the share of zooming held by the second lens unit and the share of zooming held by the lens units configured to move during zooming excluding the second lens unit. Here, the zooming ratio of the zoom lens, which is represented by z, the share of zooming held by the second lens unit, which is represented by z2, and the share of zooming of the lens units configured to move during zooming excluding the second lens unit, which is represented by z2ex, are expressed by the following expressions:

$$z = ft/fw \quad (6)$$

$$z2 = \beta 2t/\beta 2w \quad (7)$$

$$z2ex = z/z2 \quad (8).$$

The conditional expression (1) expresses a ratio between z2 and z2ex, and as the value of the conditional expression (1) becomes smaller, the share of zooming held by the second lens unit becomes larger, and the movement amount of the second lens unit during zooming becomes larger. To the contrary, as the value of the conditional expression (1) becomes larger, the share of zooming held by the second lens unit becomes smaller, and the movement amount of the second lens unit during zooming becomes smaller.

Meanwhile, in the zoom lens according to the present invention, the stop is arranged between the second lens unit and the third lens unit or between the third lens unit and the fourth lens unit to bring the first lens unit and the stop closer to each other, to thereby reduce a lens diameter of the first lens unit. As the stop is brought closer to the first lens unit, the first lens unit may be reduced in size, but a lens diameter of a rear lens unit, which is away from the stop, becomes disadvantageously larger. Therefore, in order to achieve the reductions in size and weight of the entire zoom lens, it is important to appropriately set a position of the stop. When the upper limit condition of the conditional expression (1) is not satisfied, the share of zooming held by the second lens unit during zooming becomes smaller, and the movement amount of the second lens unit becomes smaller. Therefore, the stop may be arranged close to the first lens unit, and the first lens unit may be advantageously downsized, but the lens diameter of the rear lens unit becomes disadvantageously larger. Moreover, movement amounts of the lens units configured to move during zooming excluding the second lens unit become disadvantageously larger, and a total length of the zoom lens becomes larger. When the lower limit condition of the conditional expression (1) is not satisfied, the share of zooming of the second lens unit during zooming becomes larger, and the movement amount of the second lens unit becomes larger. Therefore, it becomes difficult to arrange the stop close to the first lens unit, and the downsizing of the first lens unit cannot be achieved. It is more preferred to set the conditional expression (1) as follows:

$$0.6<(ft\times\beta2w^2)/(fw\times\beta2t^2)<1.0 \quad (1a).$$

Moreover, the conditional expression (2) defines a ratio between the focal lengths of the first lens unit and the second lens unit. The conditional expression (2) is satisfied to achieve both a wide angle of the zoom lens and correction of aberration variations. The focal length of the zoom lens is a value obtained by multiplying the focal length of the first lens unit by lateral magnifications of the second lens unit to the rear lens unit. Therefore, in order to achieve the wide angle, there is a need to appropriately set the focal length of the first lens unit. When the upper limit condition of the conditional expression (2) is not satisfied, the refractive power of the first lens unit becomes stronger, and it becomes difficult to correct aberration variations accompanying zooming and aberration variations accompanying focusing. When the lower limit condition of the conditional expression (2) is not satisfied, the refractive power of the first lens unit becomes insufficient, and it becomes difficult to achieve both the wide angle and the reductions in size and weight. It is more preferred to set the conditional expression (2) as follows:

$$-2.45<f1/f2<-0.80 \quad (2a).$$

Moreover, three or more lenses are arranged in the rear lens unit to achieve a configuration for securing a sufficiently long back focus. In order to increase the back focus of the zoom lens, a negative refractive power and a positive refractive power are respectively arranged on the object side and the image side in the rear lens unit, so that a principal point of the rear lens unit is pushed out to the image side, to thereby secure the back focus of the zoom lens. In order to arrange the negative refractive power and the positive refractive power on the object side and the image side in the rear lens unit, respectively, and to satisfactorily correct chromatic aberration generated in the rear lens unit, three or more lenses are required.

It is more preferred that at least two lens units of the third lens unit, the fourth lens unit, and the rear lens unit be configured to move during zooming.

In a further aspect of the zoom lens according to the present invention, the stop is configured not to move in an optical axis direction for zooming.

In a further aspect of the zoom lens according to the present invention, the third lens unit and the fourth lens unit are configured to move during zooming, and when focal lengths of the third lens unit and the fourth lens unit are respectively represented by f3 and f4, the following expression is satisfied:

$$0.4<f3/f4<2.5 \quad (3).$$

The conditional expression (3) is satisfied to achieve both the reductions in size and weight and the high optical performance of the zoom lens. When the upper limit condition of the conditional expression (3) is not satisfied, the focal length of the third lens unit becomes relatively longer, and hence an axial ray that enters the fourth lens unit becomes higher, resulting in an increase in lens diameter and an increase in number of lenses. Moreover, the axial ray that passes through the fourth lens unit becomes the highest at the telephoto end, and hence it becomes difficult to correct spherical aberration at the telephoto end. When the lower limit condition of the conditional expression (3) is not satisfied, the focal length of the fourth lens unit becomes relatively longer, and hence a movement amount of the fourth lens unit is increased during zooming, with the result that the total lens length becomes longer, and that it becomes difficult to reduce the size and weight of the zoom lens. It is more preferred to set the conditional expression (3) as follows:

$$0.5<f3/f4<2.1 \quad (3a).$$

In a further aspect of the zoom lens according to the present invention, when intervals between the third lens unit and the fourth lens unit at the wide angle end and the telephoto end are represented by L34w and L34t, respectively, the following expression is satisfied:

$$0.01<L34t/L34w<0.60 \quad (4).$$

The conditional expression (4) may be satisfied to bring the third lens unit and the fourth lens unit closer to each other at the telephoto end than at the wide angle end, and to increase a combined refractive power of the third lens unit and the fourth lens unit at the telephoto end. As a result, movement amounts of the third lens unit and the fourth lens unit during zooming may be reduced, and the total lens length of the zoom lens may be reduced. When the lower limit condition of the conditional expression (4) is not satisfied, an interval between the third lens unit and the fourth lens unit at the wide angle end becomes larger, and hence the total lens length becomes longer, with the result that it becomes difficult to reduce the size and weight of the zoom lens. When the upper limit condition of the conditional expression (4) is not satisfied, an interval between the third lens unit and the fourth lens unit at the telephoto end becomes relatively longer, with the result that the combined refractive power of the third lens unit and the fourth lens unit becomes smaller, and that the total lens length of the zoom lens becomes longer. It is more preferred to set the conditional expression (4) as follows:

$$0.02 < L34t/L34w < 0.20 \quad (4a).$$

In a further aspect of the zoom lens according to the present invention, the rear lens unit is configured not to move for zooming. Moreover, a partial lens unit of the rear lens unit may be configured to move in a direction substantially orthogonal to the optical axis, to thereby function as a vibration isolation unit configured to correct a blur in a photographed image when the entire system of the zoom lens is vibrated. Further, a partial lens unit of the rear lens unit may be configured to move in the optical axis direction, to thereby function as a flange back adjustment unit configured to adjust a distance from a mounting reference surface of a lens mount to an image plane.

In a further aspect of the zoom lens according to the present invention, the first lens unit includes, in order from the object side to the image side: a first lens sub-unit having a negative refractive power, which is configured not to move for focusing; a second lens sub-unit having a positive refractive power, which is configured to move during focusing; and a third lens sub-unit having a positive refractive power, when a focal length of the first lens sub-unit is represented by f11, the following expression is satisfied:

$$-2.0 < f11/f1 < -0.4 \quad (5).$$

The conditional expression (5) is satisfied to achieve both the reductions in size and weight and the high optical performance of the zoom lens. When the upper limit condition of the conditional expression (5) is not satisfied, the focal length of the first lens sub-unit becomes relatively shorter, and hence it becomes difficult to suppress variations in various off axial aberrations accompanying zooming on the wide angle side, in particular, to suppress distortion and field curvature. When the lower limit condition of the conditional expression (5) is not satisfied, the focal length of the first lens sub-unit becomes relatively longer, and hence a lens diameter of first lens unit, in particular, of the first lens sub-unit is increased, with the result that it becomes difficult to achieve the wide angle. In addition, it becomes difficult to suppress a change in field of view during focusing. It is more preferred to set the conditional expression (5) as follows:

$$-1.4 < f11/f1 < -0.5 \quad (5a).$$

Further, an image pickup apparatus according to the present invention has a feature in including the zoom lens according to each of Embodiments and a solid state image pickup element having a predetermined effective image pickup range, which is configured to receive light of an image formed by the zoom lens.

Now, a specific configuration of the zoom lens according to the present invention is described by way of features of lens configurations of Numerical Embodiments 1 to 19 corresponding to Embodiments 1 to 19, respectively.

Embodiment 1

Figure 2A:
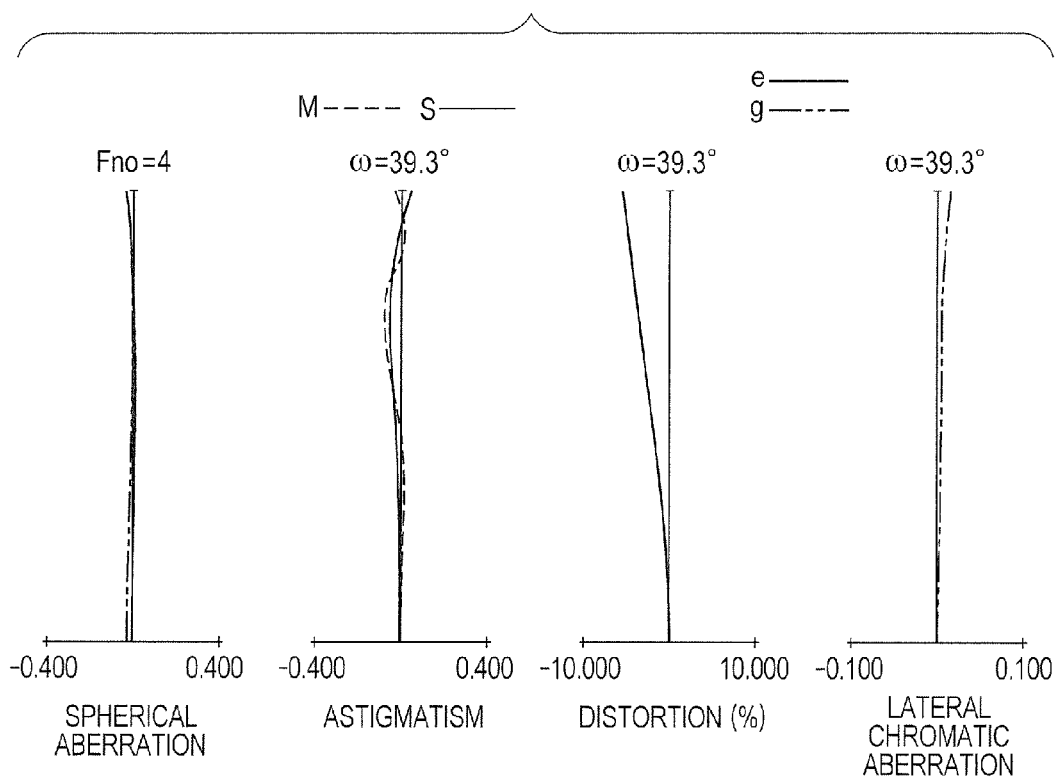
FIG. 2A is an aberration diagram in the state in which focus is at infinity at the wide angle end according to Numerical Embodiment 1.

FIG. 1 is a lens cross-sectional view when the focus is at the infinity at the wide angle end in the zoom lens according to Embodiment 1 (Numerical Embodiment 1) of the present invention. Arrows in each drawing that shows a lens cross-sectional view of a zoom lens designate movement of lens units for zooming from the wide angle to the telephoto end. FIG. 2A is a longitudinal aberration diagram at the wide angle end of Numerical Embodiment 1. FIG. 2B is a longitudinal aberration diagram at a focal length of 40 mm of Numerical Embodiment 1. FIG. 2C is a longitudinal aberration diagram at the telephoto end of Numerical Embodiment 1. Each of the aberration diagrams is the longitudinal aberration diagram when the focus is at the infinity. In addition, the value of the focal length is a value when corresponding value in Numerical Embodiment 1 to be described later is represented in units of mm. This also applies to Numerical Embodiments described below.

In FIG. 1, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming. When used as an image pickup optical system for a broadcasting television camera, a video camera, or a digital still camera, an image plane I corresponds to an image pickup surface of a solid state image pickup element (photoelectric transducer) or the like configured to receive light of an image formed by the zoom lens and to convert light to electricity. When used as an image pickup optical system for a film camera, the image plane I corresponds to a film surface on which the image formed by the zoom lens is exposed.

In each of the longitudinal aberration diagrams, spherical aberrations are illustrated with respect to e-line and g-line by a solid line and a two-dot chain line, respectively. Further, astigmatisms are illustrated on a meridional image plane by a broken line and on a sagittal image plane by a solid line. In addition, lateral chromatic aberrations are illustrated with respect to g-line by a two-dot chain line. A half angle of view is denoted by ω and an F-number is denoted by Fno. In each of the longitudinal aberration diagrams, a spherical aberration is illustrated in the unit of 0.4 mm, an astigmatism in the unit of 0.4 mm, a distortion in the unit of 10%, and a lateral chromatic aberration in the unit of 0.1 mm. In each Embodiment described below, each of the wide angle end and the telephoto end refers to a zooming position obtained when the second lens unit U2 for zooming is positioned at each of the ends of a range in which the second lens unit U2 may mechanically move along the optical axis.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twenty-second surfaces, the third lens unit U3 corresponds to the twenty-fourth and twenty-fifth surfaces, and the fourth lens unit U4 corresponds to the twenty-sixth to thirtieth surfaces. The fifth lens unit U5 corresponds to thirty-first to thirty-eighth surfaces. The first lens unit U1 includes convex lenses and concave lenses, and includes eight lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes convex lenses and concave lenses, and includes five lenses in total.

Numerical Embodiment 1 which corresponds to the above-mentioned Embodiment 1 is described.

In Table 1, values corresponding to the conditional expressions of this Embodiment are shown. This Embodiment satisfies the conditional expressions (1) to (5), and achieves both the photographing angle of view (angle of view) of 78.6 degrees at the wide angle end and the zooming ratio of 4.74, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

However, it is essential that the zoom lens according to the present invention satisfy the conditional expressions (1) and (2), but the zoom lens does not always need to satisfy the conditional expressions (3) to (5). However, when at least one of the conditional expressions (3) to (5) is satisfied, even better effects may be provided. This is also true for the other embodiments.

As described above, the zoom lens according to the present invention is applied to a television camera to realize an image pickup apparatus having high optical performance.

Embodiment 2

Figure 3:
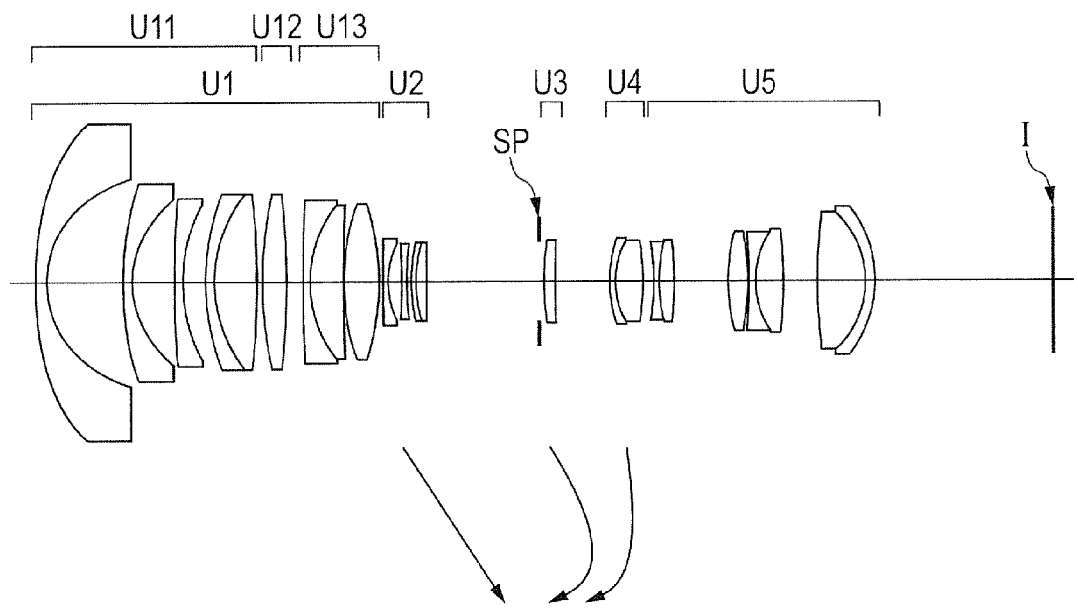
FIG. 3 is a lens cross-sectional view in the state in which focus is at infinity at a wide angle end according to Embodiment 2 (Numerical Embodiment 2) of the present invention.
Figure 4A:
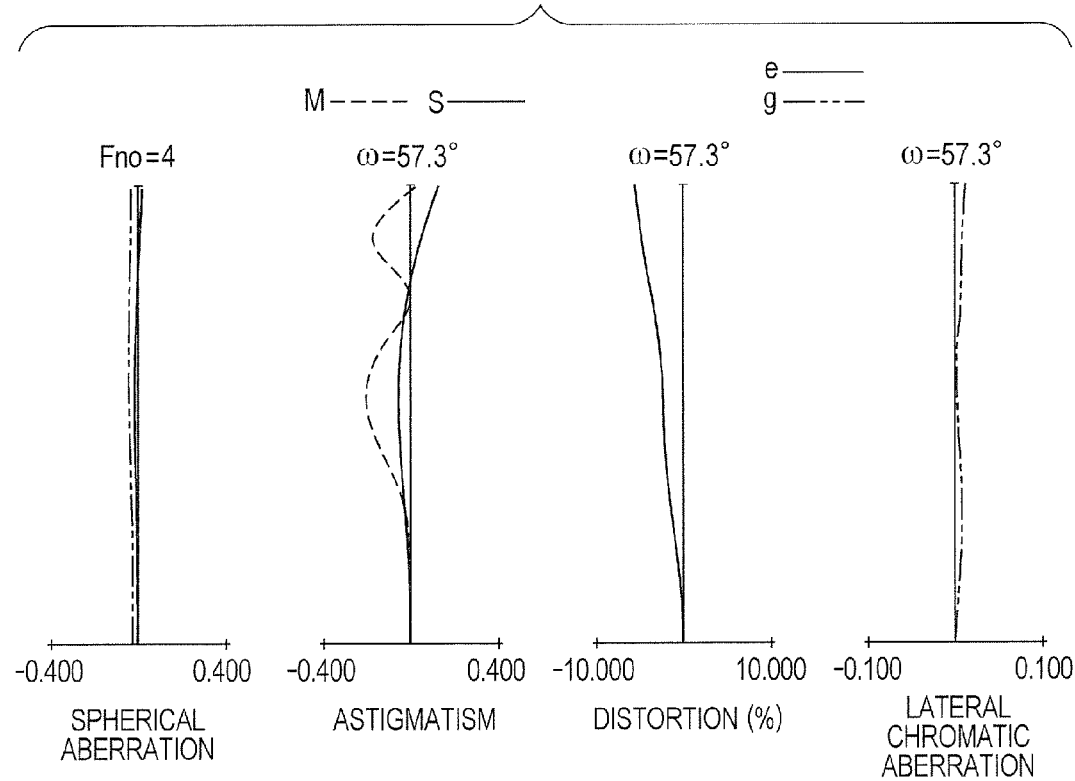
FIG. 4A is an aberration diagram in the state in which focus is at infinity at the wide angle end according to Numerical Embodiment 2.
Figure 4B:
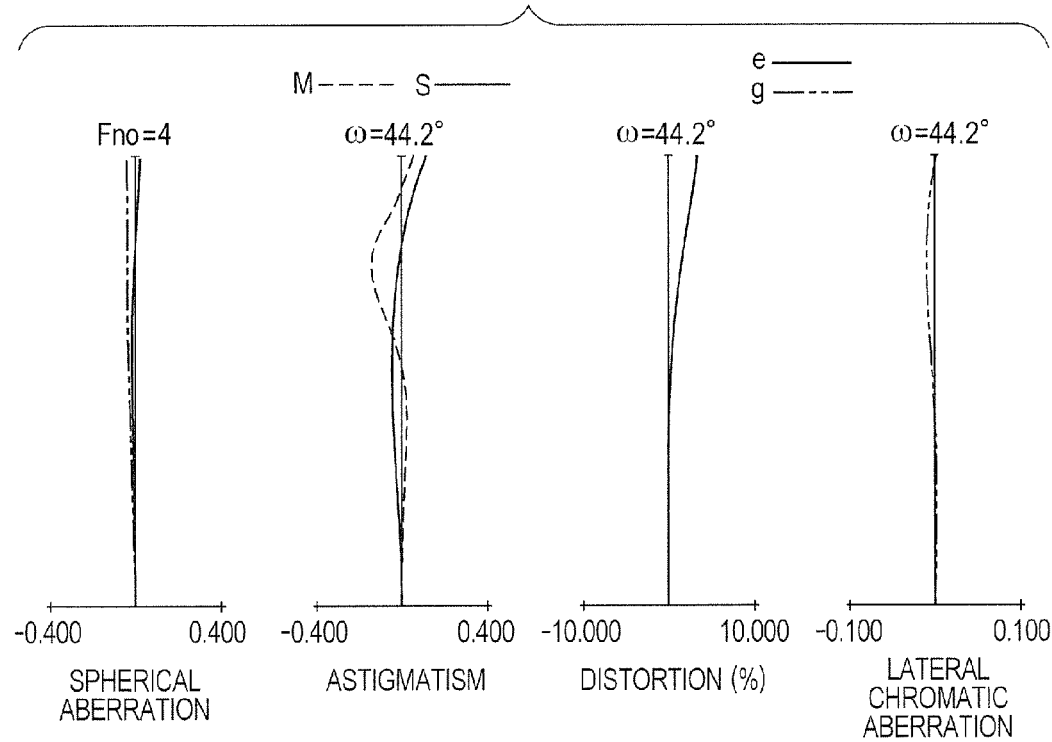
FIG. 4B is an aberration diagram in the state in which focus is at infinity at an intermediate zoom position according to Numerical Embodiment 2.
Figure 4C:
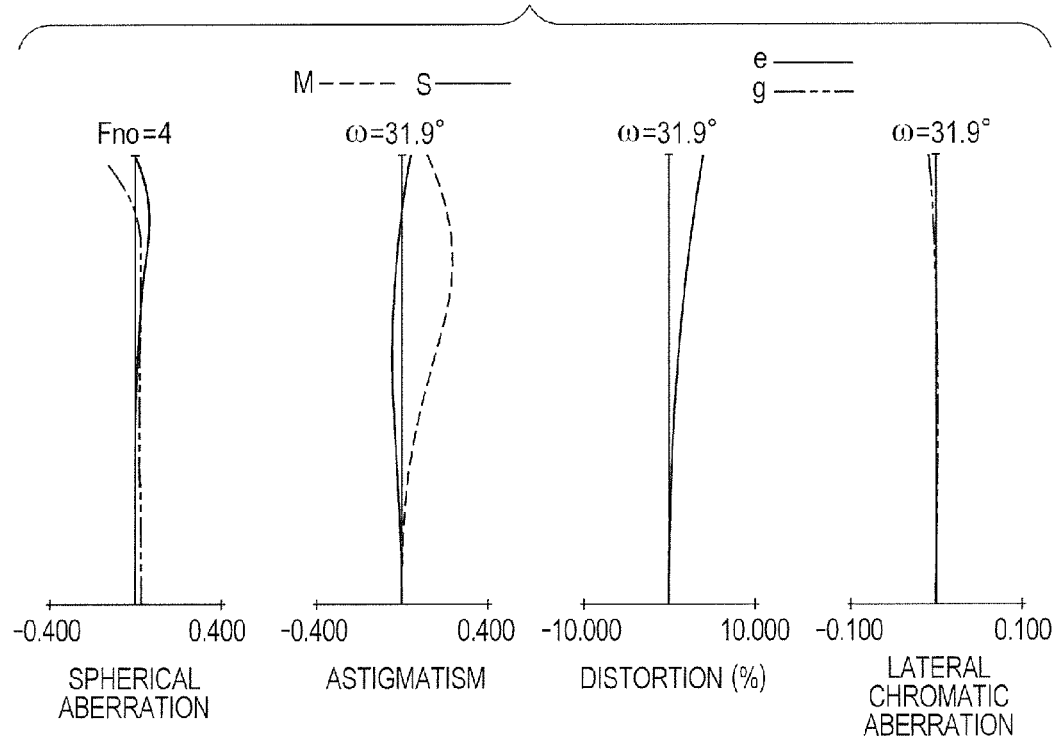
FIG. 4C is an aberration diagram in the state in which focus is at infinity at a telephoto end according to Numerical Embodiment 2.

FIG. 3 is a lens cross-sectional view when the focus is at the infinity at the wide angle end in the zoom lens according to Embodiment 2 (Numerical Embodiment 2) of the present invention. FIG. 4A is a longitudinal aberration diagram at the wide angle end of Numerical Embodiment 2. FIG. 4B is a longitudinal aberration diagram at a focal length of 16 mm of Numerical Embodiment 2. FIG. 4C is a longitudinal aberration diagram at the telephoto end of Numerical Embodiment 2. Each of the aberration diagrams is a longitudinal aberration diagram when the focus is at the infinity.

In FIG. 3, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a sixteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the seventeenth to twenty-third surfaces, the third lens unit U3 corresponds to the twenty-fifth and twenty-sixth surfaces, and the fourth lens unit U4 corresponds to the twenty-seventh to thirtieth surfaces. The fifth lens unit U5 corresponds to thirty-first to forty-first surfaces. The first lens unit U1 includes convex lenses and concave lenses, and includes nine lenses in total. The second lens unit U2 includes a convex lens and concave lenses, and includes four lenses in total. The third lens unit U3 includes one convex lens. The fourth lens unit U4 includes a convex lens and a concave lens, and includes two lenses in total. Moreover, the fifth lens unit U5 includes convex lenses and concave lenses, and includes seven lenses in total.

In Table 1, values corresponding to the conditional expressions of this Embodiment are shown. This Embodiment satisfies the conditional expressions (1) to (5), and achieves both the photographing angle of view (angle of view) of 114.5 degrees at the wide angle end and the zooming ratio of 2.5, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 3

Figure 5:
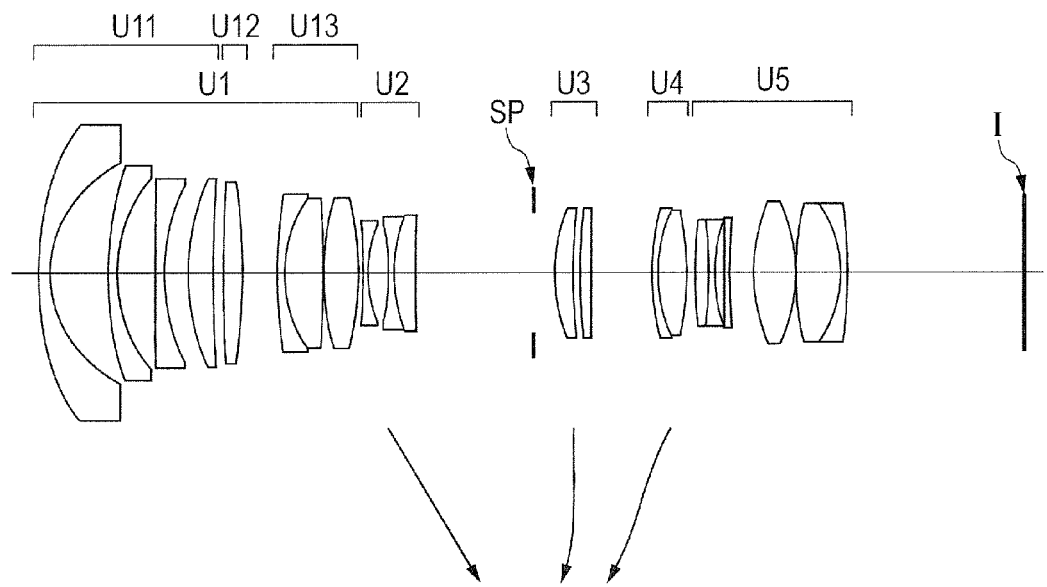
FIG. 5 is a lens cross-sectional view in the state in which focus is at infinity at a wide angle end according to Embodiment 3 (Numerical Embodiment 3) of the present invention.
Figure 6A:
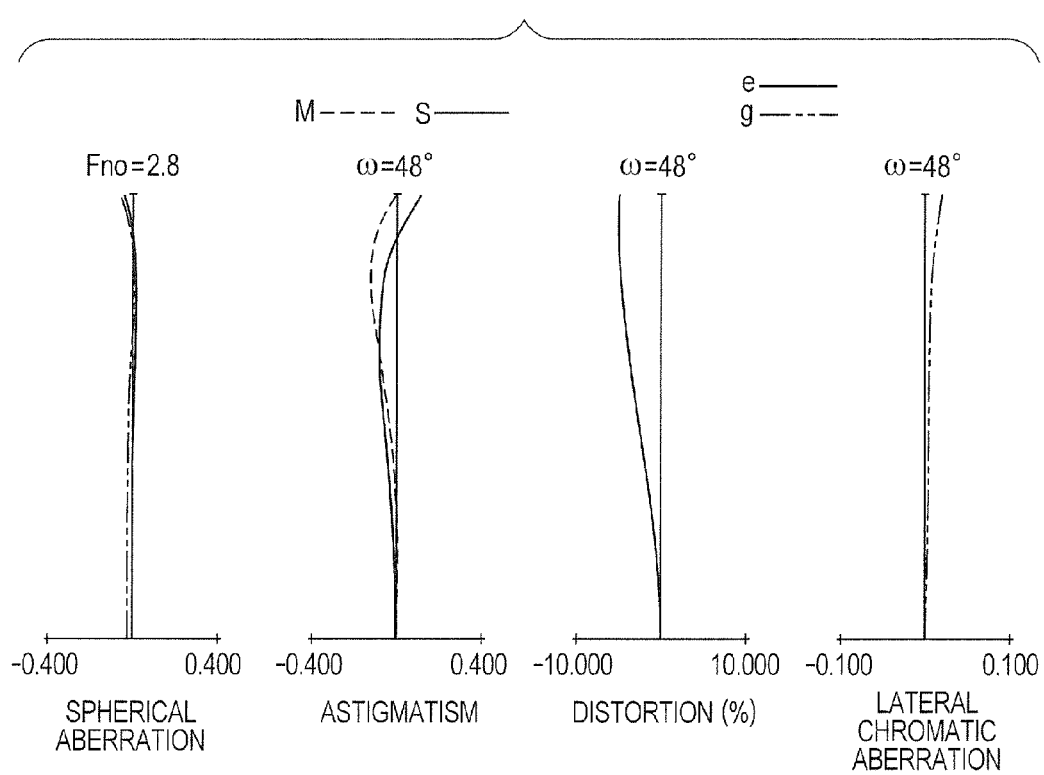
FIG. 6A is an aberration diagram in the state in which focus is at infinity at the wide angle end according to Numerical Embodiment 3.

FIG. 5 is a lens cross-sectional view when the focus is at the infinity at the wide angle end in the zoom lens according to Embodiment 3 (Numerical Embodiment 3) of the present invention. FIG. 6A is a longitudinal aberration diagram at the wide angle end of Numerical Embodiment 3. FIG. 6B is a longitudinal aberration diagram at a focal length of 21 mm of Numerical Embodiment 3. FIG. 6C is a longitudinal aberration diagram at the telephoto end of Numerical Embodiment 3. Each of the aberration diagrams is a longitudinal aberration diagram when the focus is at the infinity.

In FIG. 5, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twentieth surfaces, the third lens unit U3 corresponds to the twenty-second to twenty-fifth surfaces, and the fourth lens unit U4 corresponds to the twenty-sixth to twenty-eighth surfaces. The fifth lens unit U5 corresponds to twenty-ninth to thirty-eighth surfaces. The first lens unit U1 includes convex lenses and concave lenses, and includes eight lenses in total. The second lens unit U2 includes a convex lens and concave lenses, and includes three lenses in total. The third lens unit U3 includes two convex lenses. The fourth lens unit U4 includes a convex lens and a concave lens, and includes two lenses in total. Moreover, the fifth lens unit U5 includes convex lenses and concave lenses, and includes six lenses in total.

In Table 1, values corresponding to the conditional expressions of this Embodiment are shown. This Embodiment satisfies the conditional expressions (1) to (5), and achieves both the photographing angle of view (angle of view) of 96.0 degrees at the wide angle end and the zooming ratio of 2.5, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 4

Figure 7:
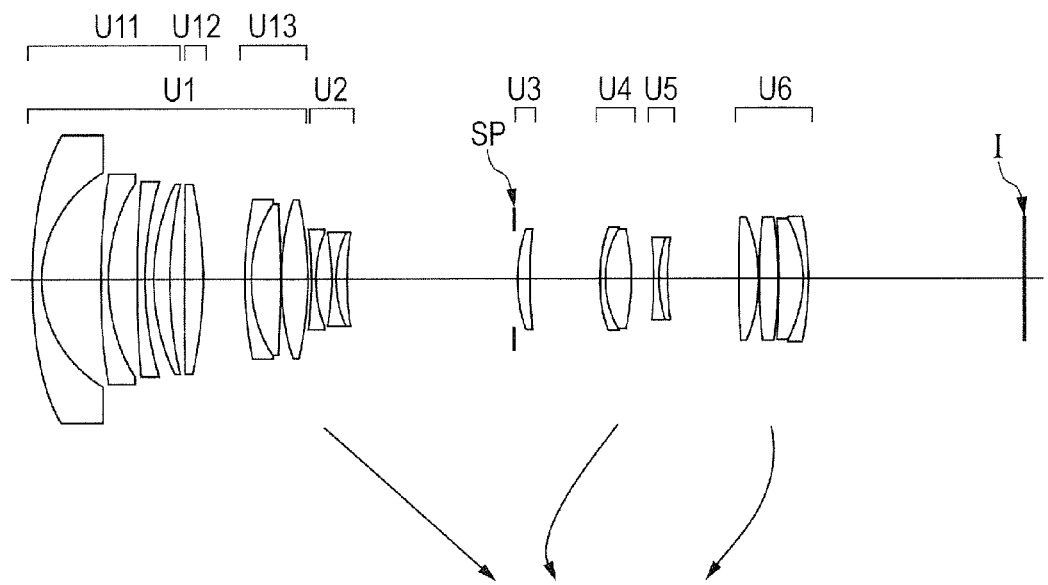
FIG. 7 is a lens cross-sectional view in the state in which focus is at infinity at a wide angle end according to Embodiment 4 (Numerical Embodiment 4) of the present invention.
Figure 8A:
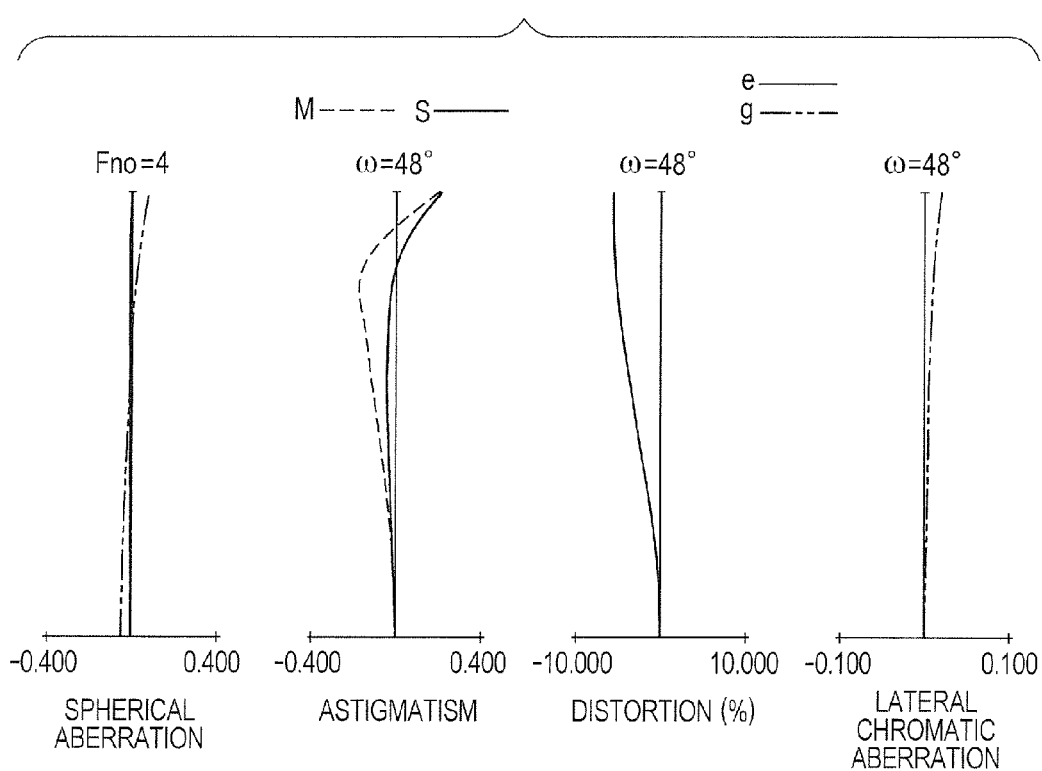
FIG. 8A is an aberration diagram in the state in which focus is at infinity at the wide angle end according to Numerical Embodiment 4.
Figure 8B:
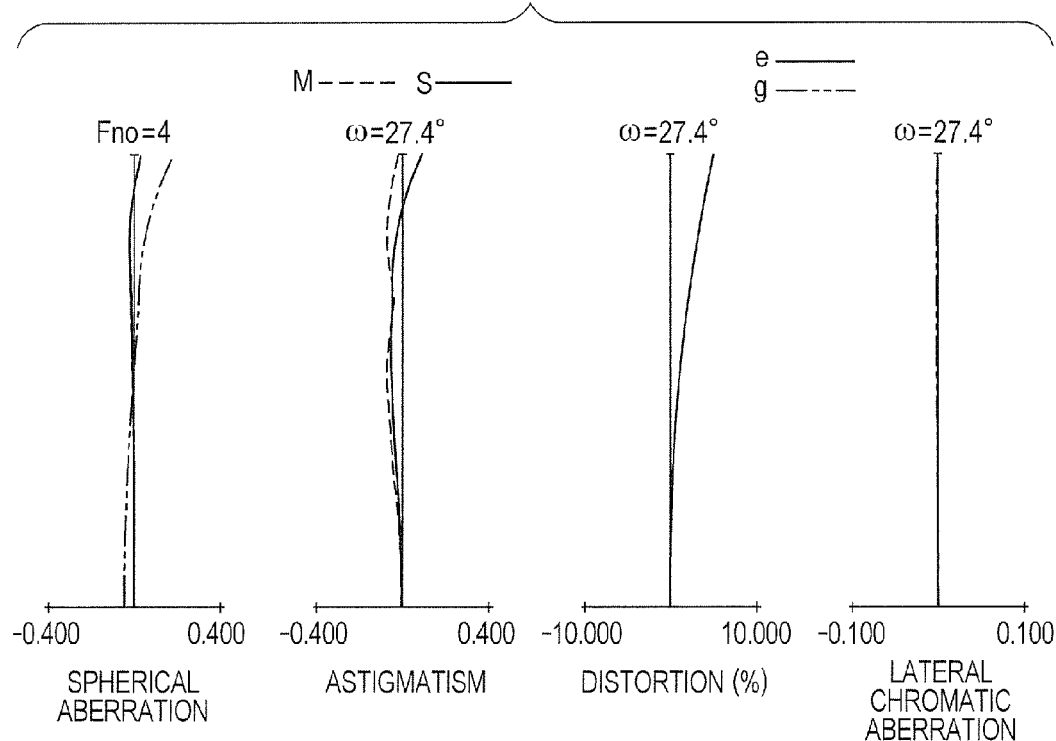
FIG. 8B is an aberration diagram in the state in which focus is at infinity at an intermediate zoom position according to Numerical Embodiment 4.
Figure 8C:
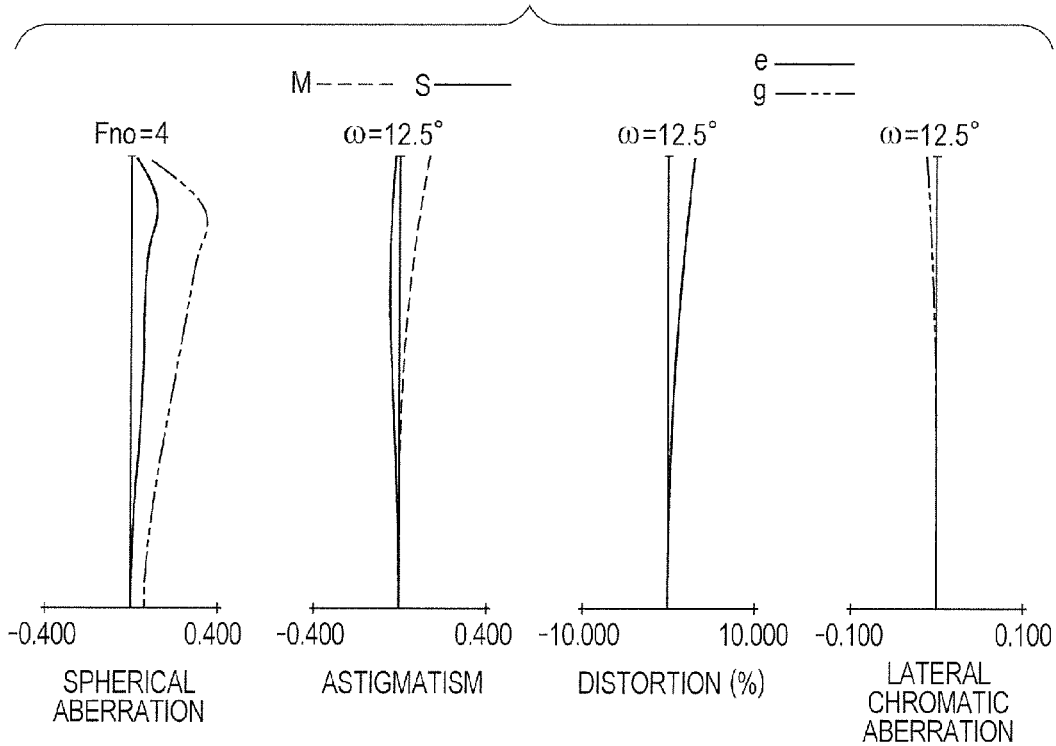
FIG. 8C is an aberration diagram in the state in which focus is at infinity at a telephoto end according to Numerical Embodiment 4.

FIG. 7 is a lens cross-sectional view when the focus is at the infinity at the wide angle end in the zoom lens according to Embodiment 4 (Numerical Embodiment 4) of the present invention. FIG. 8A is a longitudinal aberration diagram at the wide angle end of Numerical Embodiment 4. FIG. 8B is a longitudinal aberration diagram at a focal length of 30 mm of Numerical Embodiment 4. FIG. 8C is a longitudinal aberration diagram at the telephoto end of Numerical Embodiment 4. Each of the aberration diagrams is a longitudinal aberration diagram when the focus is at the infinity.

In FIG. 7, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a fourth lens unit U4 having a positive refractive power, which is configured to move toward the object side during zooming. The zoom lens further includes a sixth lens unit U6 having a positive refractive power, which is configured to move nonlinearly on the optical axis in conjunction with the movements of the second lens unit U2 and the fourth lens unit U4 to correct the image plane variation accompanying zooming. The zoom lens further includes a third lens unit U3 having a positive refractive power and a fifth lens unit U5 having a negative refractive power, which are configured not to move for zooming. In this Embodiment, the rear lens unit corresponds to the fifth lens unit U5 and the sixth lens unit U6.

In this Embodiment, the second lens unit U2, the fourth lens unit U4, and the sixth lens unit U6 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twentieth surfaces, the third lens unit U3 corresponds to the twenty-second and twenty-third surfaces, and the fourth lens unit U4 corresponds to the twenty-fourth to twenty-seventh surfaces. The fifth lens unit U5 corresponds to thirty-eighth to thirtieth surfaces, and the sixth lens unit U6 corresponds to the thirty-first to thirty-seventh surfaces. The first lens unit U1 includes convex lenses and concave lenses, and includes eight lenses in total. The second lens unit U2 includes a convex lens and concave lenses, and includes three lenses in total. The third lens unit U3 includes one convex lens. The fourth lens unit U4 includes a convex lens and a concave lens, and includes two lenses in total. Moreover, the fifth lens unit U5 includes a convex lens and a concave lens, and includes two lenses in total. The sixth lens unit U6 includes convex lenses and a concave lens, and includes four lenses in total.

In Table 1, values corresponding to the conditional expressions of Embodiment 1 are shown. Embodiment 1 satisfies the conditional expressions (1), (2), and (5), and achieves both the photographing angle of view (angle of view) of 96.0 degrees at the wide angle end and the zooming ratio of 5, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 5

Figure 9:
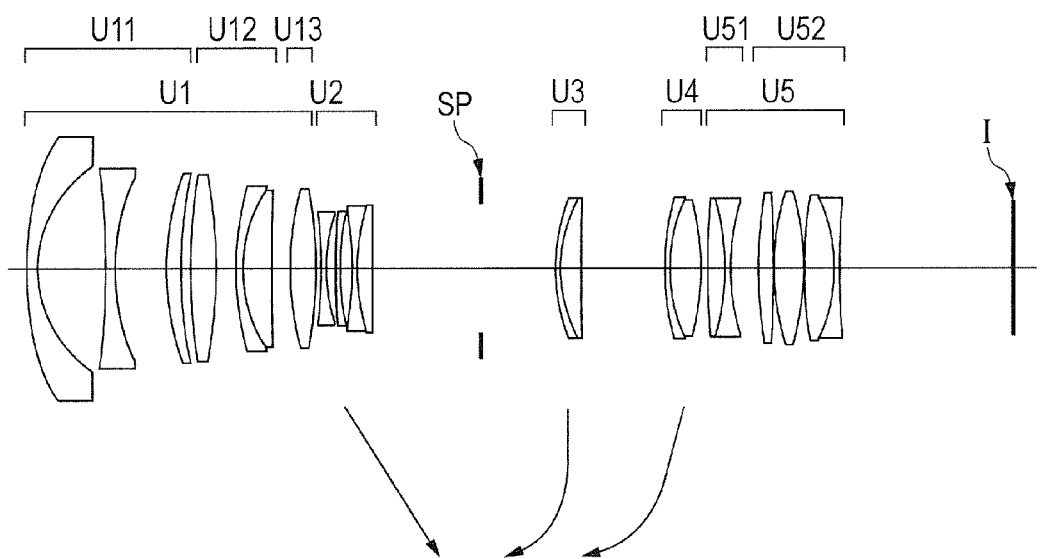
FIG. 9 is a lens cross-sectional view in the state in which focus is at infinity at a wide angle end according to Embodiment 5 (Numerical Embodiment 5) of the present invention.
Figure 10A:
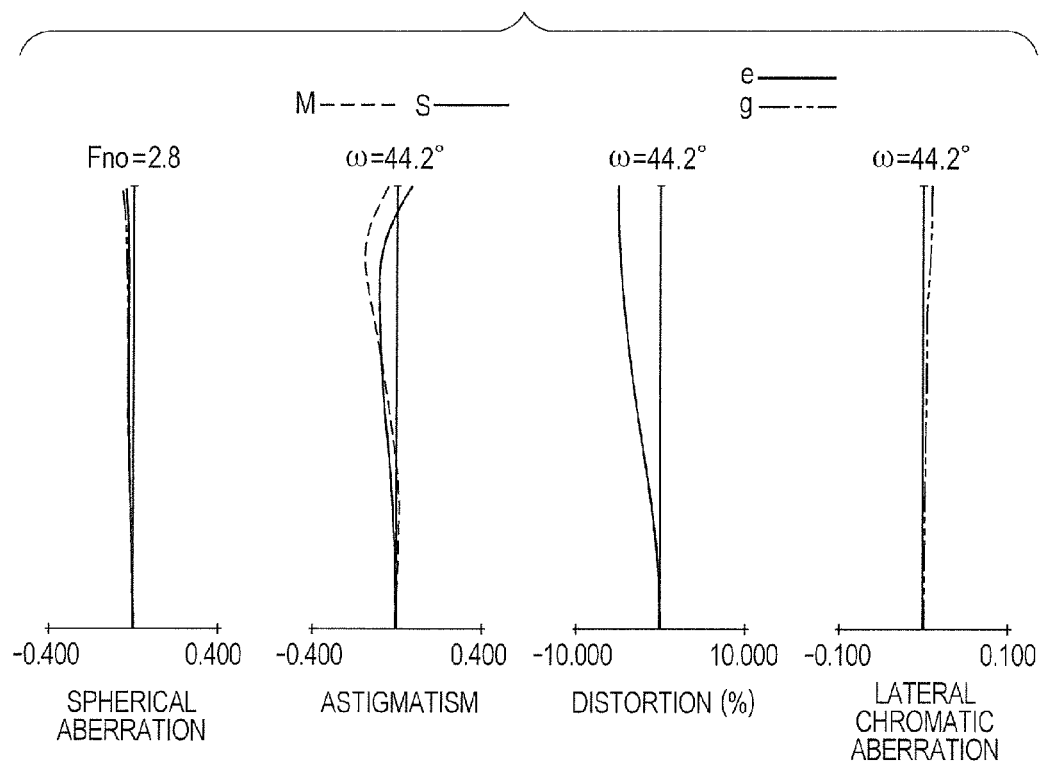
FIG. 10A is an aberration diagram in the state in which focus is at infinity at the wide angle end according to Numerical Embodiment 5.
Figure 10B:
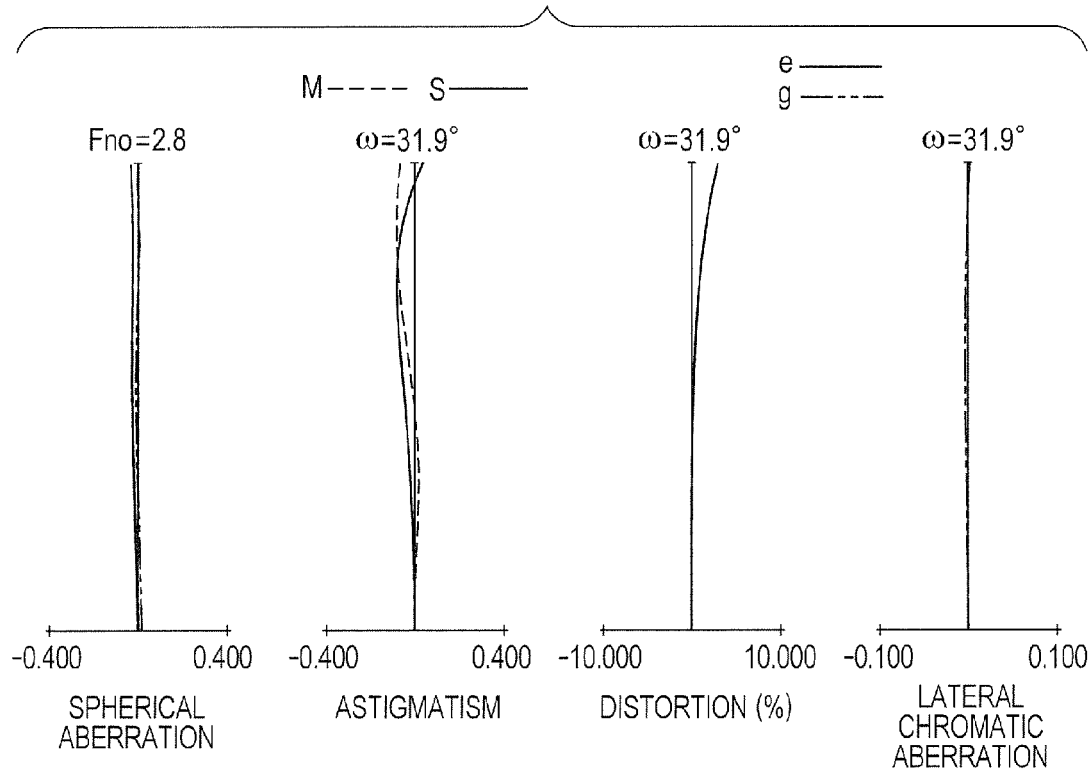
FIG. 10B is an aberration diagram in the state in which focus is at infinity at an intermediate zoom position according to Numerical Embodiment 5.
Figure 10C:
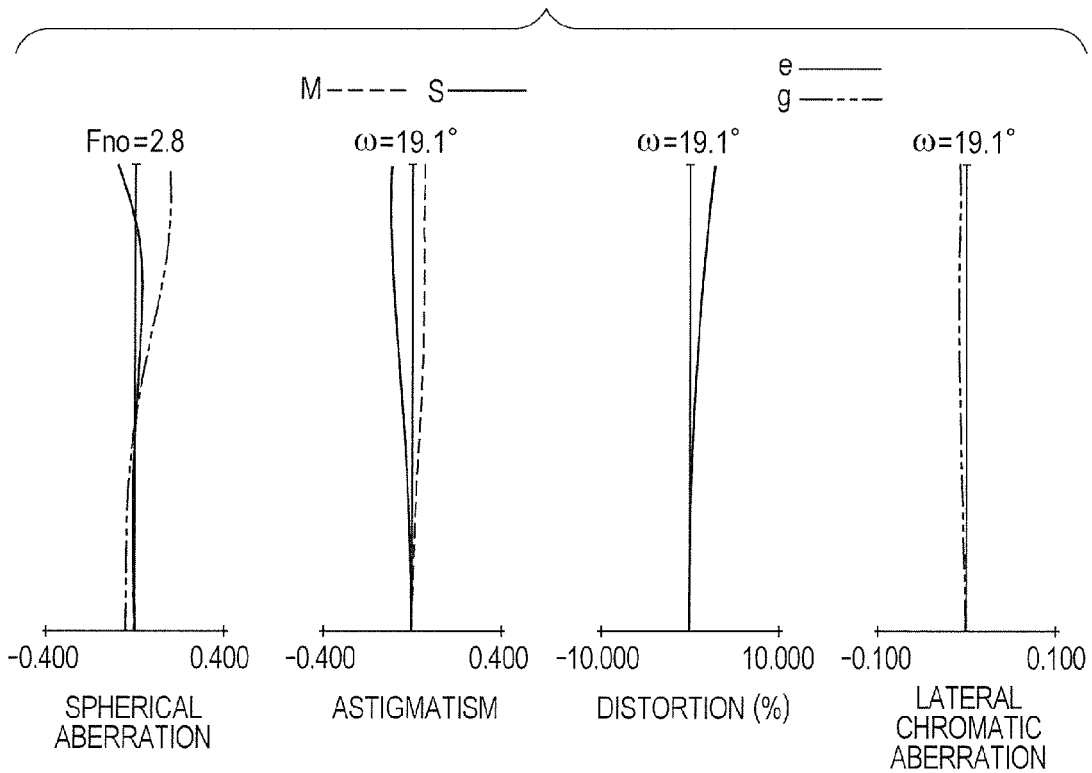
FIG. 10C is an aberration diagram in the state in which focus is at infinity at a telephoto end according to Numerical Embodiment 5.

FIG. 9 is a lens cross-sectional view when the focus is at the infinity at the wide angle end in the zoom lens according to Embodiment 5 (Numerical Embodiment 5) of the present invention. FIG. 10A is a longitudinal aberration diagram at the wide angle end of Numerical Embodiment 5. FIG. 10B is a longitudinal aberration diagram at a focal length of 25 mm of Numerical Embodiment 5. FIG. 10C is a longitudinal aberration diagram at the telephoto end of Numerical Embodiment 5. Each of the aberration diagrams is a longitudinal aberration diagram when the focus is at the infinity.

In FIG. 9, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5. Moreover, a partial lens unit U51 of the fifth lens unit U5 may be configured to move in the direction substantially orthogonal to the optical axis, to thereby function as a vibration isolation unit configured to correct a blur in a photographed image when the entire system of the zoom lens is vibrated. Further, a partial lens unit U52 of the fifth lens unit U5 may be configured to move in the optical axis direction, to thereby function as a flange back adjustment unit configured to adjust a distance from a mounting reference surface of a lens mount to an image plane.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a thirteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the fourteenth to twentieth surfaces, the third lens unit U3 corresponds to the twenty-second to twenty-fourth surfaces, and the fourth lens unit U4 corresponds to the twenty-fifth to twenty-seventh surfaces. The fifth lens unit U5 corresponds to the twenty-eighth to thirty-seventh surfaces, the partial lens unit U51 corresponds to the twenty-eighth to thirtieth surfaces, and the partial lens unit U52 corresponds to the thirty-first to thirty-seventh surfaces. The first lens unit U1 includes convex lenses and concave lenses, and includes seven lenses in total. The second lens unit U2 includes a convex lens and concave lenses, and includes four lenses in total. The third lens unit U3 includes a convex lens and a concave lens, and includes two lenses in total. The fourth lens unit U4 includes a convex lens and a concave lens, and includes two lenses in total. Moreover, the fifth lens unit U5 includes convex lenses and concave lenses, and includes six lenses in total.

In Table 1, values corresponding to the conditional expressions of this Embodiment are shown. This Embodiment satisfies the conditional expressions (1) to (5), and achieves both the photographing angle of view (angle of view) of 88.4 degrees at the wide angle end and the zooming ratio of 2.81, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 6

Figure 11:
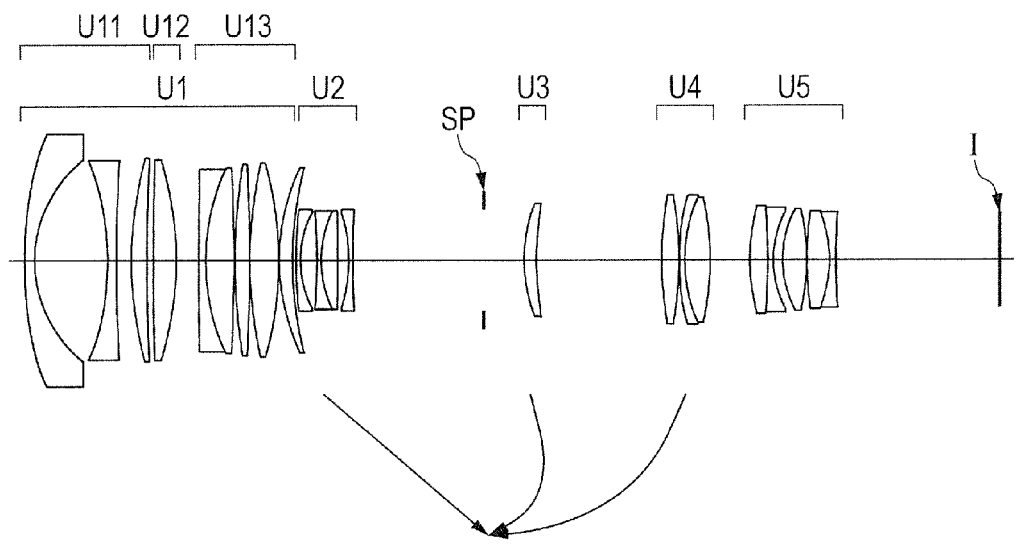
FIG. 11 is a lens cross-sectional view in the state in which focus is at infinity at a wide angle end according to Embodiment 6 (Numerical Embodiment 6) of the present invention.
Figure 12A:
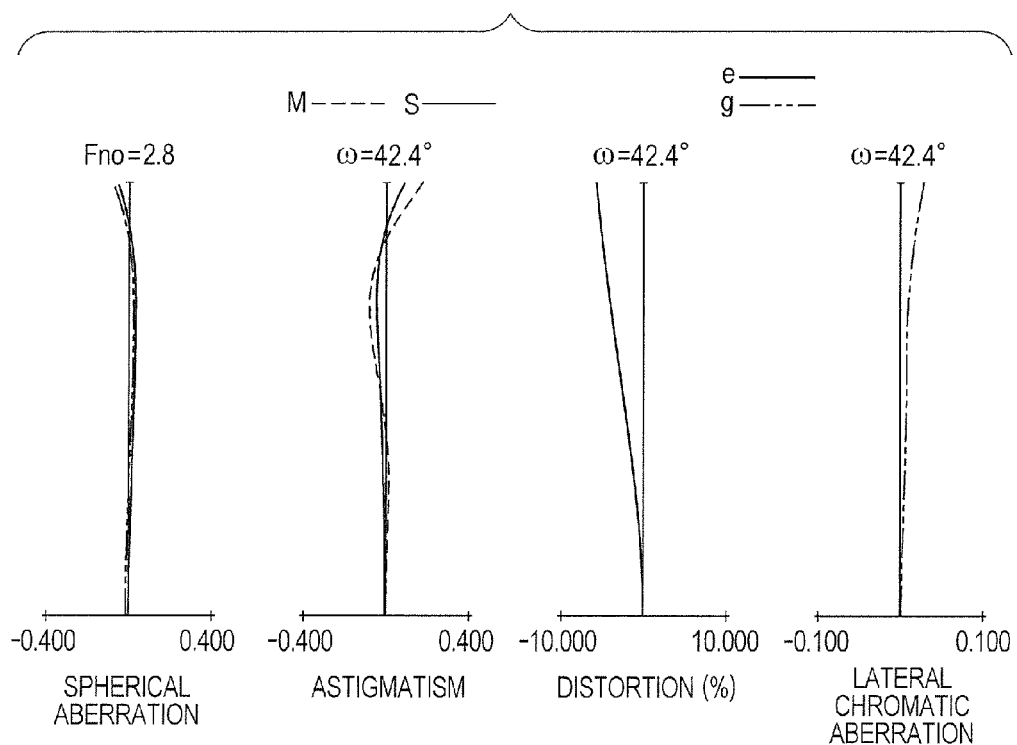
FIG. 12A is an aberration diagram in the state in which focus is at infinity at the wide angle end according to Numerical Embodiment 6.
Figure 12B:
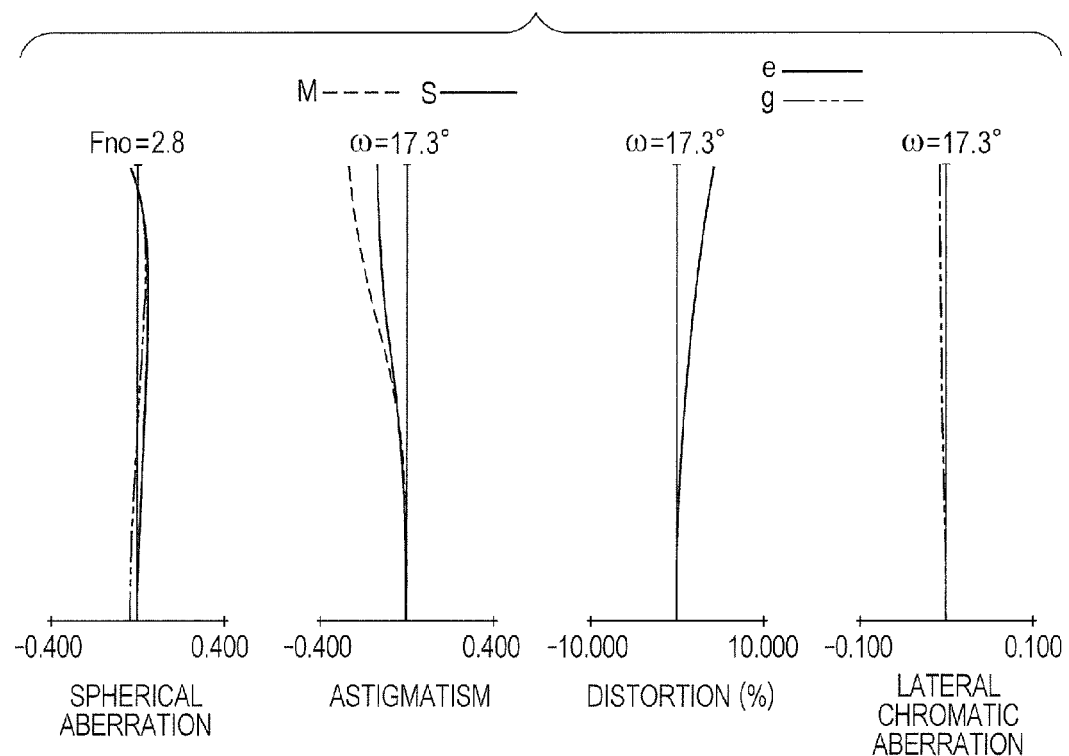
FIG. 12B is an aberration diagram in the state in which focus is at infinity at an intermediate zoom position according to Numerical Embodiment 6.
Figure 12C:
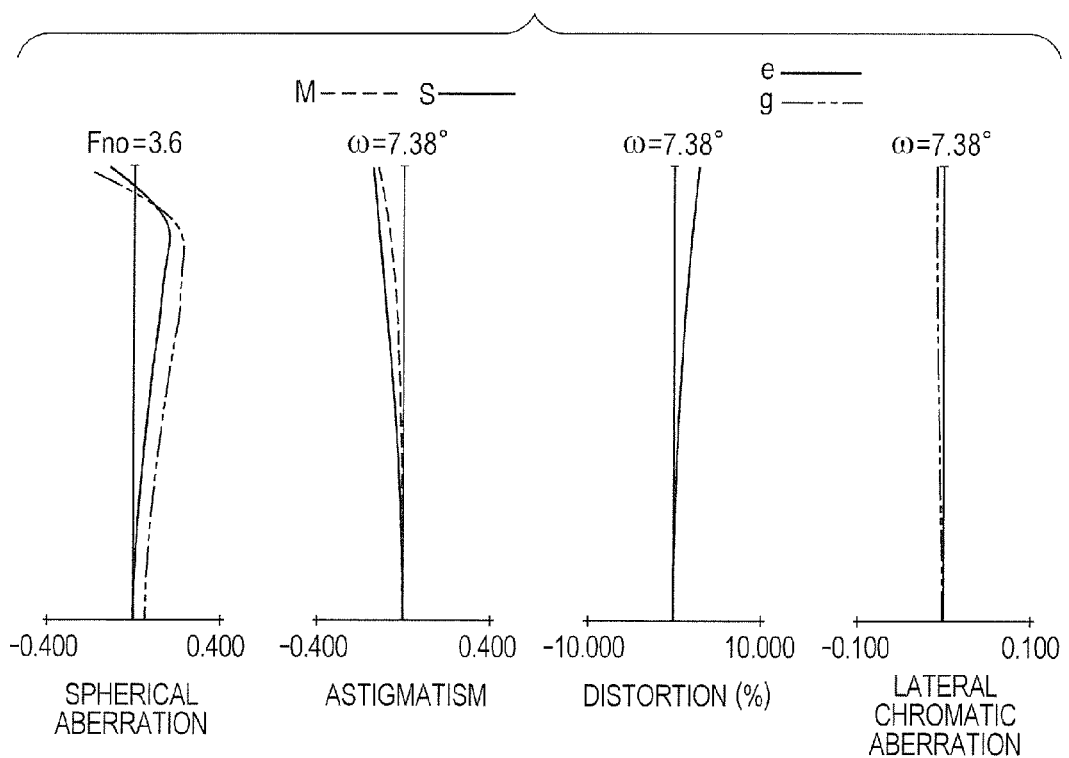
FIG. 12C is an aberration diagram in the state in which focus is at infinity at a telephoto end according to Numerical Embodiment 6.

FIG. 11 is a lens cross-sectional view when the focus is at the infinity at the wide angle end in the zoom lens according to Embodiment 6 (Numerical Embodiment 6) of the present invention. FIG. 12A is a longitudinal aberration diagram at the wide angle end of Numerical Embodiment 6. FIG. 12B is a longitudinal aberration diagram at a focal length of 50 mm of Numerical Embodiment 6. FIG. 12C is a longitudinal aberration diagram at the telephoto end of Numerical Embodiment 6. Each of the aberration diagrams is a longitudinal aberration diagram when the focus is at the infinity.

In FIG. 11, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a seventeenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the eighteenth to twenty-fourth surfaces, the third lens unit U3 corresponds to the twenty-sixth and twenty-seventh surfaces, and the fourth lens unit U4 corresponds to the twenty-eighth to thirty-second surfaces. The fifth lens unit U5 corresponds to thirty-third to fortieth surfaces. The first lens unit U1 includes convex lenses and concave lenses, and includes nine lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes convex lenses and concave lenses, and includes five lenses in total.

In Table 1, values corresponding to the conditional expressions of this Embodiment are shown. This Embodiment satisfies the conditional expressions (1) to (5), and achieves both the photographing angle of view (angle of view) of 84.9 degrees at the wide angle end and the zooming ratio of 7.06, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 7

Figure 13:
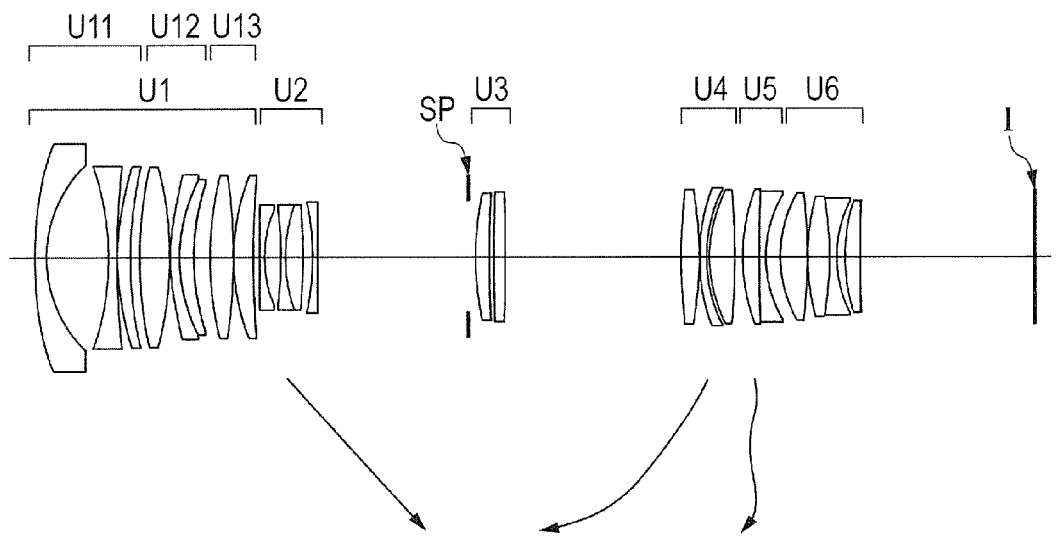
FIG. 13 is a lens cross-sectional view in the state in which focus is at infinity at a wide angle end according to Embodiment 7 (Numerical Embodiment 7) of the present invention.
Figure 14A:
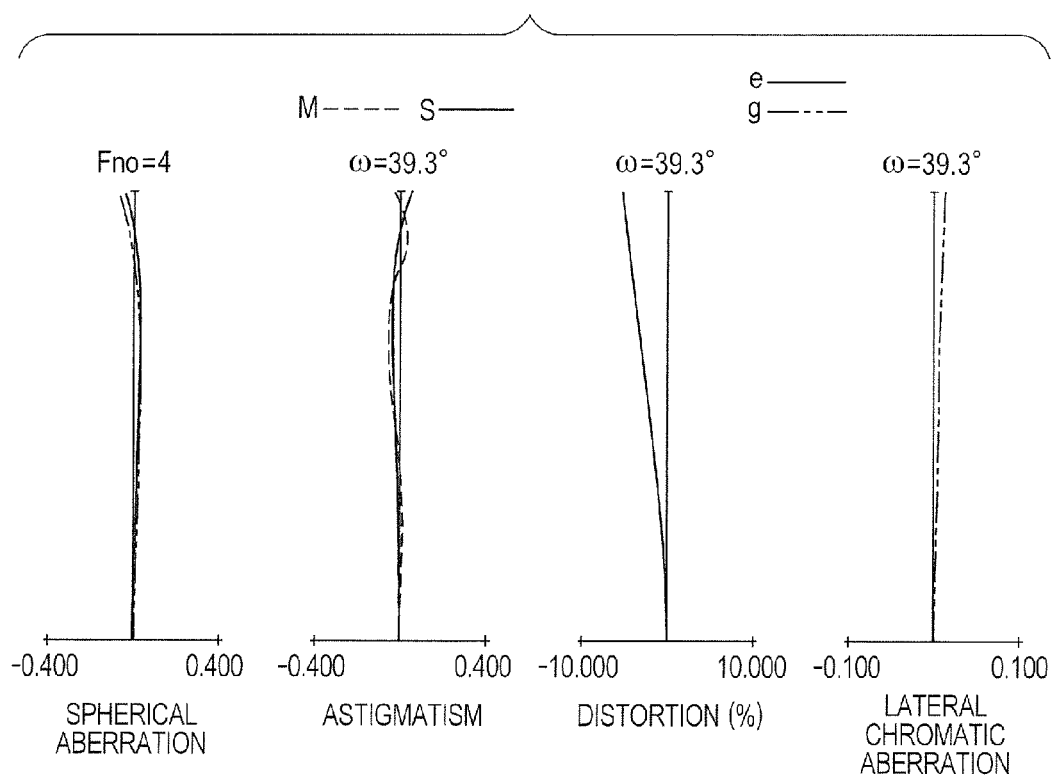
FIG. 14A is an aberration diagram in the state in which focus is at infinity at the wide angle end according to Numerical Embodiment 7.

FIG. 13 is a lens cross-sectional view when the focus is at the infinity at the wide angle end in the zoom lens according to Embodiment 7 (Numerical Embodiment 7) of the present invention. FIG. 14A is a longitudinal aberration diagram at the wide angle end of Numerical Embodiment 7. FIG. 14B is a longitudinal aberration diagram at a focal length of 40 mm of Numerical Embodiment 7. FIG. 14C is a longitudinal aberration diagram at the telephoto end of Numerical Embodiment 7. Each of the aberration diagrams is a longitudinal aberration diagram when the focus is at the infinity.

In FIG. 13, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a fourth lens unit U4 having a positive refractive power, which is configured to move toward the object side during zooming. The zoom lens further includes a fifth lens unit U5 having a negative refractive power, which is configured to move nonlinearly on the optical axis in conjunction with the movements of the second lens unit U2 and the fourth lens unit U4 to correct the image plane variation accompanying zooming. The zoom lens further includes a third lens unit U3 having a positive refractive power and a sixth lens unit U6 having a positive refractive power, which are configured not to move for zooming. In this Embodiment, the rear lens unit corresponds to the fifth lens unit U5 and the sixth lens unit U6.

In this Embodiment, the second lens unit U2, the fourth lens unit U4, and the fifth lens unit U5 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twenty-second surfaces, the third lens unit U3 corresponds to the twenty-fourth and twenty-seventh surfaces, and the fourth lens unit U4 corresponds to the twenty-eighth to thirty-third surfaces. The fifth lens unit U5 corresponds to thirty-fourth to thirty-sixth surfaces, and the sixth lens unit U6 corresponds to thirty-seventh to forty-third surfaces. The first lens unit U1 includes convex lenses and concave lenses, and includes eight lenses in total. The second lens unit U2 includes a convex lens and concave lenses, and includes four lenses in total. The third lens unit U3 includes two convex lenses. The fourth lens unit U4 includes convex lenses and a concave lens, and includes three lenses in total. Moreover, the fifth lens unit U5 includes a convex lens and a concave lens, and includes two lenses in total, and the sixth lens unit U6 includes convex lenses and a concave lens, and includes four lenses in total.

In Table 1, values corresponding to the conditional expressions of this Embodiment are shown. This Embodiment satisfies the conditional expressions (1), (2), and (5), and achieves both the photographing angle of view (angle of view) of 78.6 degrees at the wide angle end and the zooming ratio of 4.74, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 8

Figure 15:
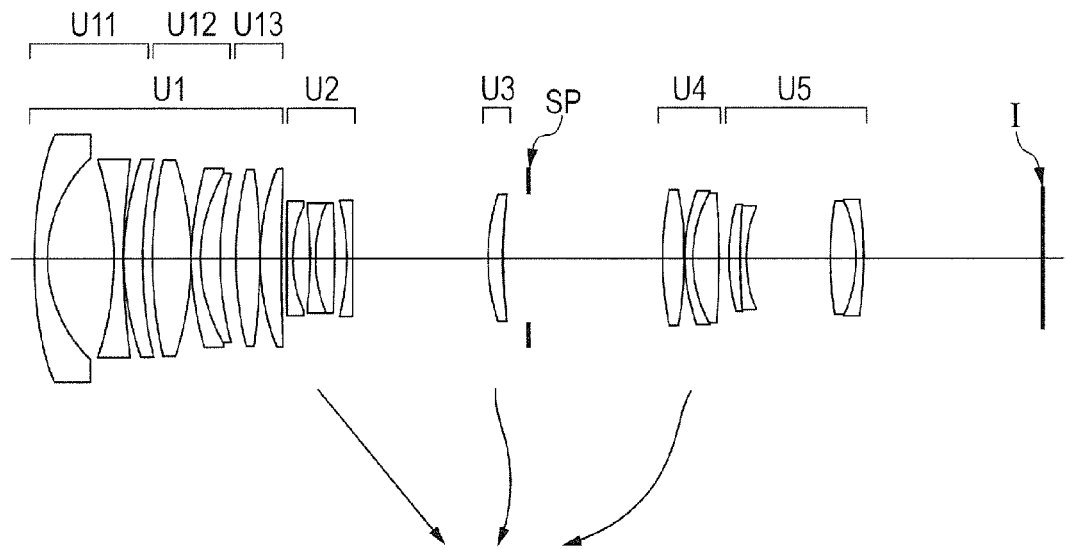
FIG. 15 is a lens cross-sectional view in the state in which focus is at infinity at a wide angle end according to Embodiment 8 (Numerical Embodiment 8) of the present invention.
Figure 16A:
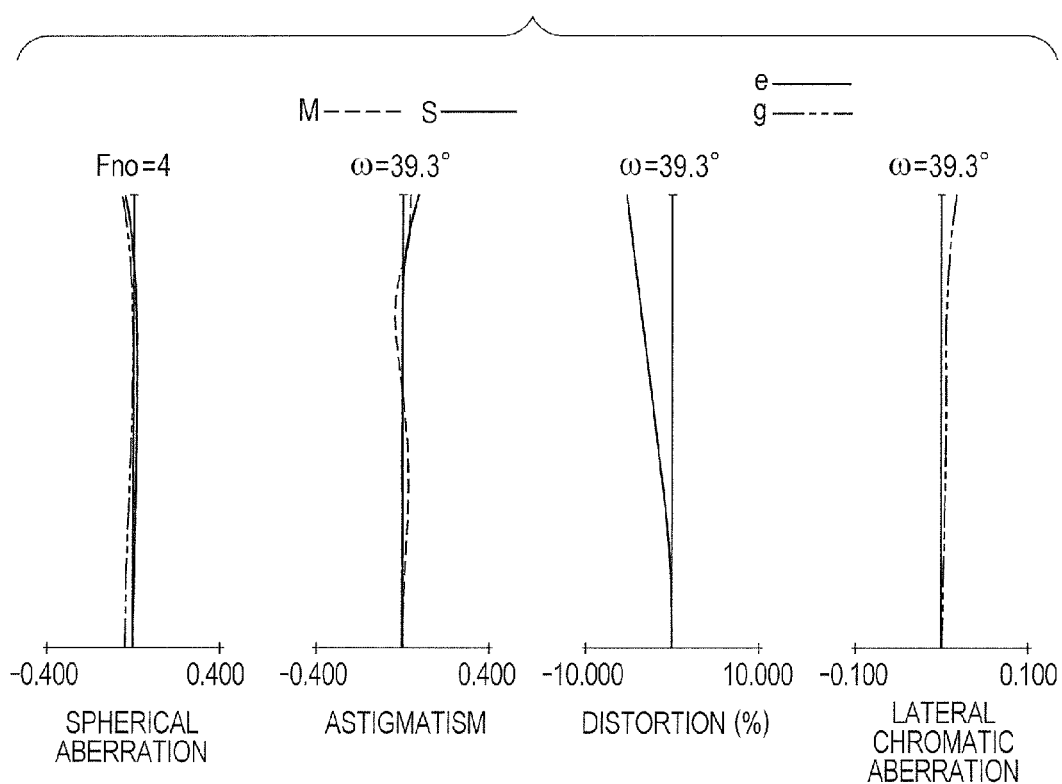
FIG. 16A is an aberration diagram in the state in which focus is at infinity at the wide angle end according to Numerical Embodiment 8.

FIG. 15 is a lens cross-sectional view when the focus is at the infinity at the wide angle end in the zoom lens according to Embodiment 8 (Numerical Embodiment 8) of the present invention. FIG. 16A is a longitudinal aberration diagram at the wide angle end of Numerical Embodiment 8. FIG. 16B is a longitudinal aberration diagram at a focal length of 40 mm of Numerical Embodiment 8. FIG. 16C is a longitudinal aberration diagram at the telephoto end of Numerical Embodiment 8. Each of the aberration diagrams is a longitudinal aberration diagram when the focus is at the infinity.

In FIG. 15, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the third lens unit U3 and the fourth lens unit U4. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twenty-second surfaces, the third lens unit U3 corresponds to the twenty-third and twenty-fourth surfaces, and the fourth lens unit U4 corresponds to the twenty-sixth to thirtieth surfaces. The fifth lens unit U5 corresponds to thirty-first to thirty-sixth surfaces. The first lens unit U1 includes convex lenses and concave lenses, and includes eight lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes convex lenses and concave lenses, and includes four lenses in total.

In Table 1, values corresponding to the conditional expressions of this Embodiment are shown. This Embodiment satisfies the conditional expressions (1) to (5), and achieves both the photographing angle of view (angle of view) of 78.6 degrees at the wide angle end and the zooming ratio of 4.74, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 9

Figure 17:
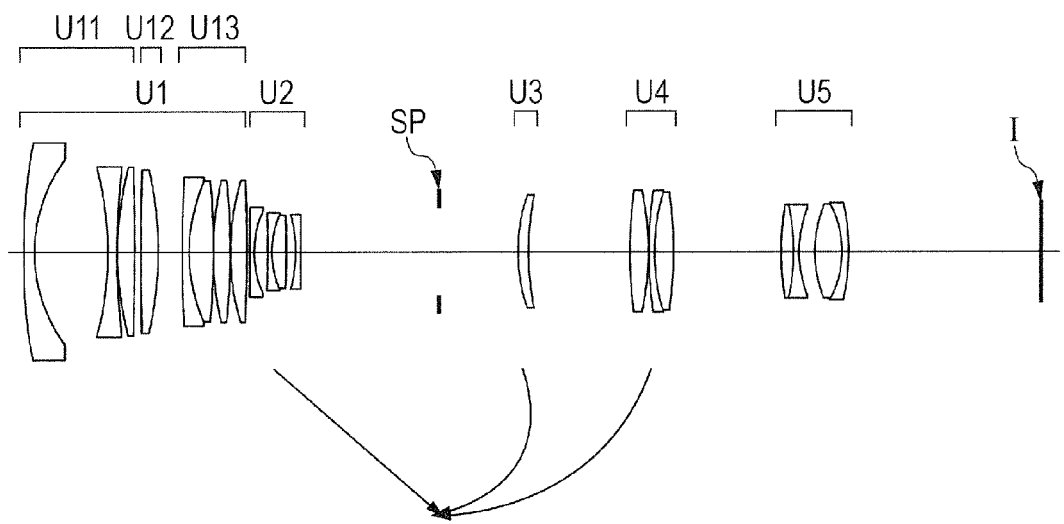
FIG. 17 is a lens cross-sectional view in the state in which focus is at infinity at a wide angle end according to Embodiment 9 (Numerical Embodiment 9) of the present invention.
Figure 18A:
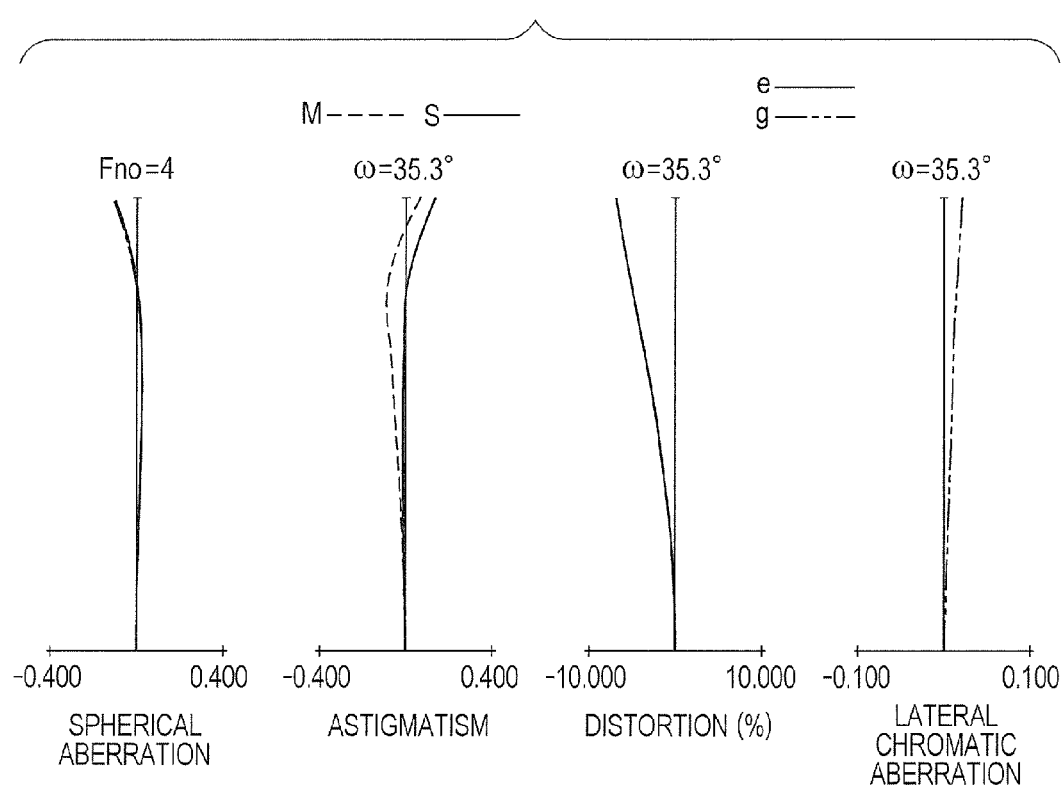
FIG. 18A is an aberration diagram in the state in which focus is at infinity at the wide angle end according to Numerical Embodiment 9.
Figure 18B:
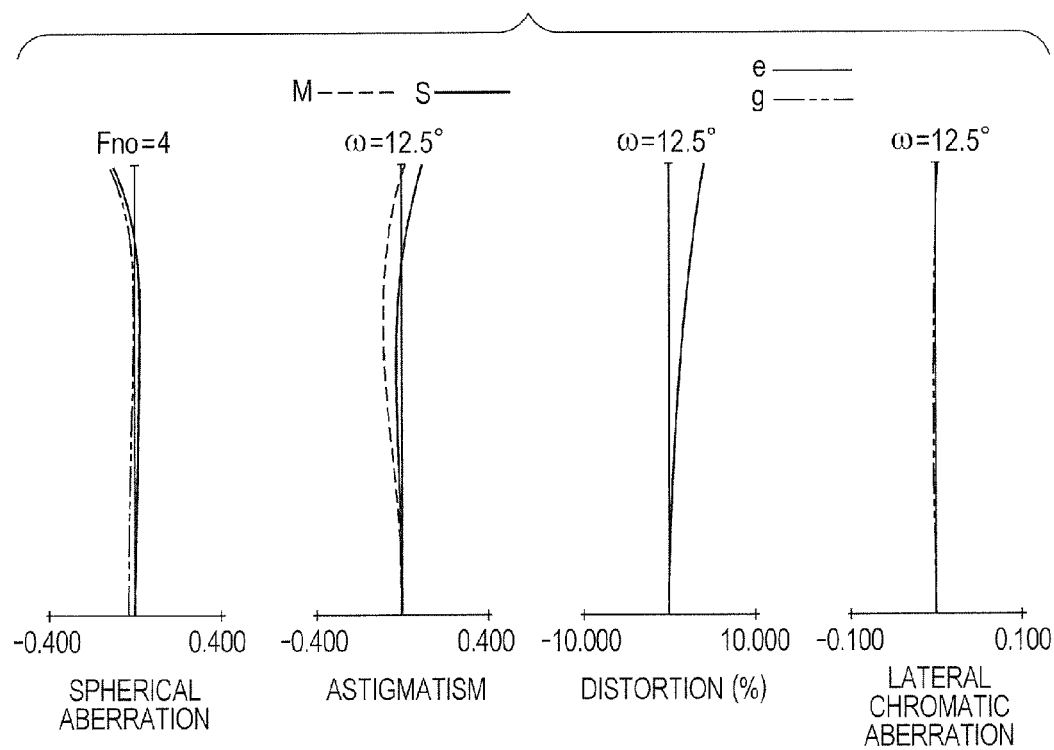
FIG. 18B is an aberration diagram in the state in which focus is at infinity at an intermediate zoom position according to Numerical Embodiment 9.
Figure 18C:
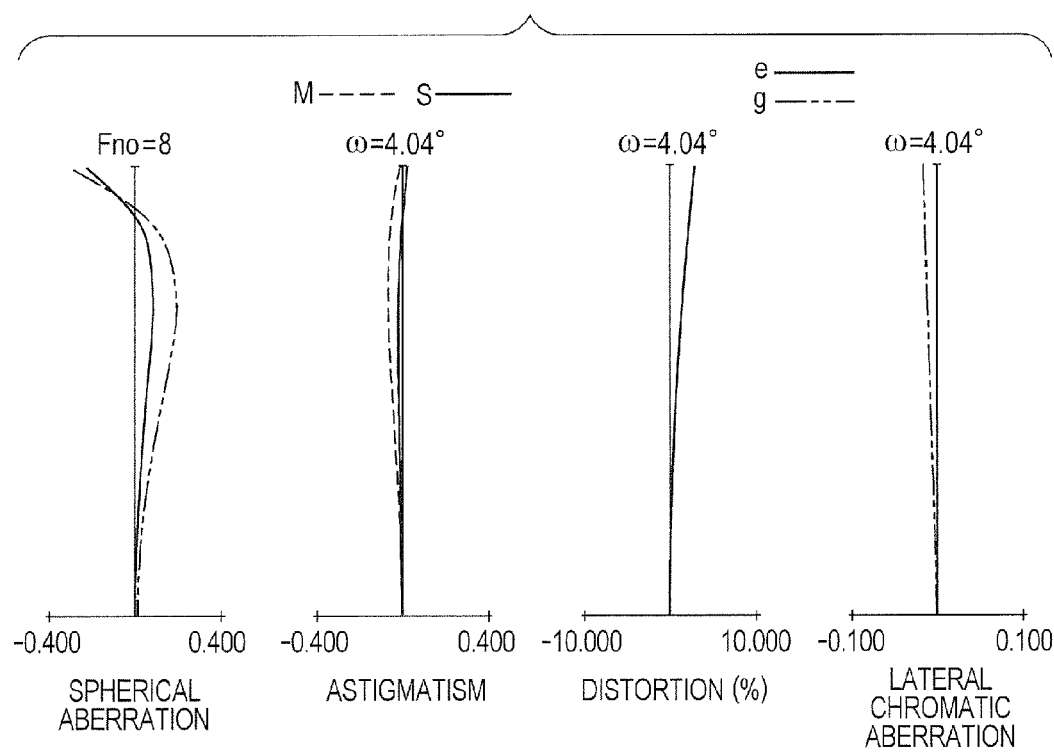
FIG. 18C is an aberration diagram in the state in which focus is at infinity at a telephoto end according to Numerical Embodiment 9.

FIG. 17 is a lens cross-sectional view when the focus is at the infinity at the wide angle end in the zoom lens according to Embodiment 9 (Numerical Embodiment 9) of the present invention. FIG. 18A is a longitudinal aberration diagram at the wide angle end of Numerical Embodiment 9. FIG. 18B is a longitudinal aberration diagram at a focal length of 70 mm of Numerical Embodiment 9. FIG. 18C is a longitudinal aberration diagram at the telephoto end of Numerical Embodiment 9. Each of the aberration diagrams is a longitudinal aberration diagram when the focus is at the infinity.

In FIG. 17, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twenty-second surfaces, the third lens unit U3 corresponds to the twenty-fourth and twenty-fifth surfaces, and the fourth lens unit U4 corresponds to the twenty-sixth to thirtieth surfaces. The fifth lens unit U5 corresponds to thirty-first to thirty-sixth surfaces. The first lens unit U1 includes convex lenses and concave lenses, and includes eight lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes convex lenses and concave lenses, and includes four lenses in total.

In Table 1, values corresponding to the conditional expressions of this Embodiment are shown. This Embodiment satisfies the conditional expressions (1) to (5), and achieves both the photographing angle of view (angle of view) of 70.5 degrees at the wide angle end and the zooming ratio of 10, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 10

Figure 19:
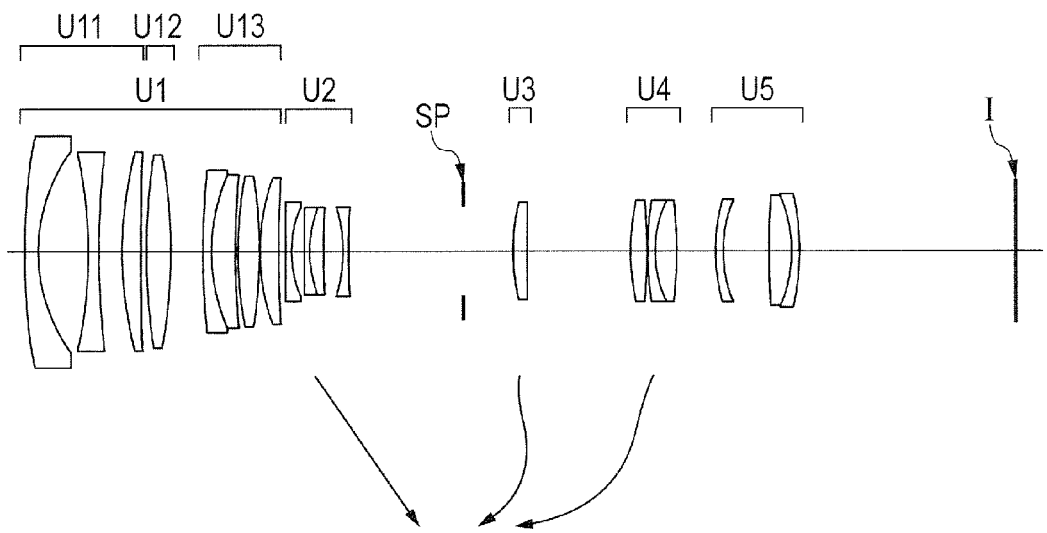
FIG. 19 is a lens cross-sectional view in the state in which focus is at infinity at a wide angle end according to Embodiment 10 (Numerical Embodiment 10) of the present invention.
Figure 20A:
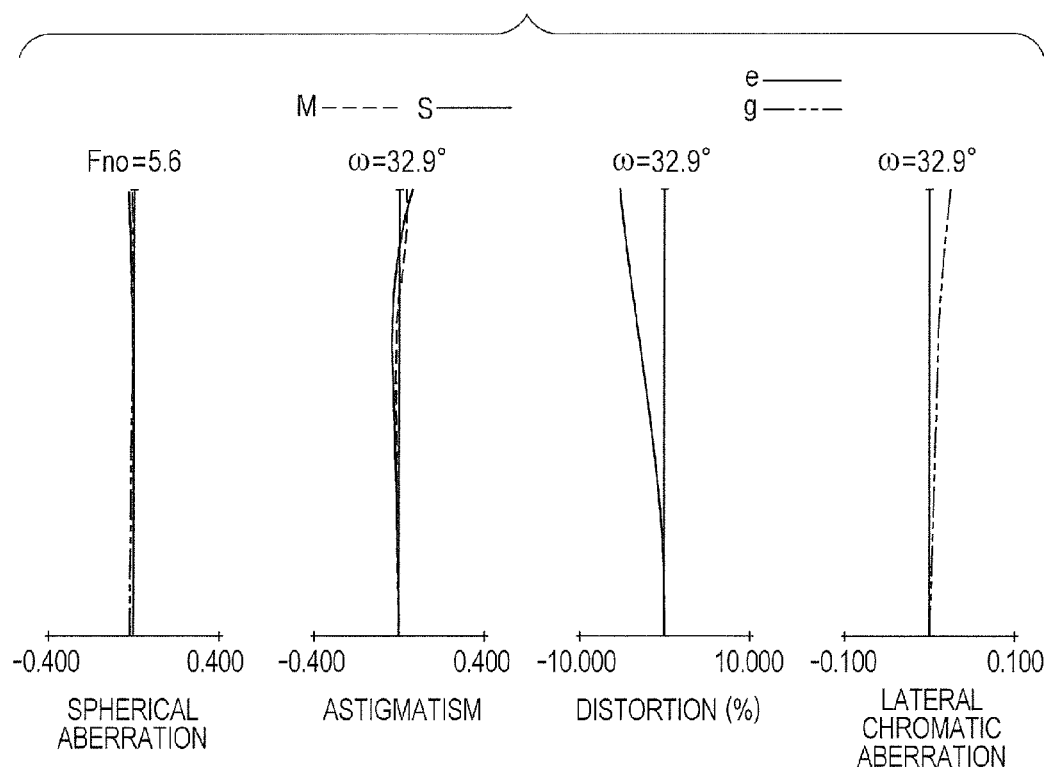
FIG. 20A is an aberration diagram in the state in which focus is at infinity at the wide angle end according to Numerical Embodiment 10.
Figure 20B:
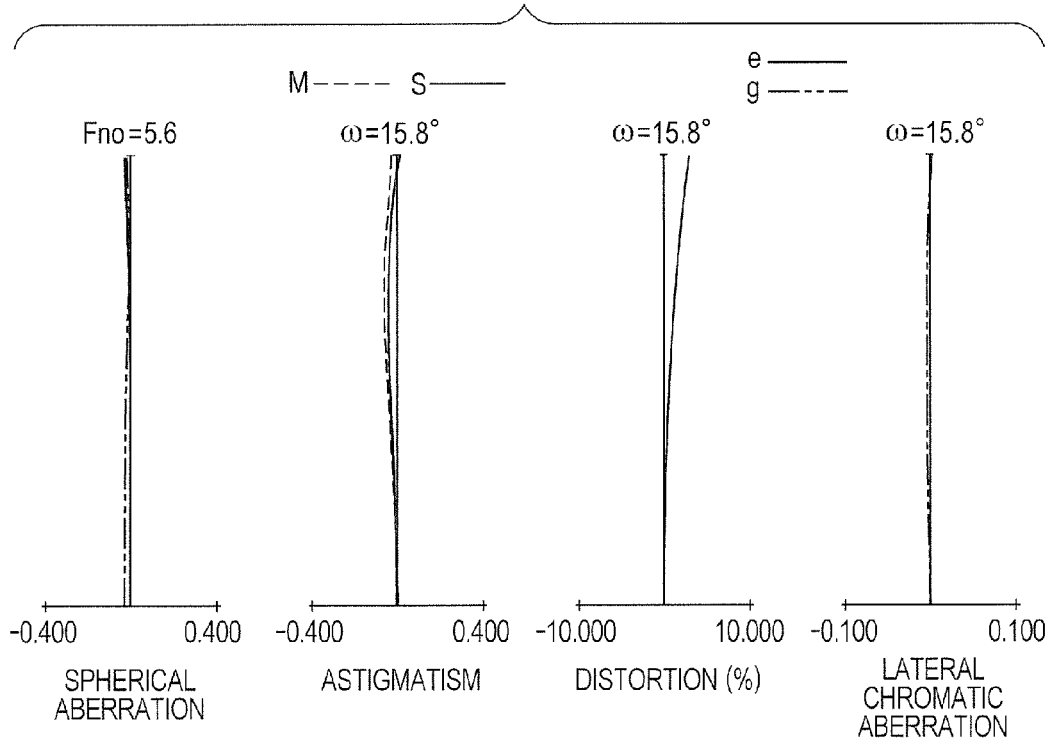
FIG. 20B is an aberration diagram in the state in which focus is at infinity at an intermediate zoom position according to Numerical Embodiment 10.
Figure 20C:
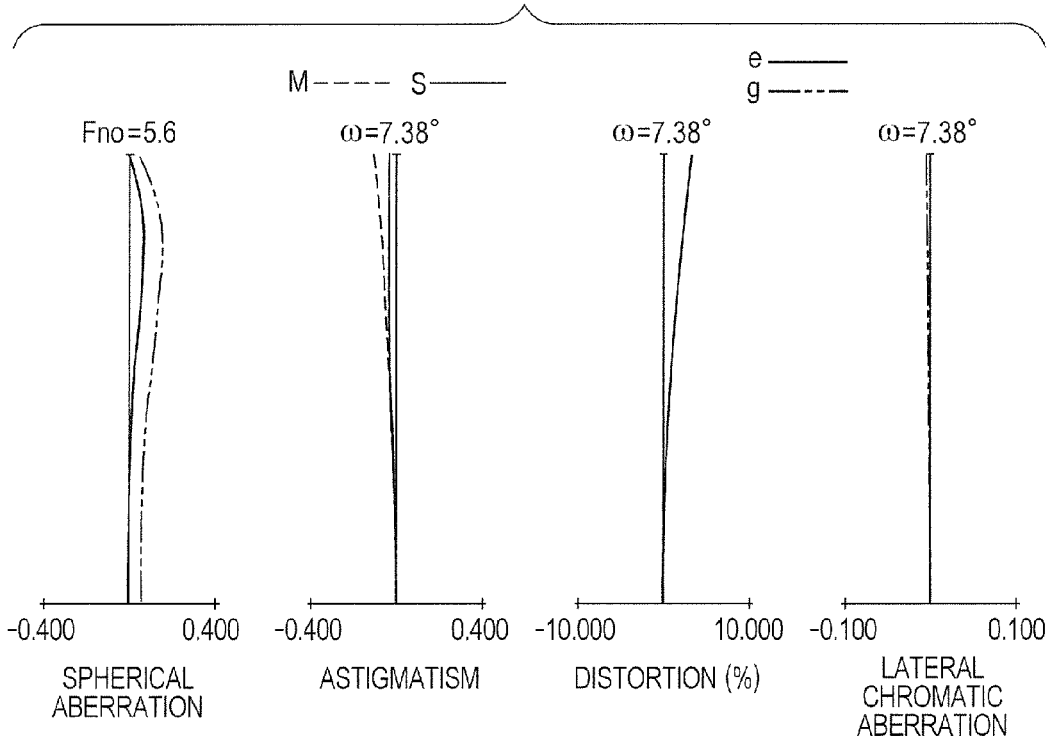
FIG. 20C is an aberration diagram in the state in which focus is at infinity at a telephoto end according to Numerical Embodiment 10.

FIG. 19 is a lens cross-sectional view when the focus is at the infinity at the wide angle end in the zoom lens according to Embodiment 10 (Numerical Embodiment 10) of the present invention. FIG. 20A is a longitudinal aberration diagram at the wide angle end of Numerical Embodiment 10. FIG. 20B is a longitudinal aberration diagram at a focal length of 55 mm of Numerical Embodiment 10. FIG. 20C is a longitudinal aberration diagram at the telephoto end of Numerical Embodiment 10. Each of the aberration diagrams is a longitudinal aberration diagram when the focus is at the infinity.

In FIG. 19, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, and a third lens unit U3 having a positive refractive power, which is configured to move toward the object side during zooming. The zoom lens further includes a fourth lens unit U4 having a positive refractive power, which is configured to move nonlinearly on the optical axis in conjunction with the movements of the second lens unit U2 and the third lens unit U3 to correct the image plane variation accompanying zooming. The zoom lens further includes a fifth lens unit U5, which is configured not to move for zooming and has an action of forming an image. In this Embodiment, the rear lens unit corresponds to the fifth lens unit U5.

In this Embodiment, the second lens unit U2, the third lens unit U3, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the sixteenth to twenty-second surfaces, the third lens unit U3 corresponds to the twenty-fourth and twenty-fifth surfaces, and the fourth lens unit U4 corresponds to the twenty-sixth to thirtieth surfaces. The fifth lens unit U5 corresponds to thirty-first to thirty-fifth surfaces. The first lens unit U1 includes convex lenses and concave lenses, and includes eight lenses in total. The second lens unit U2 includes a convex lens and concave lenses, and includes four lenses in total. The third lens unit U3 includes one convex lens. The fourth lens unit U4 includes convex lenses and a concave lens, and includes three lenses in total. Moreover, the fifth lens unit U5 includes a convex lens and concave lenses, and includes three lenses in total.

In Table 1, values corresponding to the conditional expressions of this Embodiment are shown. Embodiment 1 satisfies the conditional expressions (1) to (5), and achieves both the photographing angle of view (angle of view) of 65.9 degrees at the wide angle end and the zooming ratio of 5, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 11

Figure 21:
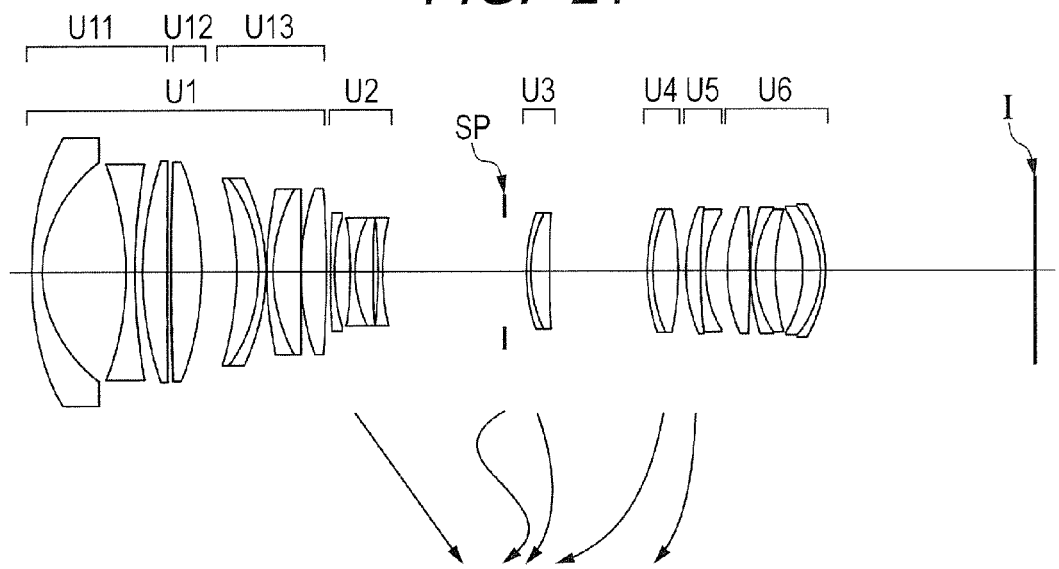
FIG. 21 is a lens cross-sectional view in the state in which focus is at infinity at a wide angle end according to Embodiment 11 (Numerical Embodiment 11) of the present invention.
Figure 22A:
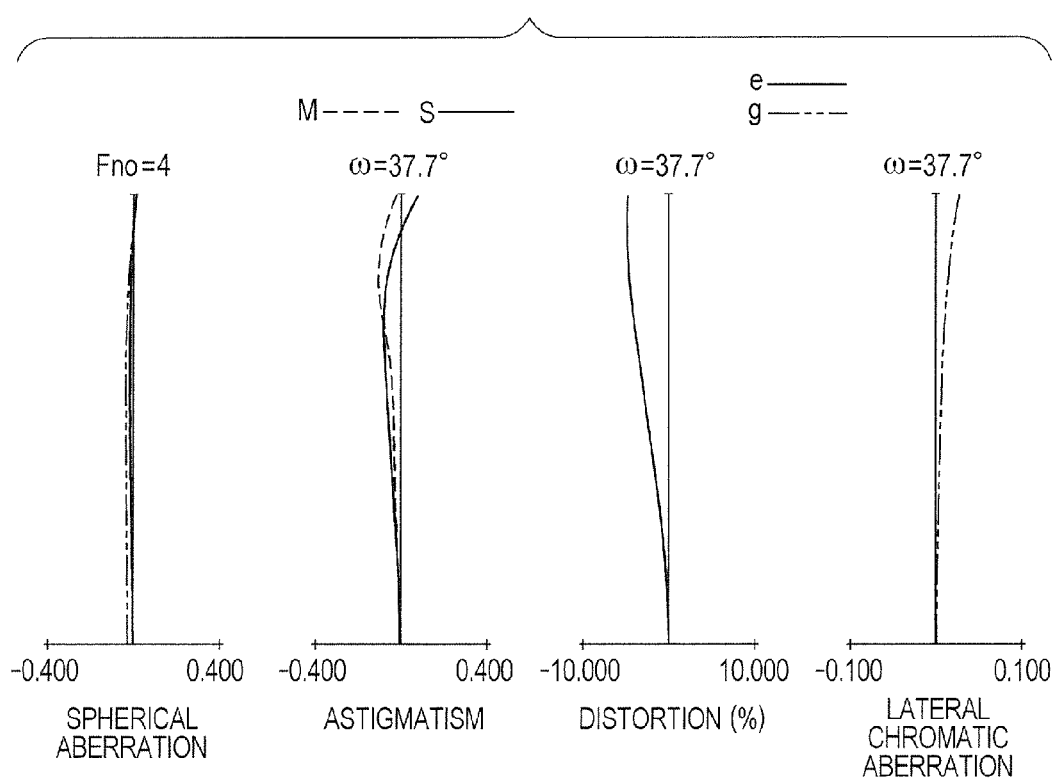
FIG. 22A is an aberration diagram in the state in which focus is at infinity at the wide angle end according to Numerical Embodiment 11.
Figure 22B:
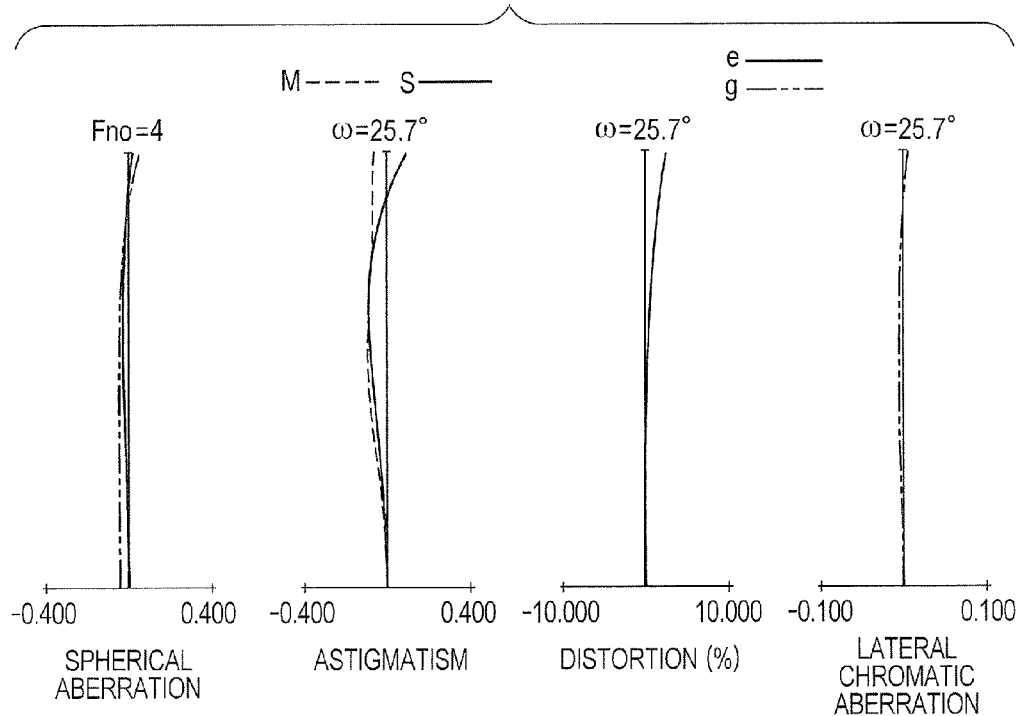
FIG. 22B is an aberration diagram in the state in which focus is at infinity at an intermediate zoom position according to Numerical Embodiment 11.
Figure 22C:
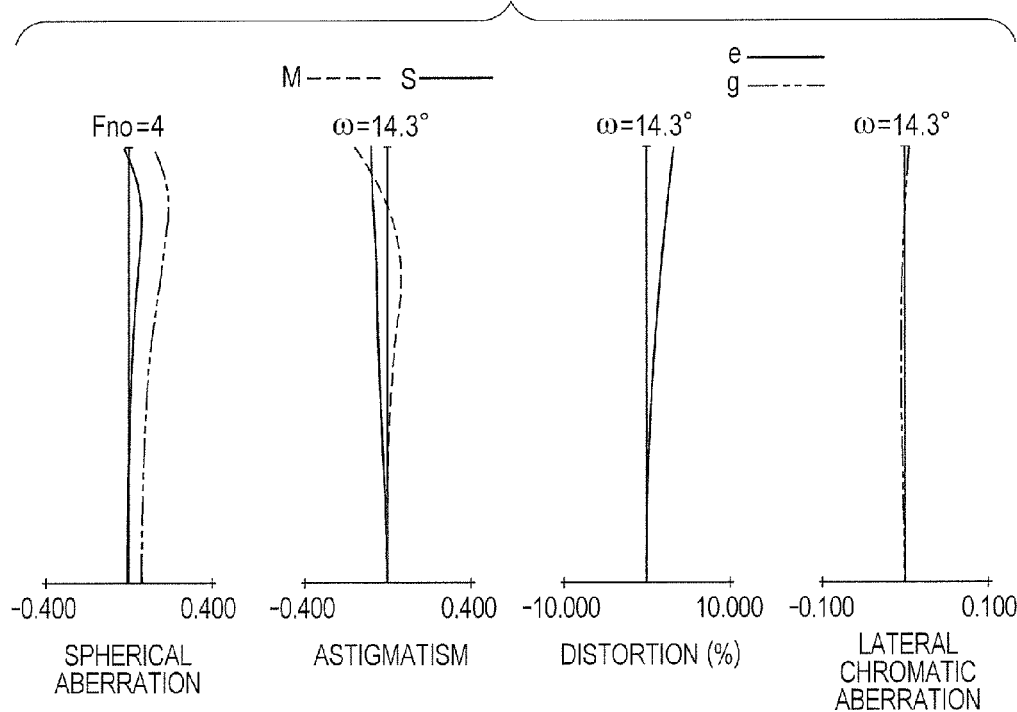
FIG. 22C is an aberration diagram in the state in which focus is at infinity at a telephoto end according to Numerical Embodiment 11.

FIG. 21 is a lens cross-sectional view when the focus is at the infinity at the wide angle end in the zoom lens according to Embodiment 11 (Numerical Embodiment 11) of the present invention. FIG. 22A is a longitudinal aberration diagram at the wide angle end of Numerical Embodiment 11. FIG. 22B is a longitudinal aberration diagram at a focal length of 45 mm of Numerical Embodiment 11. FIG. 22C is a longitudinal aberration diagram at the telephoto end of Numerical Embodiment 11. Each of the aberration diagrams is a longitudinal aberration diagram when the focus is at the infinity.

In FIG. 21, the zoom lens includes, in order from the object side to the image side, a first lens unit U1 for focusing, which has a positive refractive power. The zoom lens also includes a second lens unit U2 for zooming, which has a negative refractive power and is configured to move toward the image side during zooming from the wide angle end to the telephoto end, a third lens unit U3 having a positive refractive power, which is configured to move toward the object side during zooming, and a fourth lens unit U4 having a positive refractive power, which is configured to move toward the object side during zooming. The zoom lens further includes a fifth lens unit U5 having a negative refractive power, which is configured to move nonlinearly on the optical axis in conjunction with the movements of the second lens unit U2, the third lens unit U3, and the fourth lens unit U4 to correct the image plane variation accompanying zooming. The zoom lens further includes a sixth lens unit U6, which is configured not to move for zooming and has an action of forming an image. In this Embodiment, the rear lens unit corresponds to the fifth lens unit U5 and the sixth lens unit U6.

In this Embodiment, the second lens unit U2, the third lens unit U3, the fourth lens unit U4, and the fifth lens unit U5 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a sixteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The second lens unit U2 corresponds to the seventeenth to twenty-third surfaces, the third lens unit U3 corresponds to the twenty-fifth to twenty-seventh surfaces, and the fourth lens unit U4 corresponds to the twenty-eighth to thirtieth surfaces. The fifth lens unit U5 corresponds to the thirty-first to thirty-third surfaces, and the sixth lens unit U6 corresponds to the thirty-fourth to forty-first surfaces. The first lens unit U1 includes convex lenses and concave lenses, and includes nine lenses in total. The second lens unit U2 includes a convex lens and concave lenses, and includes four lenses in total. The third lens unit U3 includes a convex lens and a concave lens, and includes two lenses in total. The fourth lens unit U4 includes a convex lens and a concave lens, and includes two lenses in total. Moreover, the fifth lens unit U5 includes a convex lens and a concave lens, and includes two lenses in total, and the sixth lens unit U6 includes convex lenses and concave lenses, and includes five lenses in total.

In Table 1, values corresponding to the conditional expressions of this Embodiment are shown. This Embodiment satisfies the conditional expressions (1) to (5), and achieves both the photographing angle of view (angle of view) of 75.4 degrees at the wide angle end and the zooming ratio of 3.04, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

Embodiment 12

Figure 23:
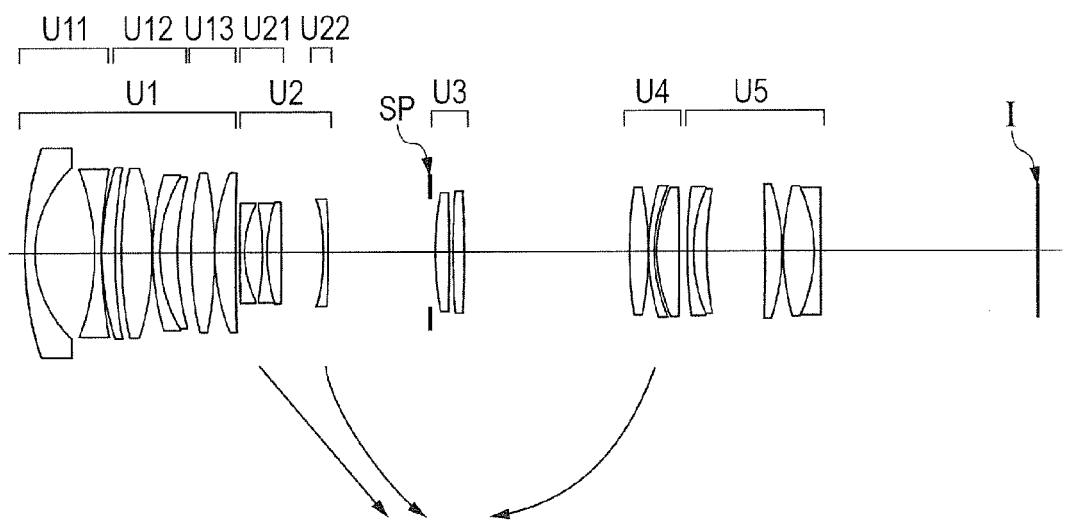
FIG. 23 is a lens cross-sectional view in the state in which focus is at infinity at a wide angle end according to Embodiment 12 (Numerical Embodiment 12) of the present invention.
Figure 24A:
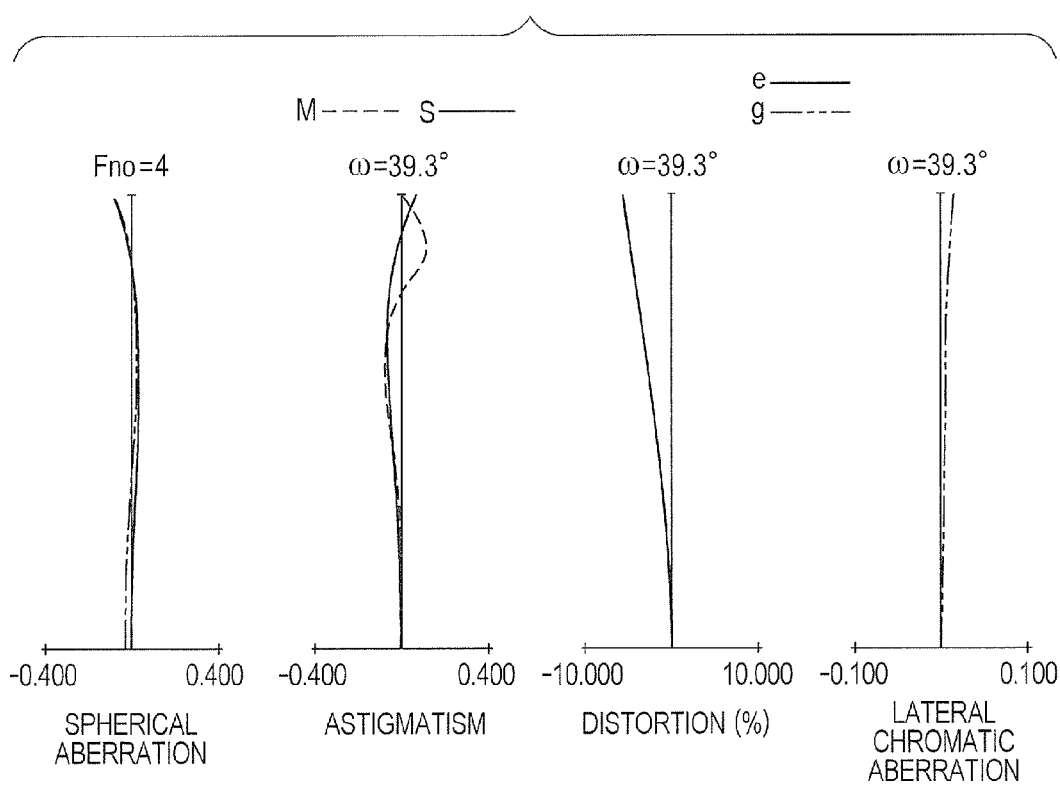
FIG. 24A is an aberration diagram in the state in which focus is at infinity at the wide angle end according to Numerical Embodiment 12.
Figure 24B:
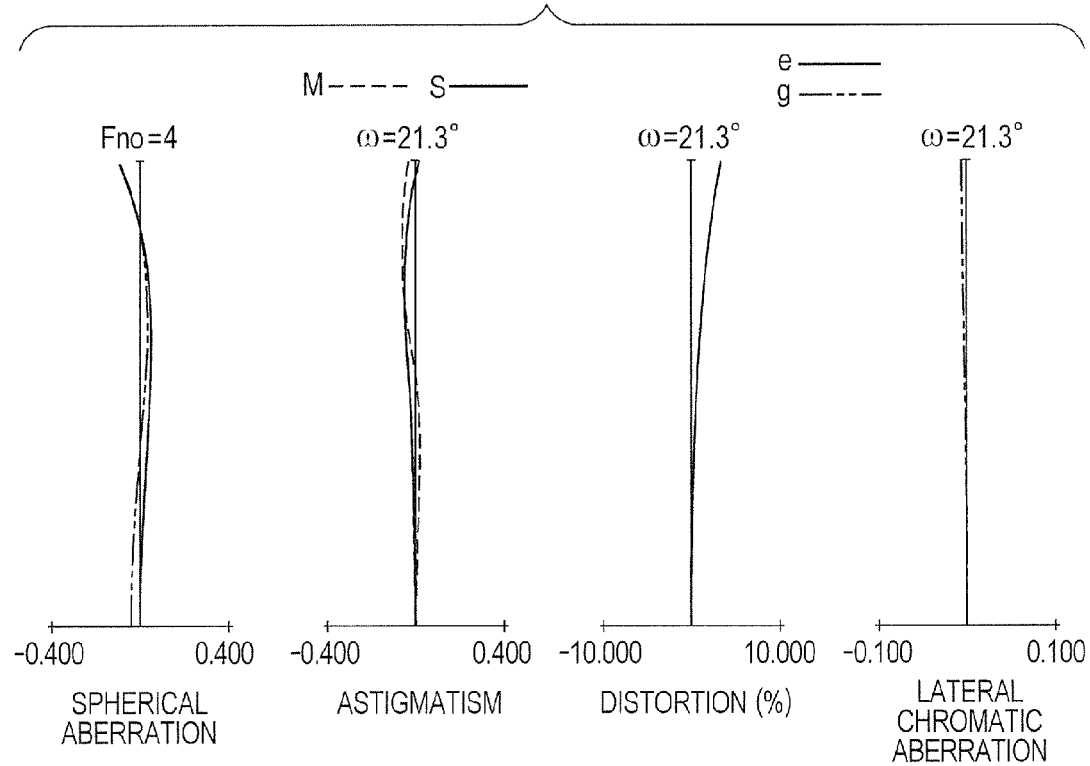
FIG. 24B is an aberration diagram in the state in which focus is at infinity at an intermediate zoom position according to Numerical Embodiment 12.
Figure 24C:
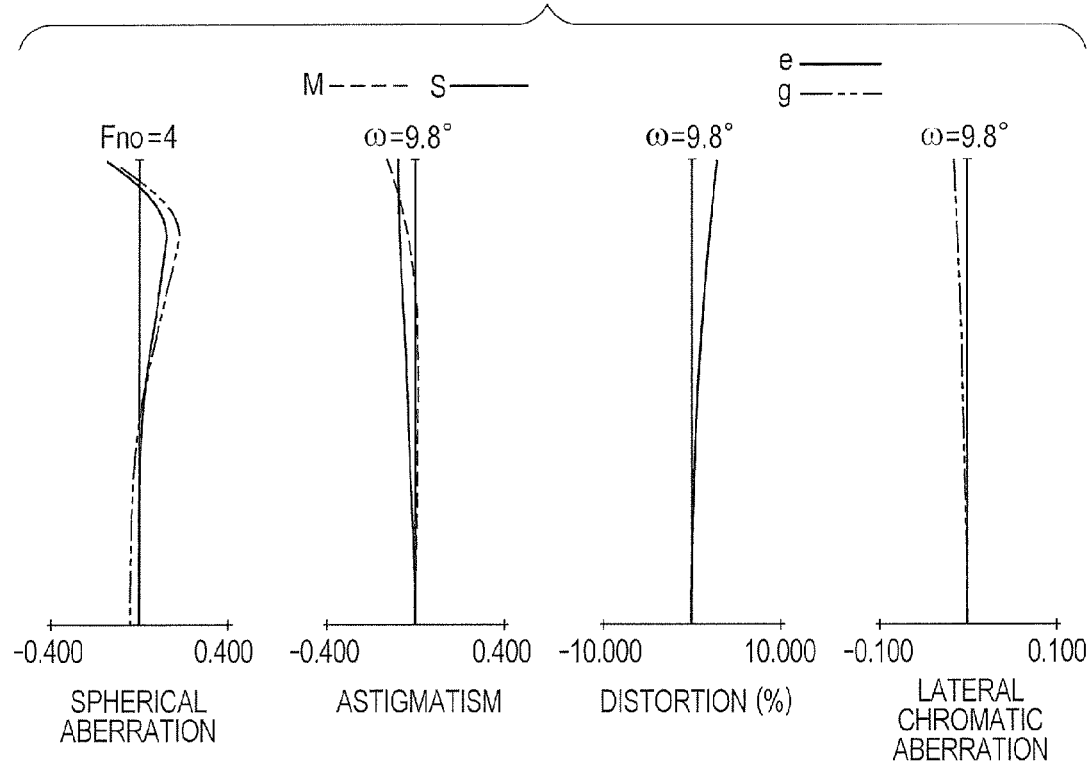
FIG. 24C is an aberration diagram in the state in which focus is at infinity at a telephoto end according to Numerical Embodiment 12.

FIG. 23 is a lens cross-sectional view when the focus is at the infinity at the wide angle end in the zoom lens according to Embodiment 12 (Numerical Embodiment 12) of the present invention. FIG. 24A is a longitudinal aberration diagram at the wide angle end of Numerical Embodiment 12. FIG. 24B is a longitudinal aberration diagram at a focal length of 40 mm of Numerical Embodiment 12. FIG. 24C is a longitudinal aberration diagram at the telephoto end of Numerical Embodiment 12. Each of the aberration diagrams is a longitudinal aberration diagram when the focus is at the infinity.

In FIG. 23, the zoom lens includes, in order from the object side to the image side, a first lens unit U1 for focusing, which has a positive refractive power. The zoom lens also includes a first lens sub-unit U21 for zooming, which has a negative refractive power and is configured to move toward the image side during zooming from the wide angle end to the telephoto end, and a second lens sub-unit U22 for zooming, which has a negative refractive power and is configured to move toward the object side during zooming. The first lens sub-unit U21 and the second lens sub-unit U22 are configured to move along mutually different loci during zooming. The zoom lens further includes a fourth lens unit U4 having a positive refractive power, which is configured to move nonlinearly on the optical axis in conjunction with the movements of the first lens sub-unit U21 and the second lens sub-unit U22 to correct the image plane variation accompanying zooming. The zoom lens further includes a third lens unit U3 and a fifth lens unit U5, which are configured not to move for zooming. In this Embodiment, the second lens unit corresponds to the first lens sub-unit U21 and the second lens sub-unit U22, and the rear lens unit corresponds to the fifth lens unit U5.

In this Embodiment, the first lens sub-unit U21, the second lens sub-unit U22, and the fourth lens unit U4 form a zooming system. An aperture stop SP is arranged between the second lens unit U2 and the third lens unit U3. The aperture stop may be changed in aperture diameter depending on zooming to maintain a predetermined F-number. Moreover, the aperture stop is configured not to move in the optical axis direction during zooming.

Next, the first lens unit U1 of this Embodiment is described. The first lens unit U1 corresponds to a first surface to a fifteenth surface. The first lens unit U1 includes a first lens sub-unit U11 having a negative refractive power, which is configured not to move for focusing, a second lens sub-unit U12 having a positive refractive power, which is configured to move to the image side during focusing from the infinity side to the proximity side, and a third lens sub-unit U13 having a positive refractive power. The third lens sub-unit U13 may be configured to move in conjunction with the second lens sub-unit U12 during focusing. The first lens sub-unit U21 corresponds to the sixteenth to twentieth surfaces, the second lens sub-unit U22 corresponds to the twenty-first and twenty-second surfaces, the third lens unit U3 corresponds to the twenty-fourth and twenty-seventh surfaces, and the fourth lens unit U4 corresponds to the twenty-eighth to thirty-third surfaces. The fifth lens unit U5 corresponds to thirty-fourth to forty-first surfaces. The first lens unit U1 includes convex lenses and concave lenses, and includes eight lenses in total. The first lens sub-unit U21 includes a convex lens and concave lenses, and includes three lenses in total. The second lens sub-unit U22 includes one convex lens. The third lens unit U3 includes two convex lens. The fourth lens unit U4 includes convex lenses and a concave lens, and includes three lenses in total. Moreover, the fifth lens unit U5 includes convex lenses and concave lenses, and includes five lenses in total.

In Table 1, values corresponding to the conditional expressions of this Embodiment are shown. This Embodiment satisfies the conditional expressions (1), (2), and (5), and achieves both the photographing angle of view (angle of view) of 78.6 degrees at the wide angle end and the zooming ratio of 4.74, that is, the wide angle of view and the high magnification. In addition, there is achieved the zoom lens, which is configured to satisfactorily correct various aberrations over the entire zoom range, to thereby achieve both the high optical performance and the reductions in size and weight. There is also achieved the zoom lens securing the sufficiently long back focus.

The zoom lens according to each of Embodiments 13 to 19 of the present invention includes, in order from the object side to the image side, a first lens unit having the positive refractive power, which is configured not to move during zooming. The zoom lens also includes a second lens unit having a negative refractive power, which is configured to move during zooming, a third lens unit having a positive refractive power, which is configured to move during zooming, a fourth lens unit having a positive refractive power, and a fifth lens unit. Moreover, an interval between each pair of all lens units is changed during zooming.

The third lens unit is configured to pass through a point at which a distance between a surface closest to the image side of the first lens unit and a surface closest to the object side of the third lens unit on the optical axis becomes wider than at the wide angle end at least once during zooming. More specifically, the third lens unit is configured to move along a locus having a zoom position at which the distance from the surface closest to the image side of the first lens unit to the surface closest to the object side of the third lens unit on the optical axis is longer than at the wide angle end during zooming.

The phrase: "the respective lens units are configured not to move during zooming" means that the lens units are not driven for the purpose of zooming, but in a case where zooming and focusing are performed at the same time, the lens units may be moved for focusing.

Figure 27:
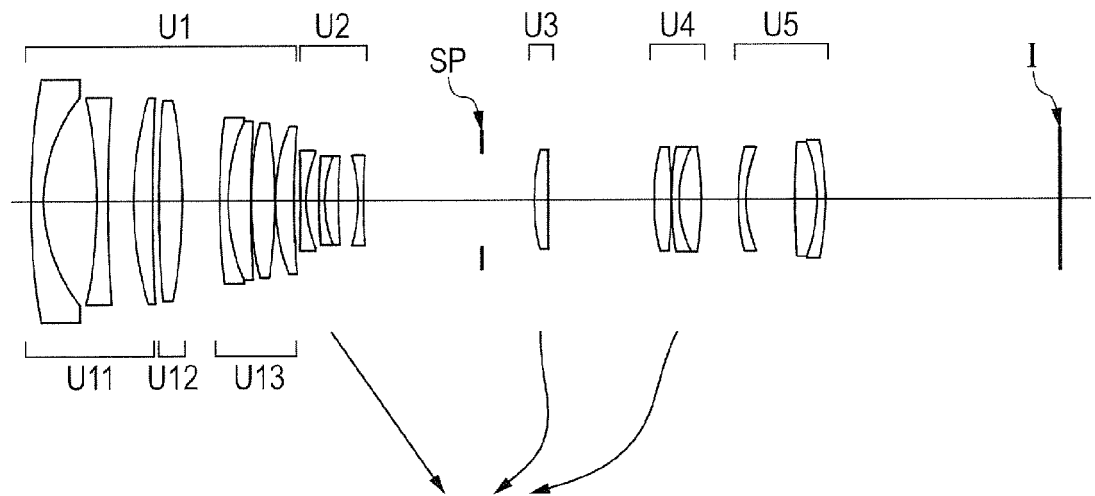
FIG. 27 is a lens cross-sectional view in the state in which focus is at the object at infinity at a wide angle end according to Embodiment 14 (Numerical Embodiment 14) of the present invention.
Figure 37:
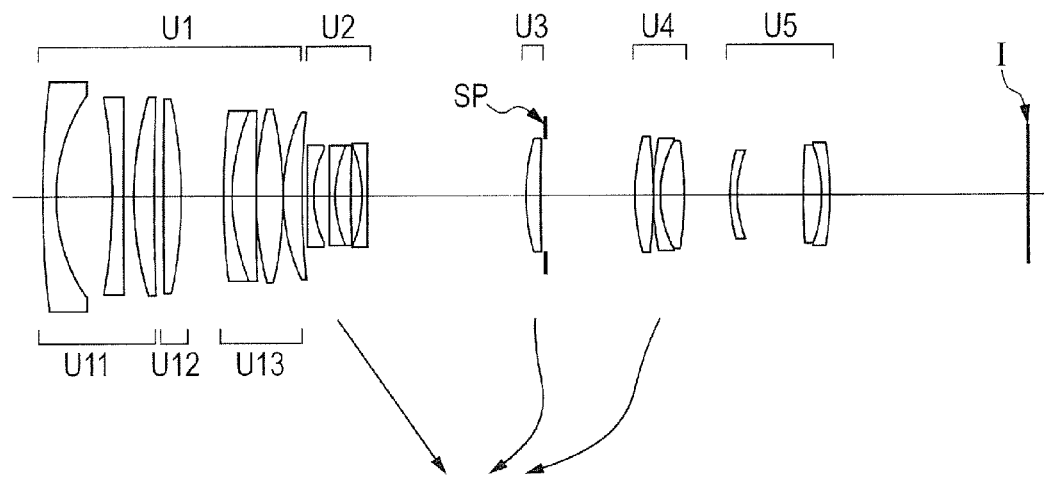
FIG. 37 is a lens cross-sectional view in the state in which focus is at the object at infinity at a wide angle end according to Embodiment 19 (Numerical Embodiment 19) of the present invention.

In each lens cross-sectional view, the left side is the subject (object) side (front side), and the right side is the image side (rear side). In the lens cross-sectional view, a first lens unit U1 (front lens unit) having a positive refractive power is configured not to move during zooming. In the zoom lens according to each of Embodiments 13 and 15 to 18, which are illustrated in FIG. 25, FIG. 29, FIG. 31, FIG. 33, and FIG. 35, respectively, a focus lens unit U12 in the first lens unit U1 is configured to move toward the image side during focusing from an object at infinity to an object at a short distance. Fixed units U11 and U13 in the first lens unit U1 are configured not to move during focusing. In the zoom lens according to each of Embodiments 14 and 19, which are illustrated in FIG. 27 and FIG. 37, respectively, focus lens units U12 and U13 in the first lens unit U1 are configured to move in conjunction toward the image side and the subject side, respectively, during focusing from the object at infinity to the object at the short distance. A fixed lens unit U11 in the first lens unit U1 is configured not to move during focusing.

Figure 25:
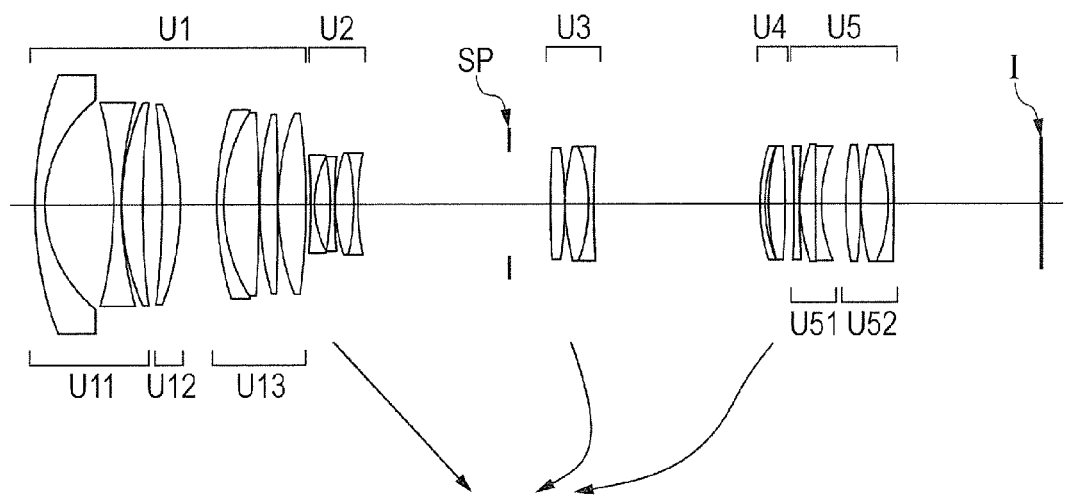
FIG. 25 is a lens cross-sectional view in the state in which focus is at an object at infinity at a wide angle end according to Embodiment 13 (Numerical Embodiment 13) of the present invention.

Three lens units U2, U3, and U4 form a zoom system (zooming lens unit). A fifth lens unit U5 (relay lens unit) performs an action of forming an image during zooming. In FIG. 25, a vibration isolation lens unit U51 in the fifth lens unit U5 is configured to move in a direction orthogonal to the optical axis. A fixed lens unit U52 in the fifth lens unit U5 is configured not to move for vibration isolation.

A stop (aperture stop) is denoted by SP. In Embodiment 16 illustrated in FIG. 31, the aperture stop SP is configured to move in conjunction with the zoom system (zooming lens unit) during zooming.

When used as an image pickup optical system for a broadcasting television camera, a cinema camera, a video camera, or a digital still camera, an image plane I corresponds to an image pickup surface of a solid state image pickup element (photoelectric transducer) or the like configured to receive light of an image formed by the zoom lens and to convert light to electricity. When used as an image pickup optical system for a film camera, the image plane I corresponds to a film surface on which the image formed by the zoom lens is exposed.

In the aberration diagrams, spherical aberrations are illustrated with respect to e-line, g-line, C-line, and F-line by a solid line, a two-dot chain line, a one-dot chain line, and a broken line, respectively. Further, astigmatisms are illustrated on a meridional image plane by a broken line and on a sagittal image plane by a solid line. In addition, lateral chromatic aberrations are illustrated with respect to g-line, C-line, and F-line by a two-dot chain line, a one-dot chain line, and a broken line, respectively. A half angle of view is denoted by ω and an F-number is denoted by Fno. In each of Embodiments described below, a case where a lens unit for zooming is arranged closest to a short focus side is referred to as the wide angle end, and a case where the lens unit is arranged closest to a long focus side is referred to as the telephoto end.

The zoom lens according to the present invention includes, in order from the object side to the image side, a first lens unit having the positive refractive power, which is configured not to move for zooming. The zoom lens also includes a second lens unit having a negative refractive power, which is configured to move during zooming, a third lens unit having a positive refractive power, which is configured to move during zooming, a fourth lens unit having a positive refractive power, and a fifth lens unit. Moreover, an interval between each pair of all lens units is changed during zooming.

The third lens unit is configured to pass through a point at which a distance between a surface closest to the image side of the first lens unit and a surface closest to the object side of the third lens unit on the optical axis becomes wider than at the wide angle end at least once during zooming. More specifically, the third lens unit is configured to move along a locus having a zoom position at which the distance from the surface closest to the image side of the first lens unit to the surface closest to the object side of the third lens unit on the optical axis is longer than at the wide angle end during zooming.

Distances between the surface closest to the image side of the first lens unit and a surface closest to the object side of the fourth lens unit on the optical axis at the wide angle end and the telephoto end are represented by Lw and Lt, respectively. Distances between a surface closest to the image side of the third lens unit and the surface closest to the object side of the fourth lens unit on the optical axis at the wide angle end and the telephoto end are represented by Dw and Dt, respectively. Focal lengths of the first lens unit and the second lens unit are represented by f1 and f2, respectively.

At this time, the following conditions are satisfied:

$$1.0 < Lw/Lt < 10.0 \qquad (9)$$

$$1.0 < Dw/Dt < 100.0 \qquad (10)$$

$$-5.0 < f1/f2 < -0.5 \qquad (11).$$

The conditional expression (9) defines the distances between the surface closest to the image side of the first lens unit and the surface closest to the object side of the fourth lens unit on the optical axis at the wide angle end and the telephoto end. However, the first lens unit is configured not to move during zooming, and hence the conditional expression (9) defines in effect a relationship between the wide angle end and the telephoto end of the fourth lens unit. In the zoom lens in each of Embodiments, appropriate setting of the movement locus of the fourth lens unit is an important factor in achieving both the high optical performance and the downsizing. The conditional expression (9) may be satisfied to suppress the increase in size of the zoom lens and to satisfactorily correct various aberrations.

When the ratio exceeds the upper limit of the conditional expression (9), the movement amount of the fourth lens unit during zooming becomes much larger, and hence a total length is increased, with the result that the zoom lens is disadvantageously increased in size. When the ratio falls below the lower limit of the conditional expression (9), a change in lateral magnification of the fourth lens unit becomes much smaller during zooming, and hence it becomes difficult to suppress various aberrations, in particular, to suppress chromatic aberration on the telephoto side.

It is more preferred to set the numerical range of the conditional expression (9) as follows:

$$1.2 < Lw/Lt < 2.5 \qquad (9a).$$

The conditional expression (10) defines the distances between the surface closest to the image side of the third lens unit and the surface closest to the object side of the fourth lens unit on the optical axis at the wide angle end and the telephoto end. In the zoom lens in each of Embodiments, appropriate setting of a relationship between the third lens unit and the fourth lens unit is an important factor in achieving both the high optical performance and the downsizing. The conditional expression (10) may be satisfied to suppress the increase in size of the zoom lens and to satisfactorily correct various aberrations.

When the ratio exceeds the upper limit of the conditional expression (10), the distance between the third lens unit and the fourth lens unit on the optical axis relatively changes too much during zooming, and hence the total length is increased, with the result that the zoom lens is disadvantageously increased in size. In another case, the interval between the lens units becomes much closer at the telephoto end, and when driven at high speed, glasses are disadvantageously brought into contact with each other. When the ratio falls below the lower limit of the conditional expression (10), the distance between the third lens unit and the fourth lens unit on the optical axis becomes larger at the telephoto end than at the wide angle end during zooming, and hence it becomes difficult to suppress various aberrations caused by zooming.

It is more preferred to set the numerical range of the conditional expression (10) as follows:

$$3.0 < Dw/Dt < 50.0 \tag{10a}$$

The conditional expression (11) defines a ratio between the focal lengths of the first lens unit and the second lens unit. In the zoom lens in each of Embodiments, appropriate setting of the ratio between the first lens unit and the second lens unit is an important factor in achieving both the high optical performance and the downsizing. The conditional expression (11) may be satisfied to suppress the increase in size of the zoom lens and to satisfactorily correct various aberrations.

When the ratio exceeds the upper limit of the conditional expression (11), the focal length of the second lens unit becomes relatively much longer, and hence the movement amount of the second lens unit is increased, with the result that the zoom lens is disadvantageously increased in size. When the ratio falls below the lower limit of the conditional expression (11), the focal length of the second lens unit becomes relatively much shorter, and hence it becomes difficult to suppress variations in various aberrations caused by zooming.

It is more preferred to set the numerical range of the conditional expression (11) as follows:

$$-2.7 < f1/f2 < -0.7 \tag{11a}$$

In each Embodiment of the present invention, the above-mentioned conditions may be satisfied to obtain small and lightweight zoom lens in which aberrations are satisfactorily corrected over the entire zoom range.

It is further preferred that, when focal lengths at the wide angle end and the telephoto end are represented by fw and ft, respectively, the zoom lens according to the present invention satisfy the following conditions:

$$0.1 < fw/f1 < 1.5 \tag{12}$$

$$2.0 < ft/fw < 30.0 \tag{13}$$

The conditional expression (12) defines a ratio between the focal length at the wide angle end and the focal length of the first lens unit.

When the ratio exceeds the upper limit condition of the conditional expression (12), the focal length of the first lens unit becomes relatively much shorter, and hence it becomes difficult to suppress various aberrations, in particular, to suppress chromatic aberration on the telephoto side. When the ratio falls below the lower limit condition of the conditional expression (12), the focal length of the first lens unit becomes relatively much longer, and hence the lens diameter of the first lens unit becomes larger, with the result that it becomes difficult to achieve both the wide angle and the downsizing.

It is more preferred to set the numerical range of the conditional expression (12) as follows:

$$0.3 < fw/f1 < 1.0 \tag{12a}$$

The conditional expression (13) defines a ratio between the focal length at the wide angle end and the focal length at the telephoto end.

When the ratio exceeds the upper limit of the conditional expression (13), the movement amount of the lens unit configured to move during zooming is increased, and hence the zoom lens is disadvantageously increased in size. When the ratio falls below the lower limit of the conditional expression (13), the zoom ratio is too low, and thus usability is low.

It is more preferred to set the numerical range of the conditional expression (13) as follows:

$$2.5 < ft/fw < 15.0 \tag{13a}$$

It is further preferred that, when a focal length of the third lens unit is represented by f3 and a focal length of the fourth lens unit is represented by f4, the zoom lens according to the present invention satisfy the following condition:

$$0.1 < f3/f4 < 5.0 \tag{14}$$

The conditional expression (14) defines a ratio between the focal lengths of the third lens unit and the fourth lens unit.

When the ratio exceeds the upper limit of the conditional expression (14), the focal length of the third lens unit becomes relatively much longer, and hence the movement amount is increased during zooming, with the result that the zoom lens is increased in size. When the ratio falls below the lower limit of the conditional expression (14), the focal length of the third lens unit becomes relatively much shorter, and hence it becomes difficult to suppress various aberrations caused by zooming. Moreover, the effect of a manufacturing error on performance becomes more significant, and hence a reduction in performance due to manufacturing variations becomes larger.

It is more preferred to set the numerical range of the conditional expression (14) as follows:

$$0.3 < f3/f4 < 3.0 \tag{14a}$$

It is further preferred that, when distances between the surface closest to the image side of the first lens unit and the surface closest to the object side of the third lens unit on the optical axis at the wide angle end and a zoom position at which the distance is longest are represented by Mw and Mmax, respectively, the zoom lens according to the present invention satisfy the following condition:

$$0.0 < (Mmax - Mw)/Mw < 1.0 \tag{15}$$

The conditional expression (15) defines a distance between the surface closest to the image side of the first lens unit and the surface closest to the object side of the third lens unit on the optical axis at the wide angle end and at the zoom position at which the distance becomes the widest. However, the first lens unit is configured not to move for zooming, and hence the conditional expression (15) defines in effect a relationship between the wide angle end and the zoom position at which the distance becomes the widest of the third lens unit.

When the ratio exceeds the upper limit of the conditional expression (15), the nonlinear movement amount of the third lens unit is increased too much, and hence becomes difficult to control. Moreover, the third lens unit is brought too close to the fourth lens unit, and when driven at high speed, glasses are disadvantageously brought into contact with each other. When the ratio falls below the lower limit of the conditional expression (15), the focal length of the third lens unit becomes much shorter, and hence it becomes difficult to suppress various aberrations caused by zooming. Moreover, the effect of the manufacturing error on the performance becomes more significant, and hence the reduction in performance due to the manufacturing variations becomes larger.

It is more preferred to set the numerical range of the conditional expression (15) as follows:

$$2.0 \times 10^{-2} < (M\text{max} - Mw)/Mw < 5.0 \times 10^{-1} \quad (15a).$$

It is further preferred that the zoom lens according to the present invention further include an aperture stop arranged between the second lens unit and the third lens unit or within the third lens unit. In this manner, it becomes easier to achieve both the reduction in diameter of the first lens unit and a high magnification.

It is further preferred that, in the zoom lens according to the present invention, the aperture stop be configured not to move for zooming. In this manner, wiring for controlling the stop becomes easier (Embodiments 13 to 15 and 17 to 19).

It is further preferred that, in the zoom lens according to the present invention, the third lens unit include one lens. As a result, the third lens unit is reduced in weight, and a load of control is reduced even in a case where the third lens unit is configured to move reciprocally (Embodiments 14 and 16 to 19).

It is further preferred that, in the zoom lens according to the present invention, the fourth lens unit include one lens having a positive refractive power and one lens having a negative refractive power. As a result, variations in various aberrations caused by zooming may be suppressed. Moreover, the fourth lens unit is reduced in weight and may be driven at high speed (Embodiments 13, 15, and 17).

It is further preferred that, in the zoom lens according to the present invention, the fifth lens unit be configured not to move for zooming. As a result, control becomes easier. Moreover, in Embodiment 13, provision of the vibration isolation lens unit becomes easier.

Next, features of lens configurations in each of Embodiments are described.

Embodiment 13

Figure 26A:
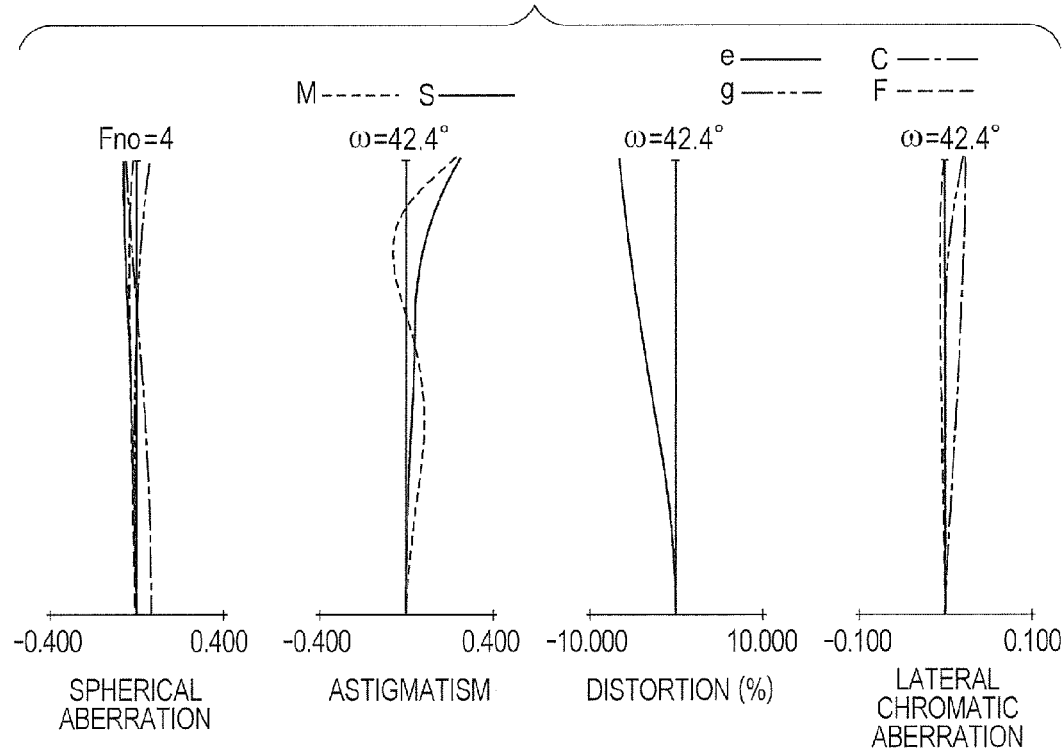
FIG. 26A is an aberration diagram in the state in which focus is at the object at infinity at the wide angle end according to Numerical Embodiment 13.
Figure 26B:
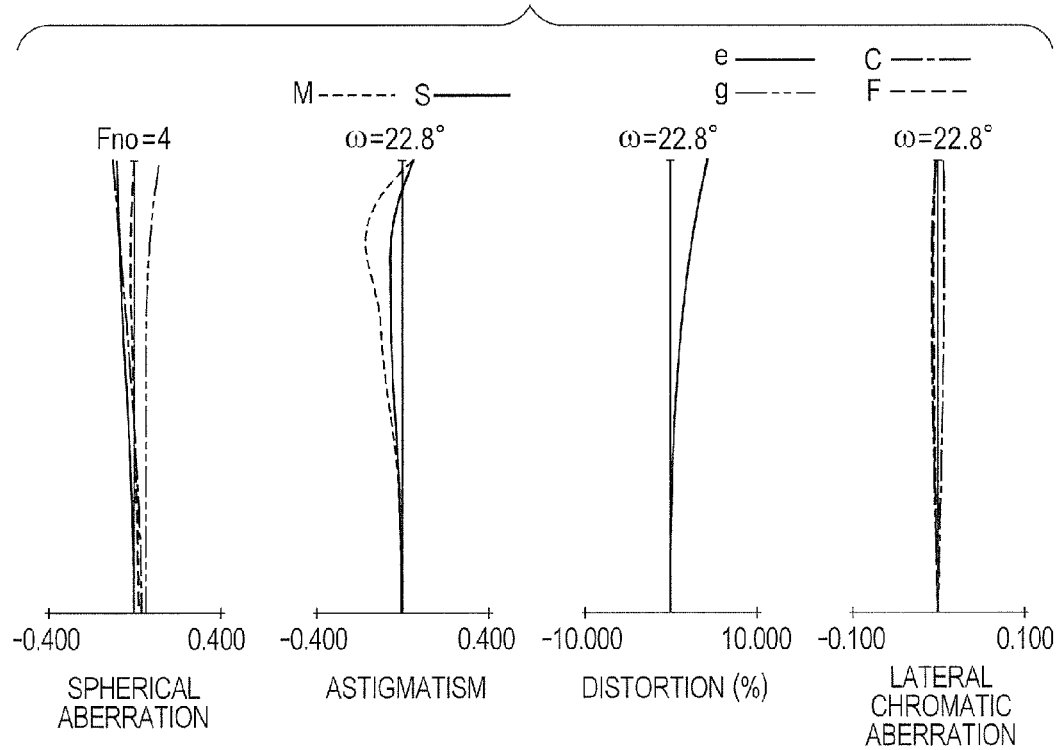
FIG. 26B is an aberration diagram in the state in which focus is at the object at infinity at an intermediate zoom position according to Numerical Embodiment 13.
Figure 26C:
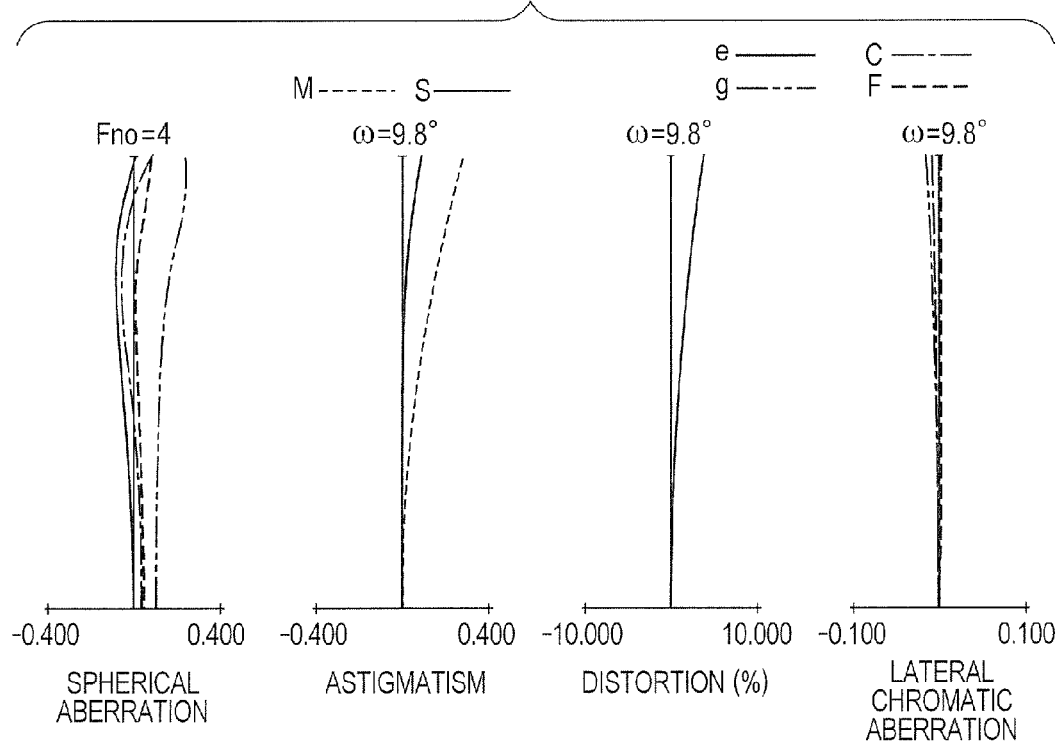
FIG. 26C is an aberration diagram in the state in which focus is at the object at infinity at a telephoto end according to Numerical Embodiment 13.

FIG. 25 is a lens cross-sectional view of a zoom lens according to Embodiment 13 (Numeral Embodiment 13) of the present invention at a wide angle end (focal distance f=17.00 mm) in the state in which focused is at an object at infinity. FIG. 26A, FIG. 26B, and FIG. 26C are aberration diagrams of Numerical Embodiment 13 at the wide angle end (focal length f=17.00 mm), intermediate zoom (focal length f=37.03 mm), and a telephoto end (focal length f=90.00 mm), respectively, in the state in which focus is at the object at infinity. The focal length is a value in Numerical Embodiment expressed in units of mm. The same is true for all Embodiments below.

In Embodiment 13, the first lens unit U1 corresponds to the first to fifteenth surfaces. The second lens unit U2 corresponds to the sixteenth to twenty-second surfaces. The aperture stop corresponds to the twenty-third surface. The third lens unit U3 corresponds to the twenty-fourth to twenty-eighth surfaces. The fourth lens unit U4 corresponds to the twenty-ninth to thirty-second surfaces. The fifth lens unit U5 corresponds to the thirty-third to forty-second surfaces, and the first lens sub-unit U51 of the fifth lens unit U5 corresponds to the thirty-third to thirty-seventh surfaces.

During zooming from the wide angle end to the telephoto end, when the second lens unit U2 moves linearly toward the image side, the third lens unit U3 moves substantially reciprocally along a convex locus toward the object side. The fourth lens unit U4 is configured to move toward the object side, and is increased in movement amount on the image side than on the wide angle side.

The aperture stop is changed in diameter during zooming, and has the largest diameter at the telephoto end. Moreover, the aperture stop is configured not to move in the optical axis direction during zooming.

The first lens sub-unit U51 of the fifth lens unit U5 is configured to move in a direction substantially perpendicular to the optical axis to correct an image blur.

As shown in Table 2 to be described later, Numerical Embodiment 13 satisfies all of conditional expressions (9) to (15) so as to have a high zooming ratio of 5.29 and achieve a wide angle of view with a photographing angle of view (angle of view) of 84.90 degrees at the wide angle end. In addition, the high optical performance is obtained with various aberrations being satisfactorily corrected over the entire zoom range.

Embodiment 14

Figure 28A:
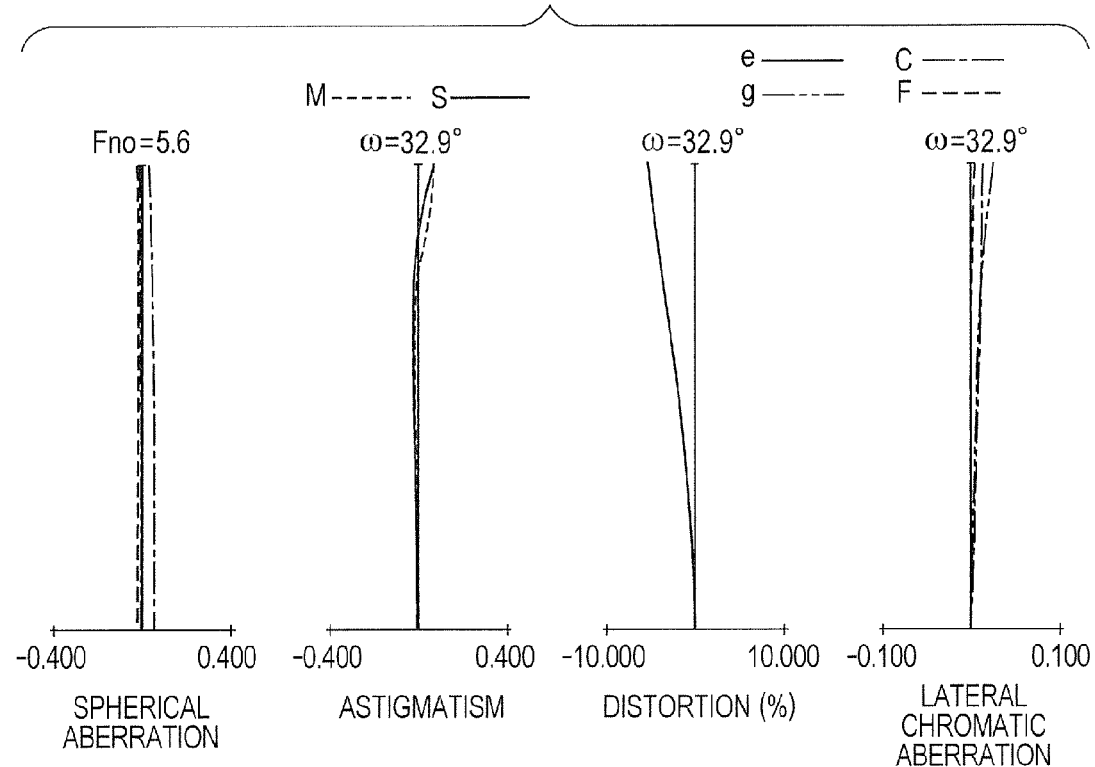
FIG. 28A is an aberration diagram in the state in which focus is at the object at infinity at the wide angle end according to Numerical Embodiment 14.
Figure 28B:
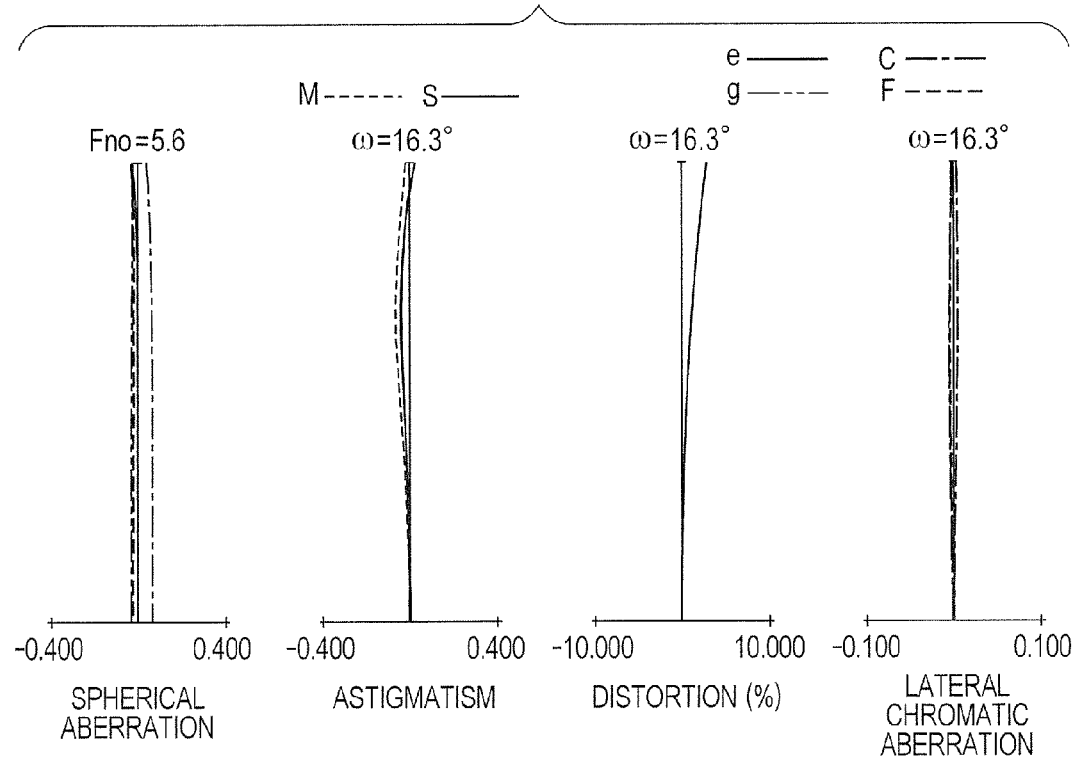
FIG. 28B is an aberration diagram in the state in which focus is at the object at infinity at an intermediate zoom position according to Numerical Embodiment 14.
Figure 28C:
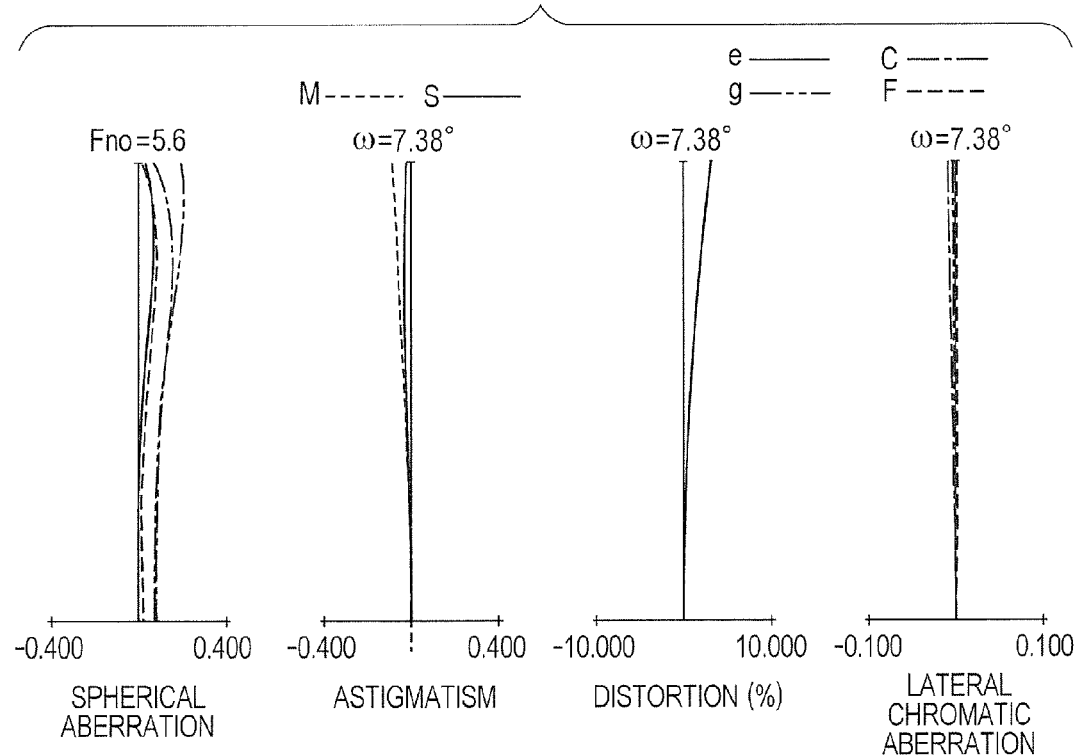
FIG. 28C is an aberration diagram in the state in which focus is at the object at infinity at a telephoto end according to Numerical Embodiment 14.

FIG. 27 is a lens cross-sectional view of a zoom lens according to Embodiment 14 (Numeral Embodiment 14) of the present invention at a wide angle end (focal distance f=24.00 mm) in the state in which focus is at the object at infinity. FIG. 28A, FIG. 28B, and FIG. 28C are aberration diagrams of Numerical Embodiment 14 at the wide angle end (focal length f=24.00 mm), intermediate zoom (focal length f=53.14 mm), and a telephoto end (focal length f=120.00 mm), respectively, in the state in which focus is at the object at infinity.

In Embodiment 14, the first lens unit U1 corresponds to the first to fifteenth surfaces. The second lens unit U2 corresponds to the sixteenth to twenty-second surfaces. The aperture stop corresponds to the twenty-third surface. The third lens unit U3 corresponds to the twenty-fourth and twenty-fifth surfaces. The fourth lens unit U4 corresponds to the twenty-sixth to thirtieth surfaces. The fifth lens unit U5 corresponds to the thirty-first to thirty-fifth surfaces.

During zooming from the wide angle end to the telephoto end, when the second lens unit U2 moves linearly toward the image side, the third lens unit U3 moves along a substantially S-shaped locus first toward the object side, then toward the image side, and finally toward the object side.

The aperture stop is changed in diameter during zooming, and has the largest diameter at the telephoto end. Moreover, the aperture stop is configured not to move in the optical axis direction during zooming.

During focusing from the object at infinity to the object at the short distance, when the second lens sub-unit U12 moves linearly toward the image side, the third lens sub-unit U13 moves linearly toward the object side.

As shown in Table 2 to be described later, Numerical Embodiment 14 satisfies all of conditional expressions (9) to (15) so as to have a high zooming ratio of 5.00 and achieve a wide angle of view with a photographing angle of view (angle of view) of 65.88 degrees at the wide angle end. In addition, the high optical performance is obtained with various aberrations being satisfactorily corrected over the entire zoom range.

Embodiment 15

Figure 29:
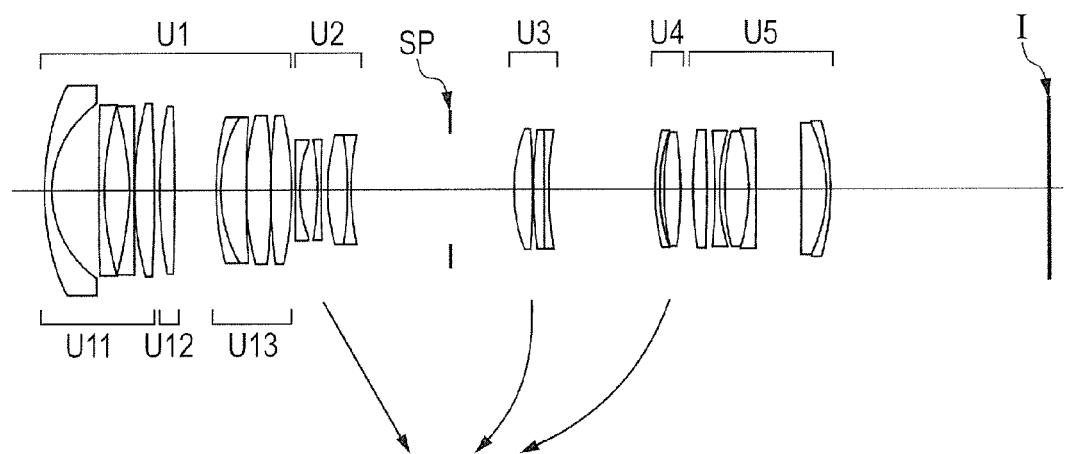
FIG. 29 is a lens cross-sectional view in the state in which focus is at the object at infinity at a wide angle end according to Embodiment 15 (Numerical Embodiment 15) of the present invention.
Figure 30A:
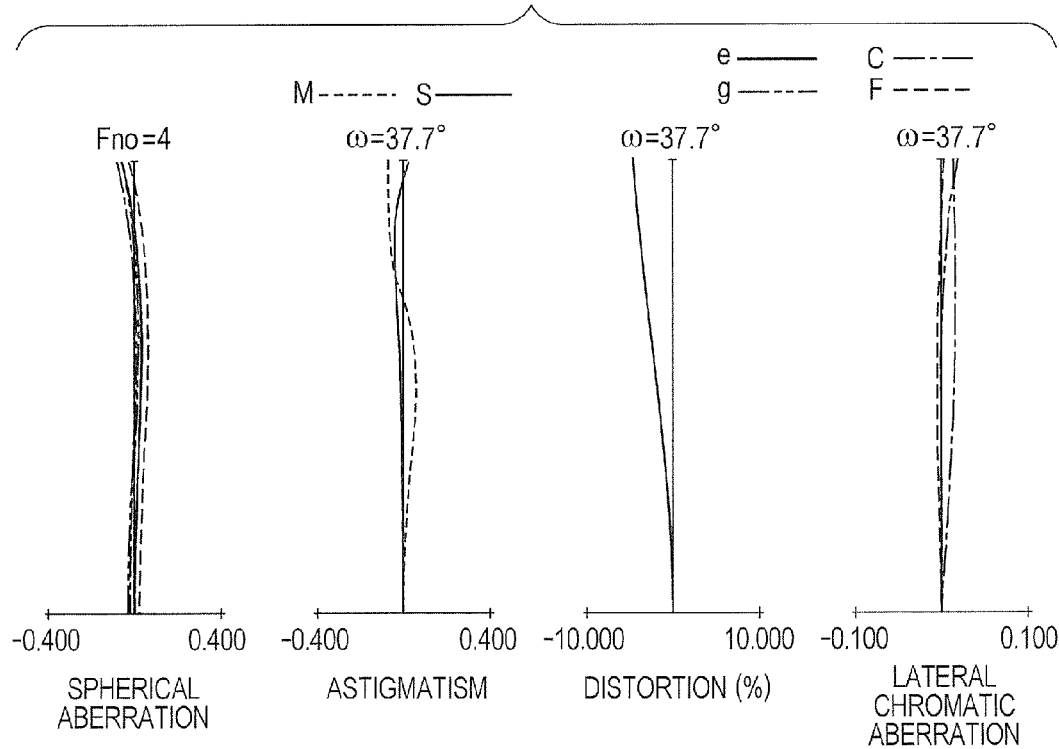
FIG. 30A is an aberration diagram in the state in which focus is at infinity at the wide angle end according to Numerical Embodiment 15.
Figure 30B:
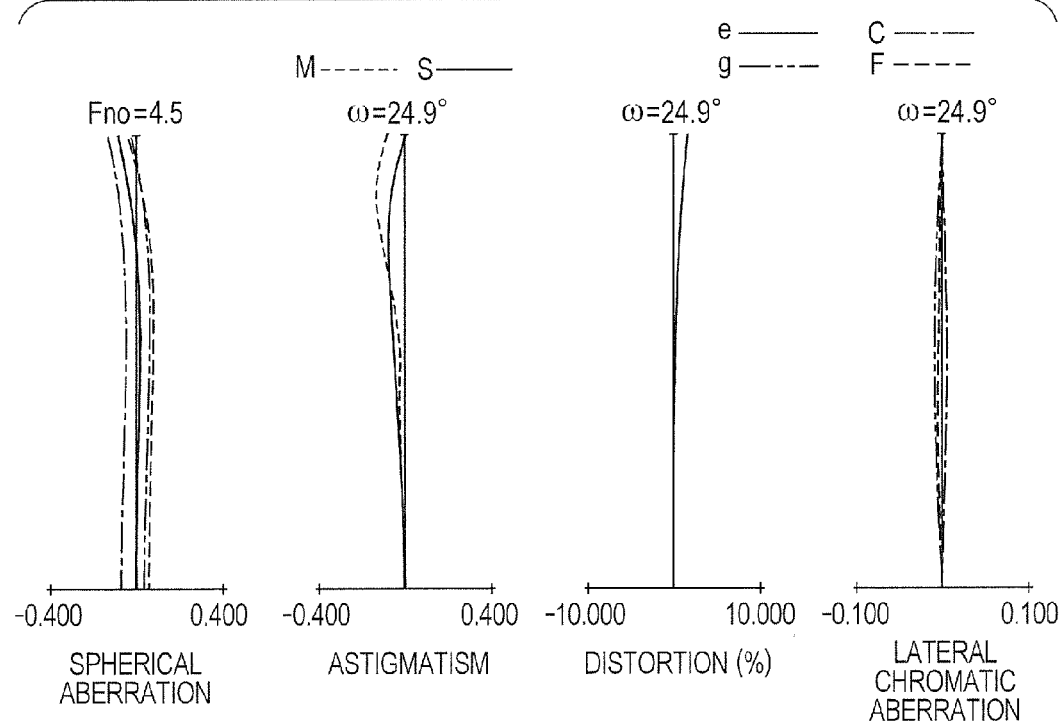
FIG. 30B is an aberration diagram in the state in which focus is at infinity at an intermediate zoom position according to Numerical Embodiment 15.
Figure 30C:
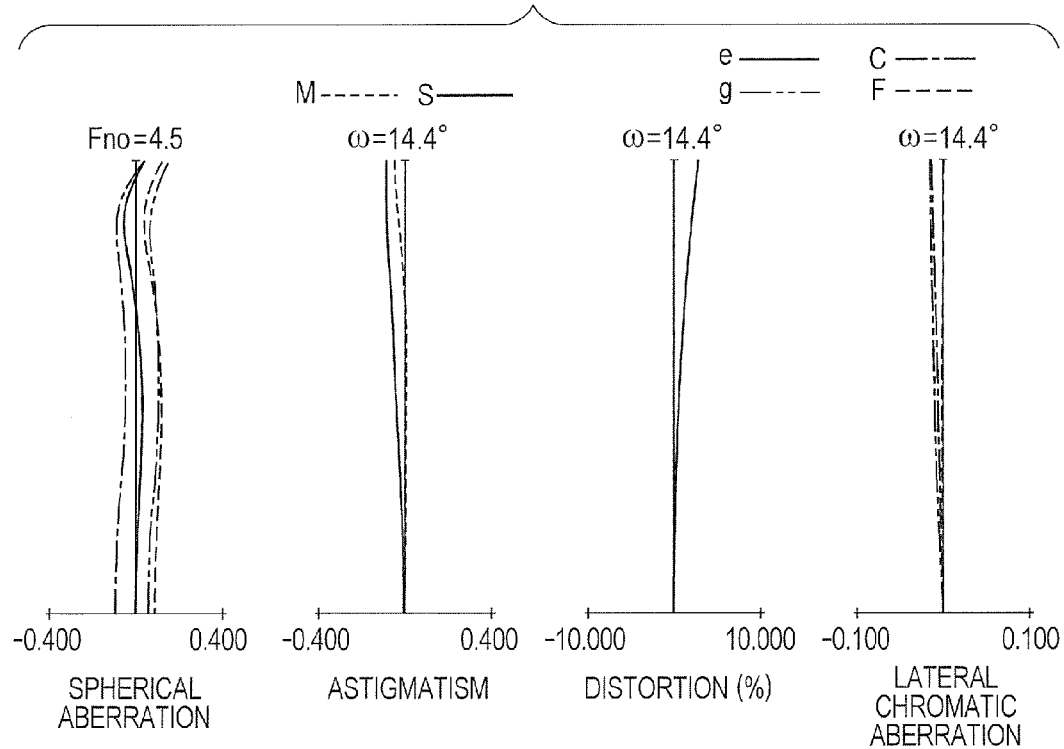
FIG. 30C is an aberration diagram in the state in which focus is at infinity at a telephoto end according to Numerical Embodiment 15.

FIG. 29 is a lens cross-sectional view of a zoom lens according to Embodiment 15 (Numeral Embodiment 15) of the present invention at a wide angle end (focal distance f=28.00 mm) in the state in which focus is at the object at infinity. FIG. 30A, FIG. 30B, and FIG. 30C are aberration diagrams of Numerical Embodiment 15 at the wide angle end (focal length f=28.00 mm), intermediate zoom (focal length f=46.66 mm), and a telephoto end (focal length f=84.00 mm), respectively, in the state in which focus is at the object at infinity.

In Embodiment 15, the first lens unit U1 corresponds to the first to seventeenth surfaces. The second lens unit U2 corresponds to the eighteenth to twenty-fourth surfaces. The aperture stop corresponds to the twenty-fifth surface. The third lens unit U3 corresponds to the twenty-sixth to thirtieth surfaces. The fourth lens unit U4 corresponds to the thirty-first to thirty-fourth surfaces. The fifth lens unit U5 corresponds to the thirty-fifth to forty-fourth surfaces.

During zooming from the wide angle end to the telephoto end, when the second lens unit U2 moves linearly toward the image side, the third lens unit U3 moves first toward the image side and finally toward the object side.

The aperture stop is changed in diameter during zooming, and has the largest diameter at the telephoto end. Moreover, the aperture stop is configured not to move in the optical axis direction during zooming.

As shown in Table 2 to be described later, Numerical Embodiment 15 satisfies all of conditional expressions (9) to (15) so as to have a high zooming ratio of 3.00 and achieve a wide angle of view with a photographing angle of view (angle of view) of 75.38 degrees at the wide angle end. In addition, the high optical performance is obtained with various aberrations being satisfactorily corrected over the entire zoom range.

Embodiment 16

Figure 31:
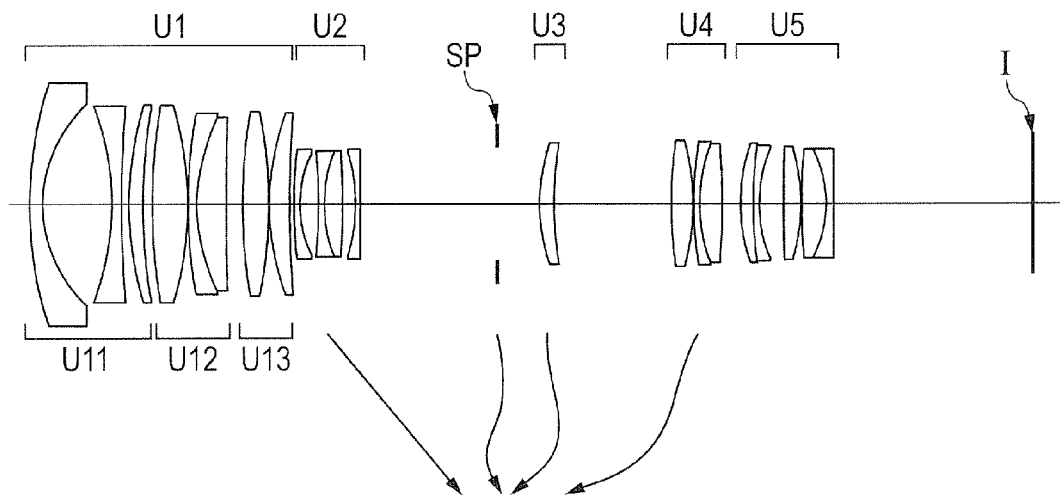
FIG. 31 is a lens cross-sectional view in the state in which focus is at the object at infinity at a wide angle end according to Embodiment 16 (Numerical Embodiment 16) of the present invention.
Figure 32A:
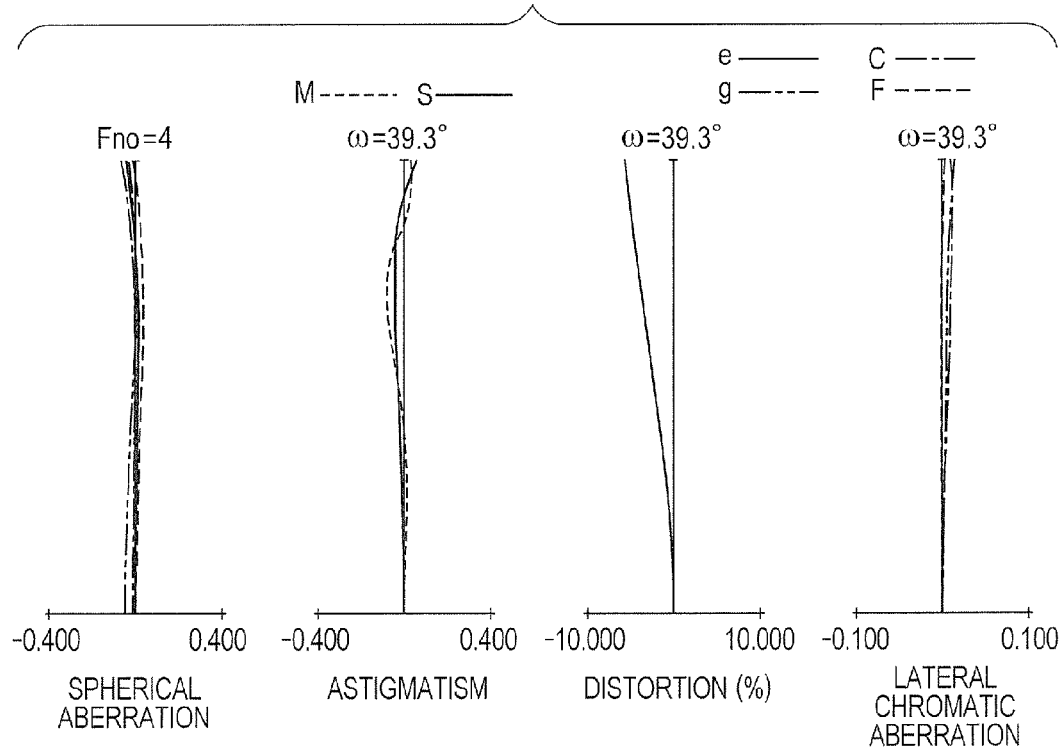
FIG. 32A is an aberration diagram in the state in which focus is at infinity at the wide angle end according to Numerical Embodiment 16.
Figure 32B:
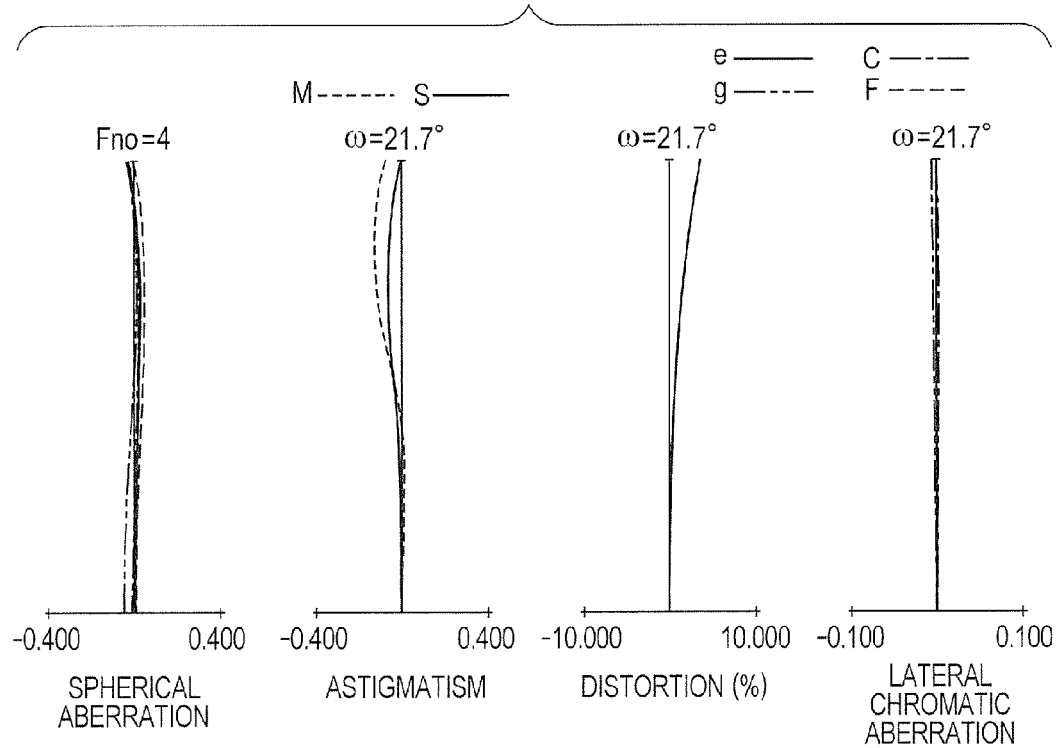
FIG. 32B is an aberration diagram in the state in which focus is at infinity at an intermediate zoom position according to Numerical Embodiment 16.
Figure 32C:
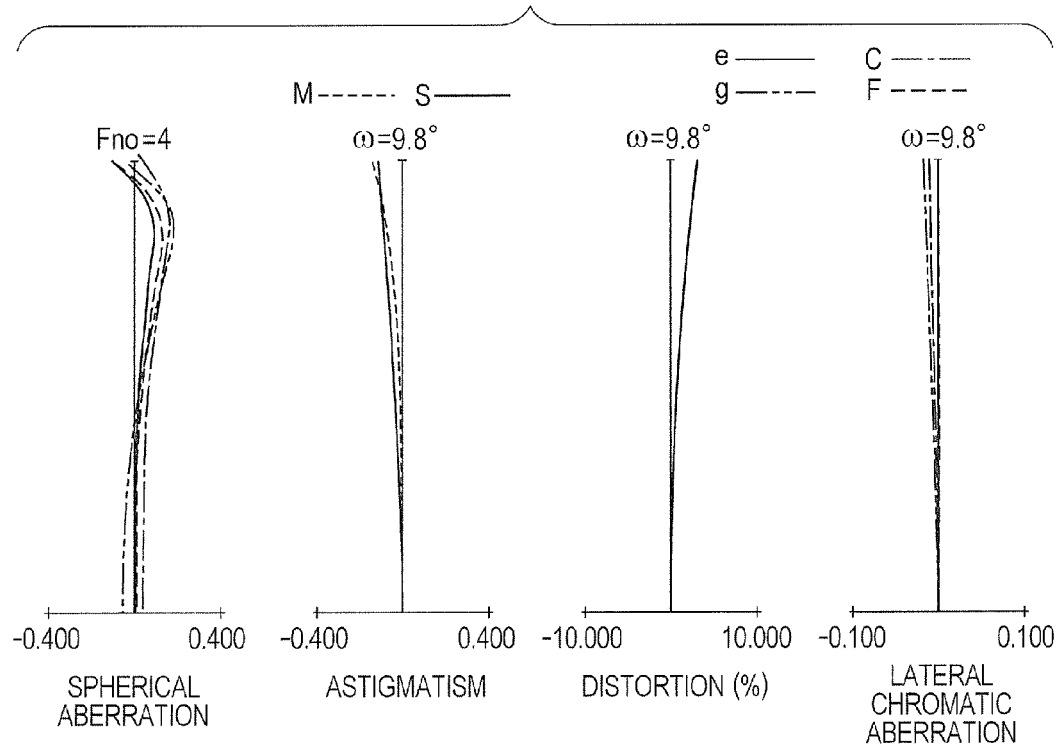
FIG. 32C is an aberration diagram in the state in which focus is at infinity at a telephoto end according to Numerical Embodiment 16.

FIG. 31 is a lens cross-sectional view of a zoom lens according to Embodiment 16 (Numeral Embodiment 16) of the present invention at a wide angle end (focal distance f=19.00 mm) in the state in which focus is at the object at infinity. FIG. 32A, FIG. 32B, and FIG. 32C are aberration diagrams of Numerical Embodiment 16 at the wide angle end (focal length f=19.00 mm), intermediate zoom (focal length f=39.17 mm), and a telephoto end (focal length f=90.00 mm), respectively, in the state in which focus is at the object at infinity.

In Embodiment 16, the first lens unit U1 corresponds to the first to fifteenth surfaces. The second lens unit U2 corresponds to the sixteenth to twenty-second surfaces. The aperture stop corresponds to the twenty-third surface. The third lens unit U3 corresponds to the twenty-fourth and twenty-fifth surfaces. The fourth lens unit U4 corresponds to the twenty-sixth to thirtieth surfaces. The fifth lens unit U5 corresponds to the thirty-first to thirty-eighth surfaces.

The aperture stop is changed in diameter during zooming, and has the largest diameter at the telephoto end. Moreover, the aperture stop is configured to move in the optical axis direction during zooming. During zooming from the wide angle end to the telephoto end, when the second lens unit U2 moves linearly toward the image side, the third lens unit U3 moves along a substantially S-shaped locus first toward the object side, then toward the image side, and finally toward the object side. The aperture stop is configured to move along a substantially reverse S-shaped locus first toward the image side, then toward the object side, and finally toward the image side.

As shown in Table 2 to be described later, Numerical Embodiment 16 satisfies all of conditional expressions (9) to (15) so as to have a high zoom ratio of 4.74 and achieve a wide angle of view with a photographing angle of view (angle of view) of 78.60 degrees at the wide angle end. In addition, the high optical performance is obtained with various aberrations being satisfactorily corrected over the entire zoom range.

Embodiment 17

Figure 33:
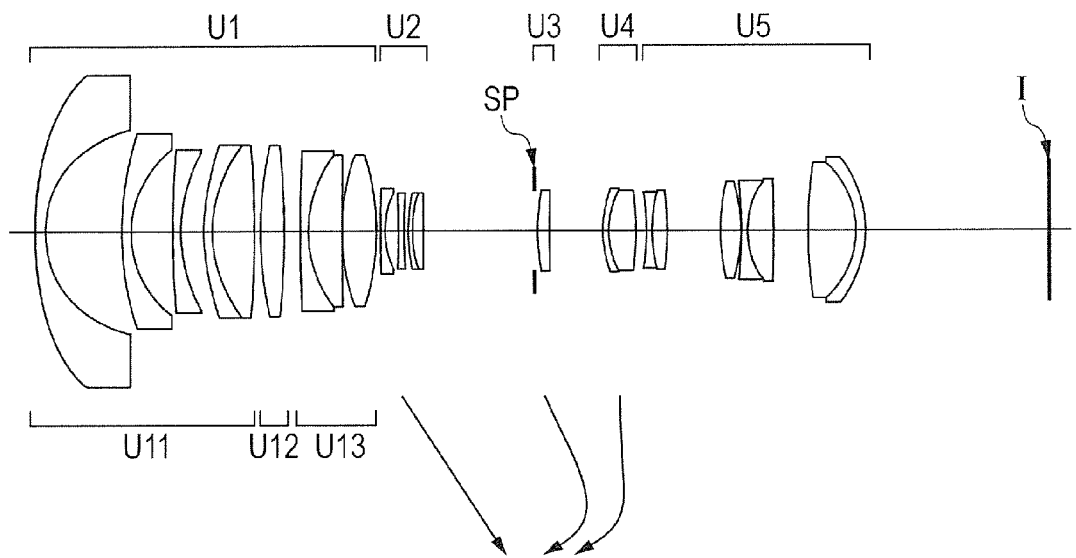
FIG. 33 is a lens cross-sectional view in the state in which focus is at the object at infinity at a wide angle end according to Embodiment 17 (Numerical Embodiment 17) of the present invention.
Figure 34A:
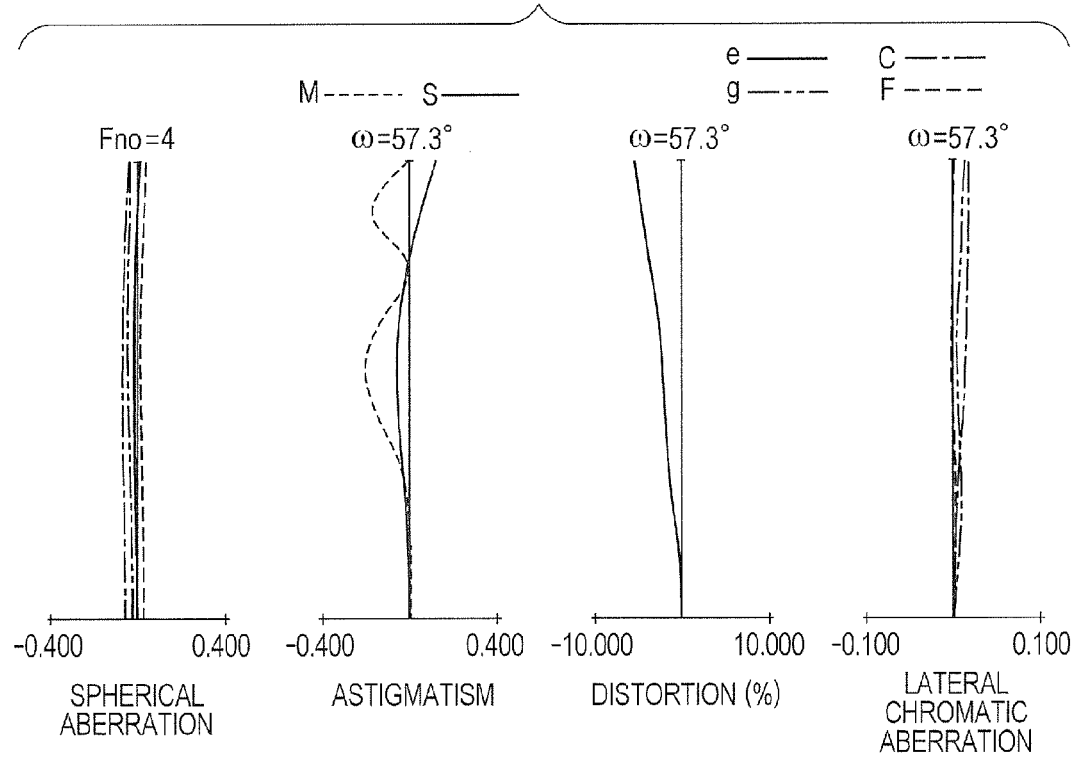
FIG. 34A is an aberration diagram in the state in which focus is at infinity at the wide angle end according to Numerical Embodiment 17.
Figure 34B:
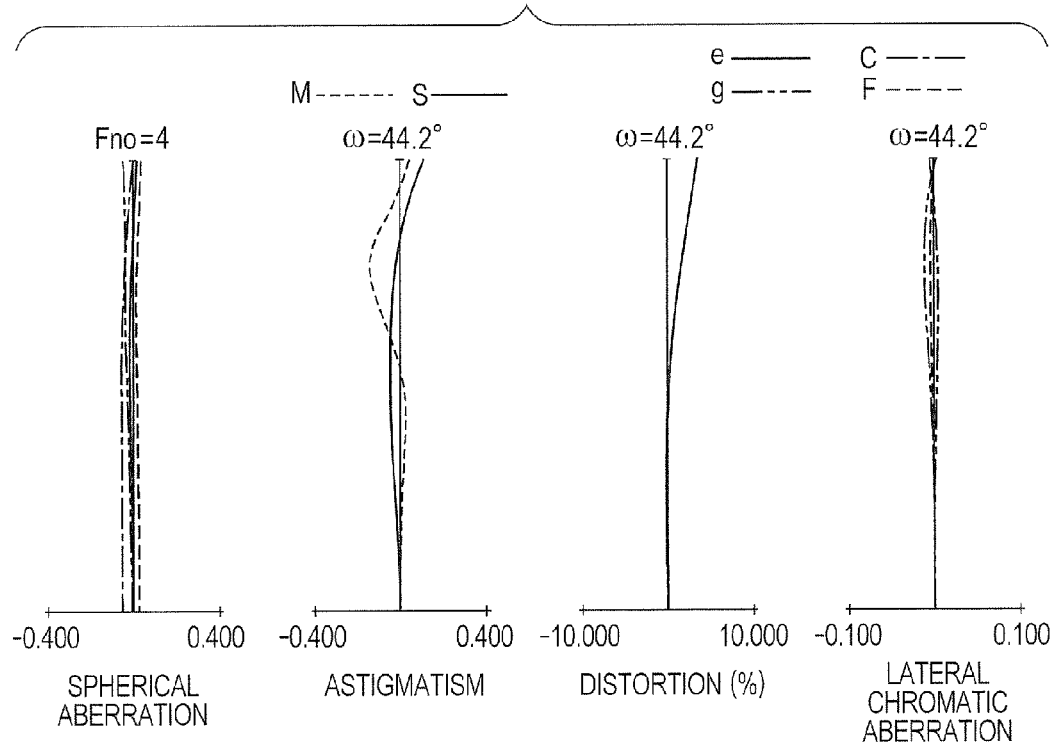
FIG. 34B is an aberration diagram in the state in which focus is at infinity at an intermediate zoom position according to Numerical Embodiment 17.
Figure 34C:
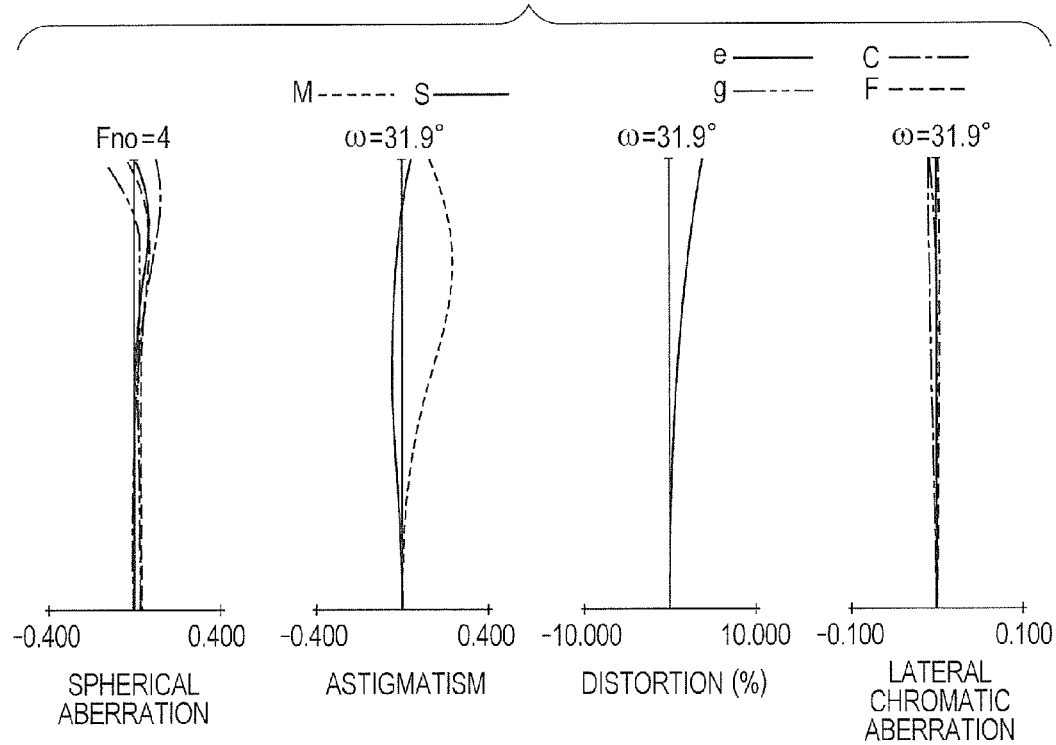
FIG. 34C is an aberration diagram in the state in which focus is at infinity at a telephoto end according to Numerical Embodiment 17.

FIG. 33 is a lens cross-sectional view of a zoom lens according to Embodiment 17 (Numeral Embodiment 17) of the present invention at a wide angle end (focal distance f=10 mm) in the state in which focus is at the object at infinity. FIG. 34A, FIG. 34B, and FIG. 34C are aberration diagrams of Numerical Embodiment 17 at the wide angle end (focal length f=10.00 mm), intermediate zoom (focal length f=16.00 mm), and a telephoto end (focal length f=25.00 mm), respectively, in the state in which focus is at the object at infinity.

In Embodiment 17, the first lens unit U1 corresponds to the first to sixteenth surfaces. The second lens unit U2 corresponds to the seventeenth to twenty-third surfaces. The aperture stop corresponds to the twenty-fourth surface. The third lens unit U3 corresponds to the twenty-fifth and twenty-sixth surfaces. The fourth lens unit U4 corresponds to the twenty-seventh to thirtieth surfaces. The fifth lens unit U5 corresponds to the thirty-first to forty-first surfaces.

During zooming from the wide angle end to the telephoto end, when the second lens unit U2 moves linearly toward the image side, the third lens unit U3 moves substantially reciprocally along a convex locus toward the object side. The fourth lens unit U4 is configured to move toward the object side, and is increased in movement amount on the image side than on the wide angle side.

The aperture stop is changed in diameter during zooming, and has the largest diameter at the telephoto end. Moreover, the aperture stop is configured not to move in the optical axis direction during zooming.

As shown in Table 2 to be described later, Numerical Embodiment 17 satisfies all of conditional expressions (9) to (15) so as to have a high zooming ratio of 2.50× and achieve a wide angle of view with a photographing angle of view (angle of view) of 114.52 degrees at the wide angle end. In addition, the high optical performance is obtained with various aberrations being satisfactorily corrected over the entire zoom range.

Embodiment 18

Figure 35:
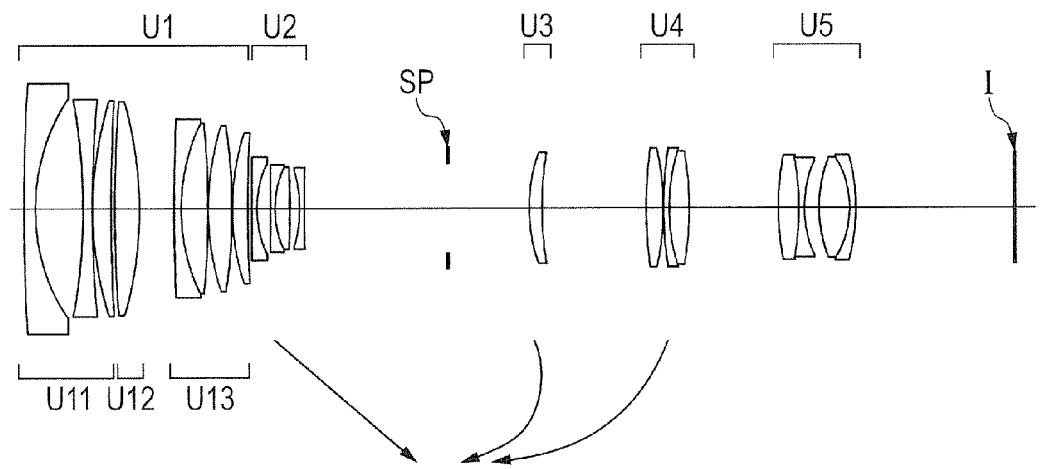
FIG. 35 is a lens cross-sectional view in the state in which focus is at the object at infinity at a wide angle end according to Embodiment 18 (Numerical Embodiment 18) of the present invention.
Figure 36A:
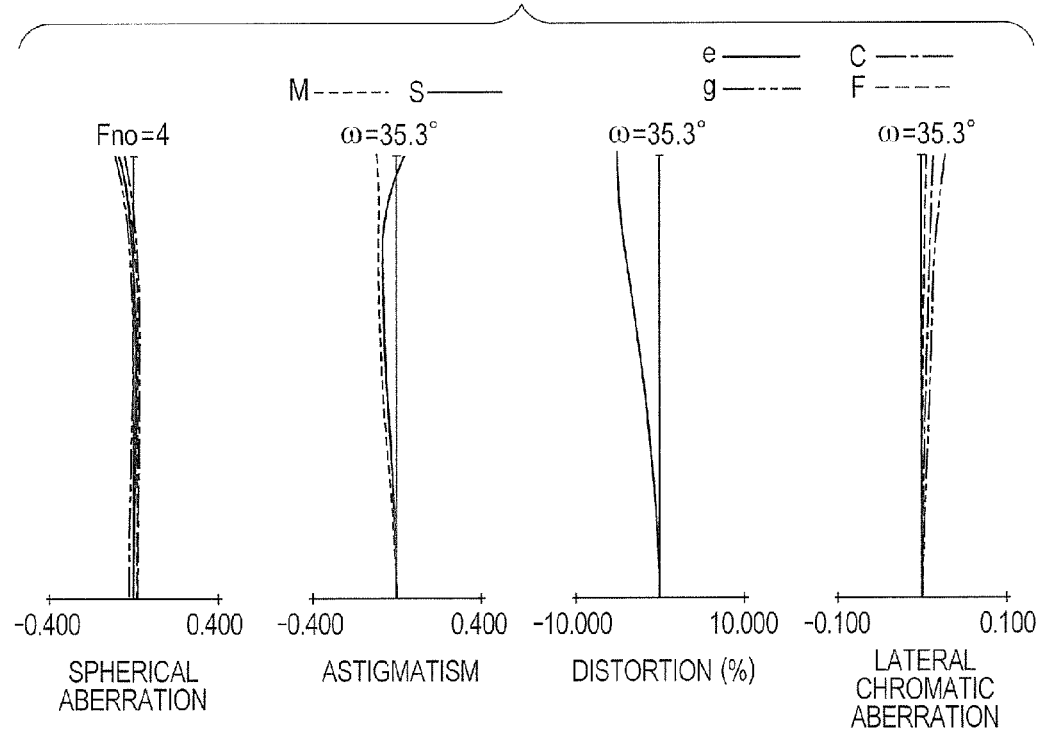
FIG. 36A is an aberration diagram in the state in which focus is at infinity at the wide angle end according to Numerical Embodiment 18.
Figure 36B:
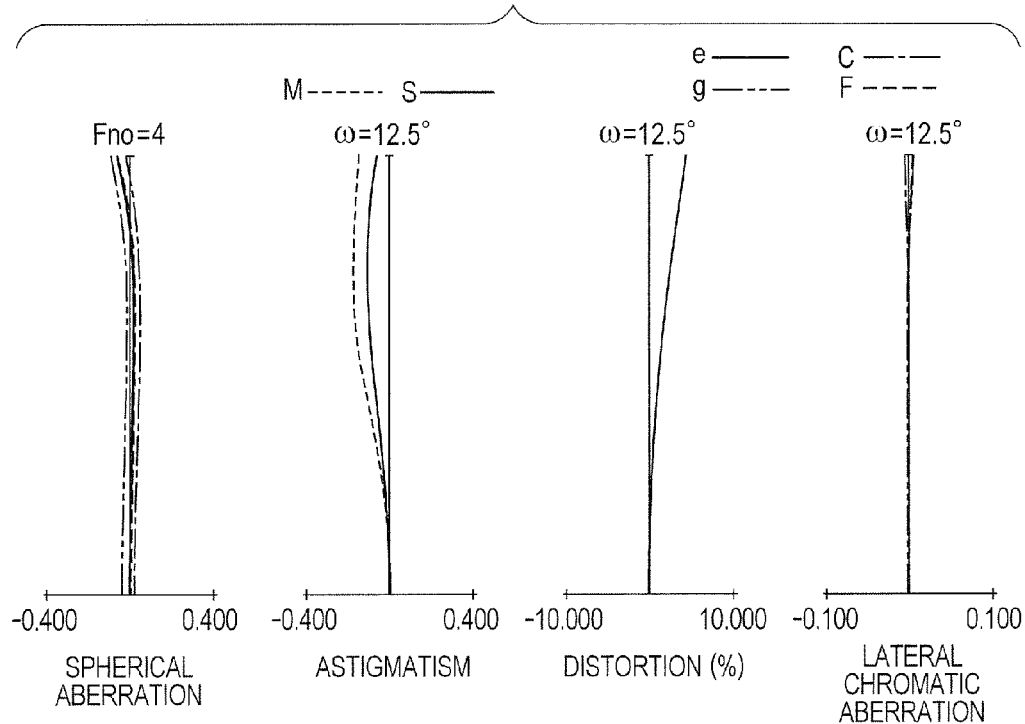
FIG. 36B is an aberration diagram in the state in which focus is at infinity at an intermediate zoom position according to Numerical Embodiment 18.
Figure 36C:
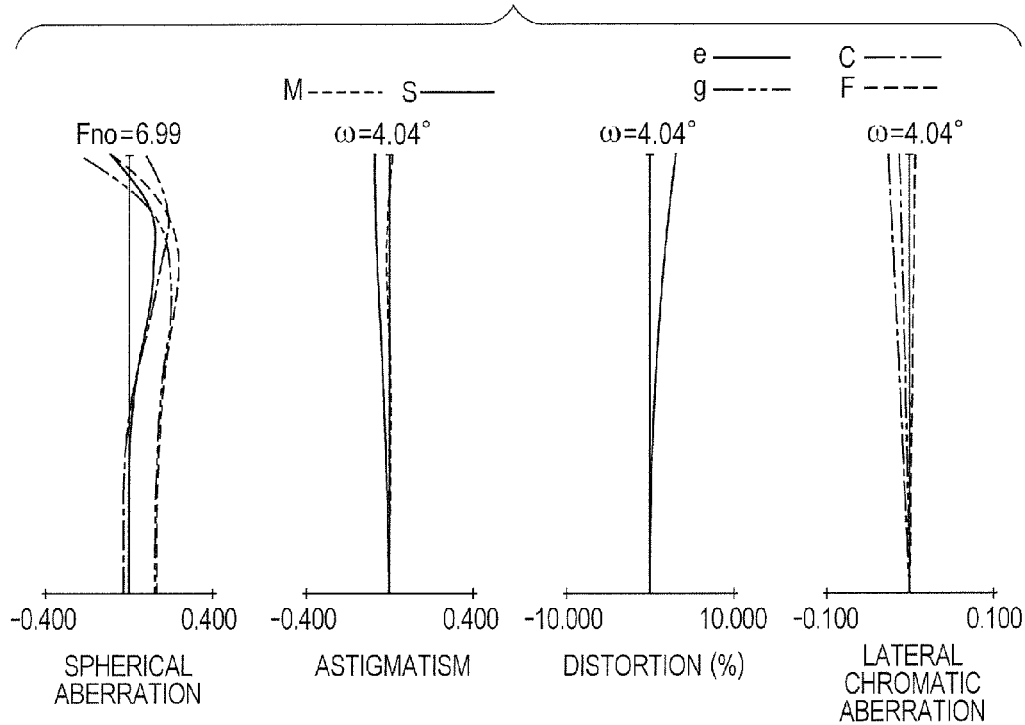
FIG. 36C is an aberration diagram in the state in which focus is at infinity at a telephoto end according to Numerical Embodiment 18.

FIG. 35 is a lens cross-sectional view of a zoom lens according to Embodiment 18 (Numeral Embodiment 18) of the present invention at a wide angle end (focal distance f=22 mm) in the state in which focus is at the object at infinity. FIG. 36A, FIG. 36B, and FIG. 36C are aberration diagrams of Numerical Embodiment 18 at the wide angle end (focal length f=22.00 mm), intermediate zoom (focal length f=70.00 mm), and a telephoto end (focal length f=200.00 mm), respectively, in the state in which focus is at the object at infinity.

In Embodiment 18, the first lens unit U1 corresponds to the first to fifteenth surfaces. The second lens unit U2 corresponds to the sixteenth to twenty-second surfaces. The aperture stop corresponds to the twenty-third surface. The third lens unit U3 corresponds to the twenty-fourth and twenty-fifth surfaces. The fourth lens unit U4 corresponds to the twenty-sixth to thirtieth surfaces. The fifth lens unit U5 corresponds to the thirty-first to thirty-sixth surfaces.

During zooming from the wide angle end to the telephoto end, when the second lens unit U2 moves linearly toward the image side, the third lens unit U3 moves first toward the image side and finally toward the object side.

The aperture stop is changed in diameter during zooming, and has the largest diameter at the telephoto end. Moreover, the aperture stop is configured not to move in the optical axis direction during zooming.

As shown in Table 2 to be described later, Numerical Embodiment 18 satisfies all of conditional expressions (9) to (15) so as to have a high zooming ratio of 10.00 and achieve a wide angle of view with a photographing angle of view (angle of view) of 70.50 degrees at the wide angle end. In addition, the high optical performance is obtained with various aberrations being satisfactorily corrected over the entire zoom range.

Embodiment 19

Figure 38A:
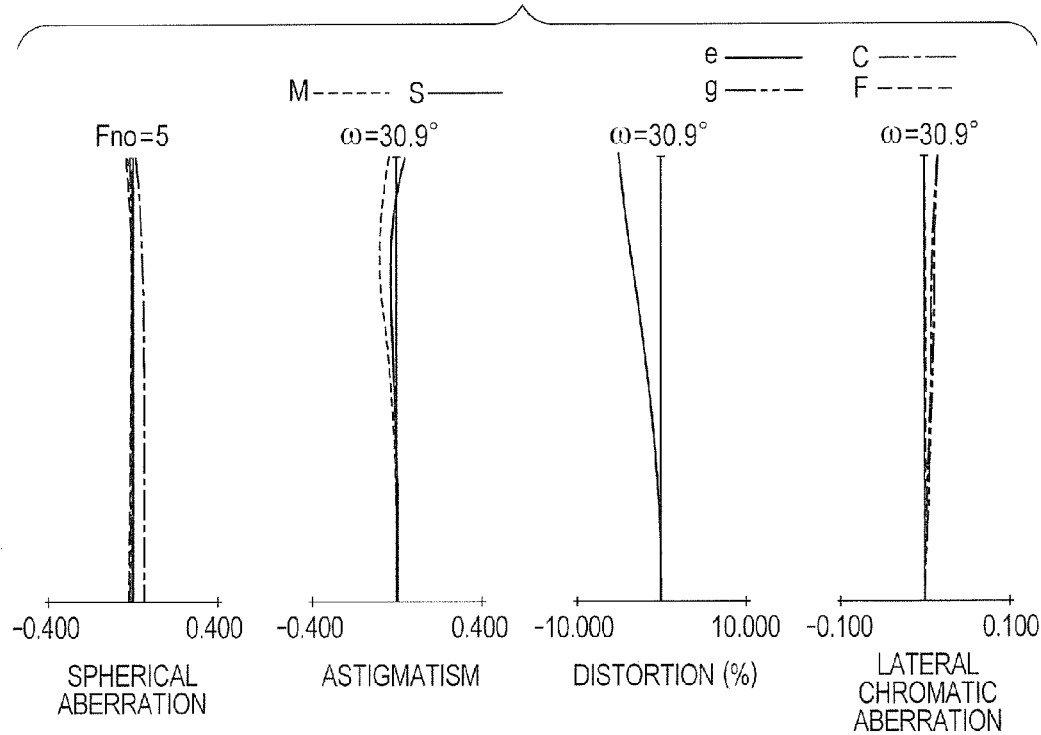
FIG. 38A is an aberration diagram in the state in which focus is at infinity at the wide angle end according to Numerical Embodiment 19.
Figure 38B:
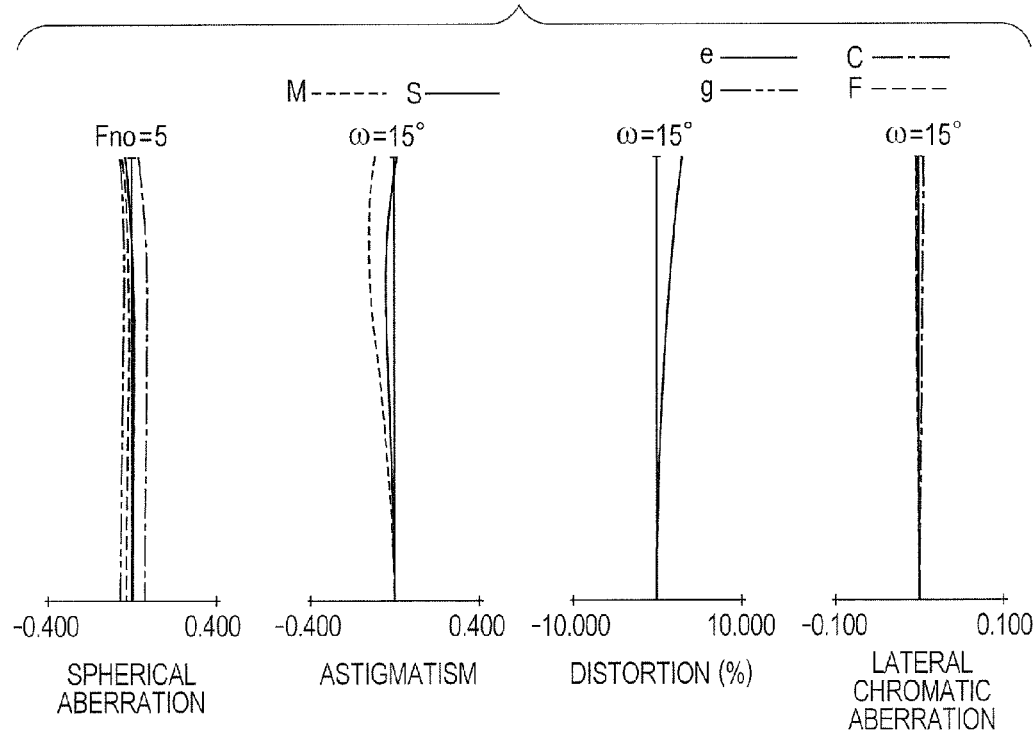
FIG. 38B is an aberration diagram in the state in which focus is at infinity at an intermediate zoom position according to Numerical Embodiment 19.
Figure 38C:
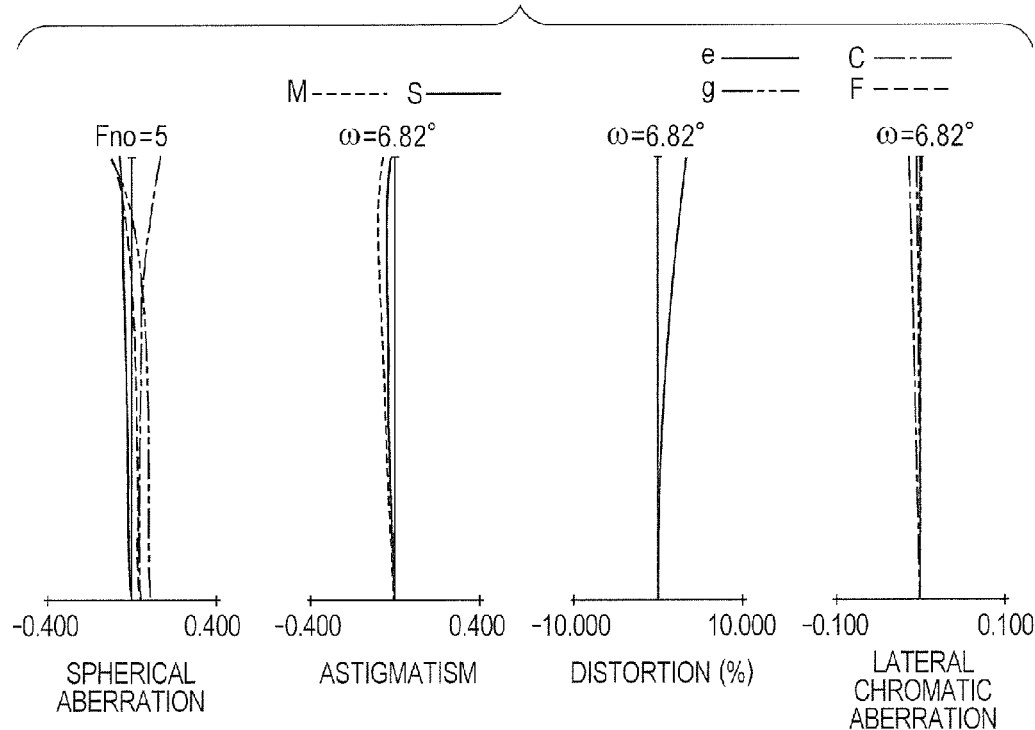
FIG. 38C is an aberration diagram in the state in which focus is at infinity at a telephoto end according to Numerical Embodiment 19.

FIG. 37 is a lens cross-sectional view of a zoom lens according to Embodiment 19 (Numeral Embodiment 19) of the present invention at a wide angle end (focal distance f=26 mm) in the state in which focus is at the object at infinity. FIG. 38A, FIG. 38B, and FIG. 38C are aberration diagrams of Numerical Embodiment 19 at the wide angle end (focal length f=26.00 mm), intermediate zoom (focal length f=58.00 mm), and a telephoto end (focal length f=130.00 mm), respectively, in the state in which focus is at the object at infinity.

In Embodiment 19, the first lens unit U1 corresponds to the first to fifteenth surfaces. The second lens unit U2 corresponds to the sixteenth to twenty-second surfaces. The third lens unit U3 corresponds to the twenty-third and twenty-fourth surfaces. The aperture stop corresponds to the twenty-fifth surface. The fourth lens unit U4 corresponds to the twenty-sixth to thirtieth surfaces. The fifth lens unit U5 corresponds to the thirty-first to thirty-fifth surfaces.

During zooming from the wide angle end to the telephoto end, when the second lens unit U2 moves linearly toward the image side, the third lens unit U3 moves along a substantially S-shaped locus and finally toward the object side.

The aperture stop is changed in diameter during zooming, and has the largest diameter at the telephoto end. Moreover, the aperture stop is configured to move in conjunction with the third lens unit during zooming.

During focusing from the object at infinity to the object at the short distance, when the second lens sub-unit U12 moves linearly toward the image side, the third lens sub-unit U13 moves linearly toward the object side.

As shown in Table 2 to be described later, Numerical Embodiment 19 satisfies all of conditional expressions (9) to (15) so as to have a high zooming ratio of 5.00 and achieve a wide angle of view with a photographing angle of view (angle of view) of 61.76 degrees at the wide angle end. In addition, the high optical performance is obtained with various aberrations being satisfactorily corrected over the entire zoom range.

As described above, according to each of Embodiments, refractive power arrangement of each lens unit and movement loci of moving lens units for zooming are defined appropriately. As a result, there is obtained the zoom lens, which satisfactorily corrects various aberrations while realizing both the high zooming ratio and the wide angle of view.

Figure 39:
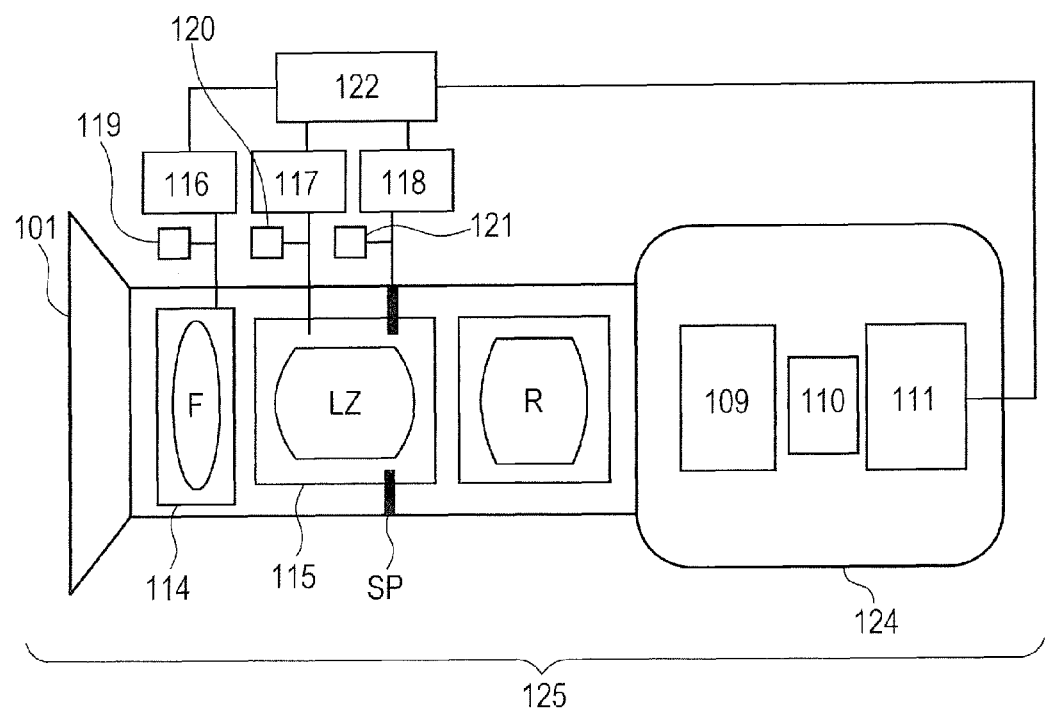
FIG. 39 is a schematic diagram for illustrating a main part of an image pickup apparatus according to the present invention.

FIG. 39 is a schematic view of a main part of an image pickup apparatus (television camera system) using the zoom lens according to each of Embodiments 1 to 19 as a photographing optical system. FIG. 39 is an illustration of the zoom lens according to any one of Embodiments 1 to 19, which is denoted by 101, and a camera 124. The zoom lens 101 is configured to be detachably attachable to the camera 124. An image pickup apparatus 125 is formed by attaching the zoom lens 101 to the camera 124. The zoom lens 101 includes a first lens unit F, a zoom portion LZ, and a rear lens unit R for forming an image. The first lens unit F includes a lens unit configured to move a partial lens unit for focusing.

The zoom portion LZ includes a lens unit configured to move on the optical axis during zooming in each of Embodiments 1 to 19. The aperture stop is denoted by SP. Drive mechanisms 114 and 115, such as helicoids and cams, are configured to drive the focusing unit and the zoom portion LZ in the optical axis direction, respectively.

Motors (drive units) 116 to 118 are configured to electrically drive the drive mechanisms 114 and 115 and the aperture stop SP, respectively. Detectors 119 to 121, such as encoders, potentiometers, or photosensors, are configured to detect positions of the focusing units and the zoom portions LA on the optical axis, and the aperture diameter of the aperture stop SP, respectively. The camera 124 includes a glass block 109, which corresponds to an optical filter in the camera 124, and a solid state image pickup element (photoelectric conversion element) 110, such as a charge coupled device (CCD) sensor or a complementary metal oxide semiconductor (CMOS) sensor, which is configured to receive light of a subject image formed by the zoom lens 101.

Moreover, central processing units (CPUs) 111 and 122 are configured to control various kinds of driving of the camera 124 and the zoom lens 101. As described above, the zoom lens according to the present invention is applied to a television camera to realize an image pickup apparatus having high optical performance.

The exemplary Embodiments of the present invention have been described above. However, it is to be understood that the present invention is not limited to Embodiments and various modifications and changes can be made without departing from the spirit of the present invention.

Now, Numerical Embodiments 1 to 19 for Embodiments 1 to 19 of the present invention are described.

In each of Numerical Embodiments, the order of a surface from the object side is represented by i, a curvature radius of the i-th surface from the object side is represented by ri, and an interval between the i-th surface and the (i+1)th surface from the object side is represented by di. A refractive index, an Abbe number, and a partial dispersion ratio of an optical member between the i-th surface and the (i+1)th surface are represented by ndi, νdi, and θgFi, respectively. θgFi is shown for Numerical Embodiments 1 to 12. An air-equivalent back focus is represented by BF. Surface numbers of aspherical surfaces are suffixed by asterisks (*). In Table 1, correspondences between each of Embodiments and the conditional expressions described above are shown.

When an X axis is set in the optical axis direction, an H axis is set in a direction perpendicular to the optical axis, a direction of travel of light is defined as positive, a paraxial curvature radius is represented by R, a conic constant is represented by k, and aspherical coefficients are represented by A4, A6, A8, A10, A12, A14, and A16, aspherical shapes are expressed as the following expression. Moreover, "e-Z" means "×10$^{-Z}$".

$$X = \frac{H^2/R}{1+\sqrt{1-(1+k)(H/R)^2}} + A4H^4 + A6H^6 + A8H^8 + A10H^{10} + A12H^{12} + A14H^{14} + A14H^{14} + A16H^{16}$$

When a lens unit that is configured to move during zooming and is closest to the object side moves along a straight line connecting the wide angle end and the telephoto end, a lens unit configured to move during zooming moves by a movement amount following the mathematical expression provided below. Moreover, a lens unit that is configured to move during zooming and is closest to the image side is configured to move for correcting image plane variation accompanying zooming.

When the number of a lens unit is represented by j, a movement amount in the optical axis direction is represented by fj(y), the direction of travel of light is defined as positive, a movement amount y from the wide angle end to the telephoto end is set to 1, and movement coefficients are represented by Bj1, Bj2, Bj3, Bj4, Bj5, Bj6, Bj7, and Bj8, a movement amount is expressed by the following expression.

$fj(y)=Bj1y+Bj2y^2+Bj3y^3+Bj4y^4+Bj5y^5+Bj6y^6+Bj7y^7+Bj8y^8$

In so-called floating focus, in which two or more lens units are configured to move during focusing, when a lens unit that is configured to move during focusing and is closest to the object side moves along a straight line connecting an infinity end and a proximity end, a lens unit moves by a movement amount following the mathematical expression provided below.

When a number of a lens unit is represented by j, a movement amount in the optical axis direction is represented by gj(y), the direction of travel of light is defined as positive, a movement amount of the lens closest to the object side is represented by y, and a movement coefficient is represented by Cj, the movement amount is expressed by the following expression:

$gj(y)=Cjy$

Numerical Embodiment 1

| Unit mm | | | | | |
|---|---|---|---|---|---|
| Surface data | | | | | |
| Surface number i | ri | di | ndi | vdi | Effective diameter |
| 1* | 104.521 | 2.70 | 1.77250 | 49.6 | 53.31 |
| 2 | 30.315 | 14.58 | | | 43.72 |
| 3 | −63.571 | 1.98 | 1.77250 | 49.6 | 42.74 |
| 4 | 199.025 | 3.89 | | | 42.69 |
| 5 | 74.494 | 3.29 | 1.89286 | 20.4 | 43.62 |
| 6 | 115.023 | 2.02 | | | 43.19 |

-continued

| Unit mm | | | | | |
|---|---|---|---|---|---|
| 7 | 116.955 | 7.83 | 1.62041 | 60.3 | 43.08 |
| 8 | −78.664 | 0.20 | | | 42.58 |
| 9 | 81.511 | 1.89 | 1.85478 | 24.8 | 39.04 |
| 10 | 36.329 | 6.64 | 1.49700 | 81.5 | 38.45 |
| 11 | 331.011 | 3.24 | | | 38.72 |
| 12 | 115.367 | 4.63 | 1.59522 | 67.7 | 40.06 |
| 13 | −164.145 | 0.18 | | | 40.15 |
| 14 | 63.769 | 4.60 | 1.76385 | 48.5 | 39.86 |
| 15 | 875.792 | (Variable) | | | 39.35 |
| 16* | 184.662 | 1.26 | 1.88300 | 40.8 | 23.79 |
| 17 | 25.638 | 3.57 | | | 22.18 |
| 18 | −158.203 | 1.08 | 1.59522 | 67.7 | 22.31 |
| 19 | 28.243 | 3.98 | 1.85478 | 24.8 | 23.01 |
| 20 | −926.470 | 3.00 | | | 23.05 |
| 21 | −40.093 | 1.08 | 1.76385 | 48.5 | 23.07 |
| 22 | −458.726 | (Variable) | | | 23.78 |
| 23 (Stop) | ∞ | (Variable) | | | 24.60 |
| 24 | 37.250 | 4.66 | 1.59522 | 67.7 | 26.43 |
| 25* | 133.331 | (Variable) | | | 26.35 |
| 26 | 118.893 | 5.48 | 1.49700 | 81.5 | 26.64 |
| 27 | −53.600 | 0.18 | | | 26.72 |
| 28 | 40.924 | 1.49 | 2.00100 | 29.1 | 25.84 |
| 29 | 26.603 | 4.13 | 1.49700 | 81.5 | 24.75 |
| 30 | 116.236 | (Variable) | | | 24.57 |
| 31 | 40.142 | 2.87 | 1.95906 | 17.5 | 24.71 |
| 32 | 95.191 | 1.49 | 2.00069 | 25.5 | 24.22 |
| 33 | 33.561 | 4.20 | | | 23.40 |
| 34 | −770.312 | 3.44 | 1.48749 | 70.2 | 23.72 |
| 35 | −41.561 | 0.18 | | | 23.92 |
| 36 | 395.833 | 6.22 | 1.49700 | 81.5 | 23.67 |
| 37 | −24.801 | 1.68 | 1.95375 | 32.3 | 23.36 |
| 38 | −124.306 | 45.29 | | | 24.06 |
| Image surface | ∞ | | | | |

| Aspherical surface data |
|---|
| First surface |

K = 6.63182e+000    A4 = 8.41422e−008  A6 = 4.05320e−011
A8 = −6.76543e−013

Sixteenth surface

K = 0.00000e+000    A4 = 2.77839e−007  A6 = −1.12528e−009
A8 = −1.24698e−012

Twenty-fifth surface

K = 0.00000e+000    A4 = 6.24439e−006  A6 = 6.92935e−010
A8 = 1.01985e−012

| Various data Zoom ratio 4.74 | | | |
|---|---|---|---|
| | Wide angle | Intermediate | Telephoto |
| Focal length | 19.00 | 40.00 | 90.00 |
| F-number | 4.00 | 4.00 | 4.00 |
| Half angle of view | 39.30 | 21.24 | 9.80 |
| Image height | 15.55 | 15.55 | 15.55 |
| Total lens length | 219.66 | 219.66 | 219.66 |
| BF | 45.29 | 45.29 | 45.29 |
| d15 | 0.96 | 20.17 | 29.68 |
| d22 | 30.43 | 11.22 | 1.70 |
| d23 | 9.15 | 11.65 | 1.71 |
| d25 | 24.43 | 12.71 | 2.02 |
| d30 | 1.76 | 10.97 | 31.60 |
| Entrance pupil position | 33.55 | 46.26 | 53.53 |
| Exit pupil position | −84.66 | −66.56 | −49.28 |
| Front principal point position | 49.77 | 71.96 | 57.88 |
| Rear principal point position | 26.29 | 5.29 | −44.71 |

-continued

Unit mm

Zoom lens unit data

| Unit | First surface | Focal length | Lens structure length | Front principal point position | Rear principal point position |
|---|---|---|---|---|---|
| 1 | 1 | 45.00 | 57.67 | 43.04 | 30.69 |
| 2 | 16 | -22.80 | 13.97 | 3.67 | -6.16 |
| 3 | 23 | ∞ | 0.00 | 0.00 | -0.00 |
| 4 | 24 | 85.00 | 4.66 | -1.11 | -3.98 |
| 5 | 26 | 65.00 | 11.28 | 0.78 | -6.41 |
| 6 | 31 | -502.40 | 20.08 | 43.82 | 27.17 |

Numerical Embodiment 2

Unit mm

Surface data

| Surface number i | ri | di | ndi | vdi | Effective diameter |
|---|---|---|---|---|---|
| 1* | 113.703 | 2.35 | 1.77250 | 49.6 | 67.99 |
| 2 | 22.597 | 16.64 | | | 44.28 |
| 3 | 73.335 | 1.90 | 1.58313 | 59.4 | 42.54 |
| 4* | 20.187 | 9.03 | | | 35.99 |
| 5 | 195.447 | 1.90 | 1.69680 | 55.5 | 35.65 |
| 6 | 36.621 | 4.90 | | | 34.16 |
| 7 | 52.226 | 1.90 | 1.59522 | 67.7 | 36.86 |
| 8 | 30.482 | 9.20 | 1.67270 | 32.1 | 37.64 |
| 9 | -193.358 | 1.19 | | | 37.76 |
| 10 | 82.793 | 5.21 | 1.62041 | 60.3 | 37.69 |
| 11 | -168.583 | 3.69 | | | 37.31 |
| 12 | 466.888 | 1.50 | 1.85478 | 24.8 | 34.98 |
| 13 | 26.287 | 7.31 | 1.49700 | 81.5 | 33.03 |
| 14 | 489.422 | 0.20 | | | 33.09 |
| 15 | 51.952 | 7.52 | 1.76385 | 48.5 | 33.30 |
| 16 | -52.718 | (Variable) | | | 32.77 |
| 17 | 18,789.032 | 1.00 | 1.88300 | 40.8 | 18.53 |
| 18 | 19.460 | 2.95 | | | 16.68 |
| 19 | -86.466 | 1.00 | 1.77250 | 49.6 | 16.42 |
| 20 | 80.818 | 1.00 | | | 16.19 |
| 21 | 40.320 | 1.00 | 1.49700 | 81.5 | 16.08 |
| 22 | 31.256 | 2.29 | 1.85478 | 24.8 | 16.39 |
| 23 | -4,187.237 | (Variable) | | | 16.55 |
| 24 (Stop) | ∞ | (Variable) | | | 17.03 |
| 25 | 63.477 | 2.42 | 1.69680 | 55.5 | 17.52 |
| 26 | 317.373 | (Variable) | | | 17.58 |
| 27 | 26.860 | 1.15 | 1.95375 | 32.3 | 17.79 |
| 28 | 17.290 | 0.18 | | | 17.23 |
| 29 | 17.166 | 5.97 | 1.48749 | 70.2 | 17.37 |
| 30 | -63.521 | (Variable) | | | 17.24 |
| 31 | -51.444 | 1.15 | 1.88300 | 40.8 | 15.57 |
| 32 | 32.658 | 3.40 | 1.84666 | 23.8 | 16.39 |
| 33 | -54.456 | 11.52 | | | 16.91 |
| 34 | 40.309 | 4.42 | 1.48749 | 70.2 | 21.04 |
| 35 | -45.849 | 0.20 | | | 21.08 |
| 36 | -110.756 | 1.30 | 1.95375 | 32.3 | 20.89 |
| 37 | 18.035 | 5.95 | 1.49700 | 81.5 | 20.84 |
| 38 | -209.702 | 7.42 | | | 21.95 |
| 39 | 98.419 | 10.44 | 1.49700 | 81.5 | 27.80 |
| 40 | -19.310 | 2.00 | 2.00100 | 29.1 | 28.79 |
| 41* | -26.367 | 39.94 | | | 31.15 |
| Image surface | ∞ | | | | |

Aspherical surface data

First surface

K = -1.92284e+000  A4 = 7.15243e-006  A6 = -3.60896e-009
A8 = 1.30630e-012

Fourth surface

K = -8.97019e-001  A4 = 9.29083e-006  A6 = 1.50655e-008
A8 = -7.25000e-011

Forty-first surface

K = 2.73821e-001  A4 = 9.23770e-007  A6 = -1.89961e-009
A8 = 4.87802e-014

Various data
Zoom ratio 2.50

| | Wide angle | Intermediate | Telephoto |
|---|---|---|---|
| Focal length | 10.00 | 16.00 | 25.00 |
| F-number | 4.00 | 4.00 | 4.00 |
| Half angle of view | 57.26 | 44.19 | 31.88 |
| Image height | 15.55 | 15.55 | 15.55 |
| Total lens length | 221.23 | 221.23 | 221.23 |
| BF | 39.94 | 39.94 | 39.94 |
| d16 | 0.90 | 17.67 | 23.26 |
| d23 | 24.23 | 7.46 | 1.87 |
| d24 | 0.99 | 9.70 | 1.36 |
| d26 | 11.70 | 3.04 | 0.88 |
| d30 | 2.27 | 2.23 | 12.73 |
| Entrance pupil position | 22.42 | 24.57 | 25.31 |
| Exit pupil position | -365.80 | -412.19 | -261.70 |
| Front principal point position | 32.17 | 40.00 | 48.24 |
| Rear principal point position | 29.94 | 23.94 | 14.94 |

Zoom lens unit data

| Unit | First surface | Focal length | Lens structure length | Front principal point position | Rear principal point position |
|---|---|---|---|---|---|
| 1 | 1 | 22.35 | 74.42 | 36.29 | 51.30 |
| 2 | 17 | -27.26 | 9.24 | -1.08 | -8.52 |
| 3 | 24 | ∞ | 0.00 | 0.00 | -0.00 |
| 4 | 25 | 112.94 | 2.42 | -0.35 | -1.77 |
| 5 | 27 | 60.11 | 7.30 | 1.60 | -3.32 |
| 6 | 31 | 93.44 | 47.81 | 48.37 | 20.31 |

Numerical Embodiment 3

Unit mm

Surface data

| Surface number i | ri | di | ndi | vdi | Effective diameter |
|---|---|---|---|---|---|
| 1* | 77.840 | 2.35 | 1.77250 | 49.6 | 60.22 |
| 2 | 24.816 | 11.76 | | | 44.75 |
| 3 | 68.579 | 1.90 | 1.69680 | 55.5 | 43.52 |
| 4 | 30.958 | 7.80 | | | 38.99 |
| 5 | 1,803.976 | 1.90 | 1.69680 | 55.5 | 38.58 |
| 6 | 43.664 | 4.77 | | | 37.11 |
| 7 | 47.797 | 5.20 | 1.85478 | 24.8 | 38.20 |
| 8 | 325.867 | 1.97 | | | 37.71 |
| 9 | 276.681 | 4.00 | 1.58913 | 61.1 | 36.86 |
| 10 | -123.267 | 7.08 | | | 36.37 |
| 11 | 110.227 | 1.50 | 1.85478 | 24.8 | 32.15 |
| 12 | 28.053 | 7.76 | 1.49700 | 81.5 | 30.36 |
| 13 | -257.186 | 0.20 | | | 29.89 |
| 14 | 60.724 | 6.97 | 1.72916 | 54.7 | 30.94 |

-continued

Unit mm

| | | | | | |
|---|---|---|---|---|---|
| 15 | −59.258 | (Variable) | | | 30.92 |
| 16 | −123.189 | 1.00 | 1.88300 | 40.8 | 20.97 |
| 17 | 28.673 | 4.19 | | | 20.50 |
| 18 | −48.415 | 1.00 | 1.49700 | 81.5 | 21.01 |
| 19 | 32.176 | 4.49 | 1.85478 | 24.8 | 22.90 |
| 20 | 339.179 | (Variable) | | | 23.39 |
| 21 (Stop) | ∞ | (Variable) | | | 24.67 |
| 22 | 35.068 | 3.74 | 1.58313 | 59.4 | 26.37 |
| 23* | 172.032 | 1.50 | | | 26.27 |
| 24 | 116.367 | 2.25 | 1.58913 | 61.1 | 26.41 |
| 25 | 7,449.101 | (Variable) | | | 26.37 |
| 26 | 51.680 | 1.15 | 2.00100 | 29.1 | 26.27 |
| 27 | 31.102 | 5.84 | 1.48749 | 70.2 | 25.64 |
| 28 | −58.849 | (Variable) | | | 25.52 |
| 29 | 97.635 | 2.74 | 1.95906 | 17.5 | 21.44 |
| 30 | −82.427 | 1.15 | 2.00100 | 29.1 | 21.40 |
| 31 | 35.942 | 2.00 | | | 21.33 |
| 32 | 13,153.664 | 1.00 | 1.77250 | 49.6 | 21.58 |
| 33 | 116.568 | 4.97 | | | 22.11 |
| 34 | 38.361 | 8.38 | 1.49700 | 81.5 | 28.06 |
| 35 | −34.627 | 0.20 | | | 28.64 |
| 36 | 62.989 | 9.07 | 1.49700 | 81.5 | 28.05 |
| 37 | −24.213 | 1.30 | 1.95375 | 32.3 | 27.29 |
| 38 | −124.215 | 39.97 | | | 28.00 |
| Image surface | ∞ | | | | |

Aspherical surface data

First surface

K = 2.66965e+000  A4 = 2.25957e−006  A6 = −7.54880e−010
A8 = 3.36155e−013

Twenty-third surface

K = 0.00000e+000  A4 = 7.47569e−006  A6 = 2.44200e−009
A8 = −5.21954e−012

Various data
Zoom ratio 2.50

| | Wide angle | Intermediate | Telephoto |
|---|---|---|---|
| Focal length | 14.00 | 21.00 | 35.00 |
| F-number | 2.80 | 2.80 | 2.80 |
| Half angle of view | 48.00 | 36.52 | 23.95 |
| Image height | 15.55 | 15.55 | 15.55 |
| Total lens length | 204.69 | 204.69 | 204.69 |
| BF | 39.97 | 39.97 | 39.97 |
| d15 | 0.97 | 11.47 | 21.81 |
| d20 | 24.08 | 13.57 | 3.23 |
| d21 | 4.31 | 4.14 | 1.46 |
| d25 | 12.52 | 5.89 | 0.87 |
| d28 | 1.73 | 8.53 | 16.23 |
| Entrance pupil position | 26.93 | 29.64 | 32.53 |
| Exit pupil position | −96.56 | −84.83 | −76.75 |
| Front principal point position | 39.49 | 47.11 | 57.03 |
| Rear principal point position | 25.97 | 18.97 | 4.97 |

Zoom lens unit data

| Unit | First surface | Focal length | Lens structure length | Front principal point position | Rear principal point position |
|---|---|---|---|---|---|
| 1 | 1 | 30.99 | 65.14 | 41.12 | 41.62 |
| 2 | 16 | −25.00 | 10.68 | 0.59 | −7.16 |
| 3 | 21 | ∞ | 0.00 | 0.00 | −0.00 |
| 4 | 22 | 55.15 | 7.49 | 0.62 | −4.70 |
| 5 | 26 | 89.96 | 6.99 | 2.53 | −2.06 |
| 6 | 29 | 220.45 | 30.81 | 38.71 | 22.82 |

Numerical Embodiment 4

Unit mm

Surface data

| Surface number i | ri | di | ndi | vdi | Effective diameter |
|---|---|---|---|---|---|
| 1* | 128.935 | 2.35 | 1.77250 | 49.6 | 69.29 |
| 2 | 29.953 | 14.53 | | | 51.92 |
| 3 | 183.038 | 1.90 | 1.69680 | 55.5 | 50.90 |
| 4 | 48.635 | 6.77 | | | 47.36 |
| 5 | 260.459 | 1.90 | 1.69680 | 55.5 | 47.01 |
| 6 | 81.421 | 2.13 | | | 46.18 |
| 7 | 53.022 | 3.96 | 1.89286 | 20.4 | 46.49 |
| 8 | 110.841 | 3.62 | | | 46.07 |
| 9 | 2,448.062 | 4.71 | 1.60311 | 60.6 | 45.55 |
| 10 | −95.719 | 10.03 | | | 45.06 |
| 11 | 99.367 | 1.50 | 1.85478 | 24.8 | 38.58 |
| 12 | 34.978 | 7.15 | 1.49700 | 81.5 | 36.72 |
| 13 | −390.242 | 0.20 | | | 37.14 |
| 14 | 68.479 | 6.36 | 1.72916 | 54.7 | 38.40 |
| 15 | −87.355 | (Variable) | | | 38.34 |
| 16 | −134.469 | 1.00 | 1.83481 | 42.7 | 24.19 |
| 17 | 28.990 | 3.96 | | | 21.82 |
| 18 | −48.897 | 1.00 | 1.43875 | 94.9 | 21.49 |
| 19 | 28.571 | 2.75 | 1.85478 | 24.8 | 22.59 |
| 20 | 90.487 | (Variable) | | | 22.69 |
| 21 (Stop) | ∞ | (Variable) | | | 23.17 |
| 22 | 37.945 | 3.07 | 1.58313 | 59.4 | 24.29 |
| 23* | 190.397 | (Variable) | | | 24.28 |
| 24 | 37.781 | 1.15 | 2.00100 | 29.1 | 24.66 |
| 25 | 23.600 | 0.20 | | | 23.98 |
| 26 | 23.209 | 6.34 | 1.48749 | 70.2 | 24.22 |
| 27 | −51.727 | (Variable) | | | 24.21 |
| 28 | −149.150 | 1.15 | 1.95375 | 32.3 | 18.95 |
| 29 | 31.213 | 2.14 | 1.95906 | 17.5 | 19.39 |
| 30 | 82.670 | (Variable) | | | 19.56 |
| 31 | 353.127 | 4.78 | 1.49700 | 81.5 | 28.76 |
| 32 | −39.407 | 0.20 | | | 29.30 |
| 33 | 107.693 | 4.74 | 1.48749 | 70.2 | 29.68 |
| 34 | −95.608 | 0.20 | | | 29.61 |
| 35 | −191.193 | 5.90 | 1.49700 | 81.5 | 29.46 |
| 36 | −30.640 | 1.30 | 2.00100 | 29.1 | 29.24 |
| 37 | −75.765 | (Variable) | | | 29.99 |
| Image surface | ∞ | | | | |

Aspherical surface data

First surface

K = −1.48632e−001  A4 = 1.72630e−006  A6 = −3.98149e−010
A8 = 1.25577e−013

Twenty-third surface

K = 0.00000e+000  A4 = 5.70093e−006  A6 = −1.44525e−009
A8 = 1.28614e−011

Various data
Zoom ratio 5.00

| | Wide angle | Intermediate | Telephoto |
|---|---|---|---|
| Focal length | 14.00 | 30.00 | 70.00 |
| F-number | 4.00 | 4.00 | 4.00 |
| Half angle of view | 48.00 | 27.39 | 12.52 |

| Unit mm | | | |
|---|---|---|---|
| Image height | 15.55 | 15.55 | 15.55 |
| Total lens length | 238.99 | 238.99 | 238.99 |
| BF | 50.05 | 53.44 | 65.56 |
| d15 | 0.83 | 21.04 | 39.72 |
| d20 | 40.66 | 20.45 | 1.77 |
| d21 | 0.81 | 0.81 | 0.81 |
| d23 | 16.89 | 4.57 | 2.56 |
| d27 | 5.42 | 17.75 | 19.76 |
| d30 | 17.32 | 13.93 | 1.81 |
| d37 | 50.05 | 53.44 | 65.56 |
| Entrance pupil position | 31.11 | 38.88 | 47.72 |
| Exit pupil position | −229.85 | −126.84 | −55.63 |
| Front principal point position | 44.41 | 63.89 | 77.28 |
| Rear principal point position | 36.05 | 23.43 | −4.44 |

Zoom lens unit data

| Unit | First surface | Focal length | Lens structure length | Front principal point position | Rear principal point position |
|---|---|---|---|---|---|
| 1 | 1 | 42.91 | 67.13 | 48.37 | 47.06 |
| 2 | 16 | −25.14 | 8.71 | 1.07 | −5.44 |
| 3 | 21 | ∞ | 0.00 | 0.00 | −0.00 |
| 4 | 22 | 80.34 | 3.07 | −0.48 | −2.40 |
| 5 | 24 | 68.75 | 7.69 | 2.74 | −2.43 |
| 6 | 28 | −55.68 | 3.29 | 1.08 | −0.58 |
| 7 | 31 | 55.64 | 17.12 | 2.58 | −8.76 |

Numerical Embodiment 5

| Unit mm | | | | |
|---|---|---|---|---|

Surface data

| Surface number i | ri | di | ndi | vdi | Effective diameter |
|---|---|---|---|---|---|
| 1* | 83.563 | 2.35 | 1.77250 | 49.6 | 58.17 |
| 2 | 27.337 | 15.18 | | | 45.54 |
| 3 | −166.877 | 1.90 | 1.69680 | 55.5 | 44.09 |
| 4 | 47.709 | 11.56 | | | 40.93 |
| 5 | 63.875 | 3.20 | 1.85478 | 24.8 | 41.74 |
| 6 | 108.599 | 2.02 | | | 41.41 |
| 7 | 122.048 | 5.76 | 1.61800 | 63.3 | 41.35 |
| 8 | −106.548 | 4.20 | | | 41.05 |
| 9 | 64.857 | 1.50 | 1.85478 | 24.8 | 36.51 |
| 10 | 31.697 | 6.49 | 1.49700 | 81.5 | 34.35 |
| 11 | 488.411 | 4.23 | | | 34.12 |
| 12 | 73.885 | 5.63 | 1.69680 | 55.5 | 35.30 |
| 13 | −97.027 | (Variable) | | | 35.13 |
| 14 | −88.399 | 1.00 | 1.83481 | 42.7 | 25.05 |
| 15 | 38.508 | 2.14 | | | 24.68 |
| 16 | 160.000 | 1.00 | 1.58913 | 61.1 | 24.93 |
| 17 | 66.741 | 2.69 | | | 25.27 |
| 18 | −70.936 | 1.00 | 1.43875 | 94.9 | 25.47 |
| 19 | 44.719 | 3.49 | 1.85478 | 24.8 | 27.69 |
| 20 | −6,529.328 | (Variable) | | | 27.98 |
| 21 (Stop) | ∞ | (Variable) | | | 29.01 |
| 22 | 42.299 | 1.00 | 1.61772 | 49.8 | 30.79 |
| 23 | 31.250 | 4.58 | 1.58313 | 59.4 | 30.67 |
| 24* | 2,488.685 | (Variable) | | | 30.65 |
| 25 | 58.833 | 1.15 | 2.00069 | 25.5 | 30.97 |
| 26 | 36.251 | 6.86 | 1.48749 | 70.2 | 30.35 |
| 27 | −58.470 | (Variable) | | | 30.30 |
| 28 | 167.178 | 3.88 | 1.95906 | 17.5 | 30.40 |
| 29 | −55.345 | 1.15 | 2.00100 | 29.1 | 30.32 |
| 30 | 52.359 | 6.14 | | | 29.96 |
| 31 | 93.689 | 3.35 | 1.48749 | 70.2 | 32.66 |
| 32 | −310.364 | 0.20 | | | 32.97 |
| 33 | 55.351 | 6.59 | 1.59522 | 67.7 | 33.81 |
| 34 | −62.113 | 0.20 | | | 33.68 |
| 35 | 95.516 | 6.40 | 1.49700 | 81.5 | 31.75 |
| 36 | −37.533 | 1.30 | 2.00069 | 25.5 | 30.98 |
| 37 | 180.913 | 39.88 | | | 30.56 |
| Image surface | ∞ | | | | |

Aspherical surface data

First surface

K = 6.26870e−001  A4 = 1.92464e−006  A6 = 8.68699e−010
A8 = −1.95854e−012  A10 = 2.74368e−015  A12 = −1.63707e−018
A14 = 2.27287e−022  A16 = 1.50949e−025

Twenty-fourth surface

K = −6.55067e+004  A4 = 4.53129e−006  A6 = −2.92829e−010
A8 = 5.25270e−013

Various data
Zoom ratio 2.81

| | Wide angle | Intermediate | Telephoto |
|---|---|---|---|
| Focal length | 16.00 | 25.00 | 45.00 |
| F-number | 2.80 | 2.80 | 2.80 |
| Half angle of view | 44.18 | 31.88 | 19.06 |
| Image height | 15.55 | 15.55 | 15.55 |
| Total lens length | 220.09 | 220.09 | 220.09 |
| BF | 39.88 | 39.88 | 39.88 |
| d13 | 1.18 | 14.87 | 22.84 |
| d20 | 24.09 | 10.40 | 2.43 |
| d21 | 16.51 | 15.02 | 1.34 |
| d24 | 18.79 | 13.74 | 9.17 |
| d27 | 1.49 | 8.04 | 26.29 |
| Entrance pupil position | 30.08 | 34.17 | 36.50 |
| Exit pupil position | −154.22 | −119.61 | −76.76 |
| Front principal point position | 44.76 | 55.25 | 64.14 |
| Rear principal point position | 23.88 | 14.88 | −5.12 |

Zoom lens unit data

| Unit | First surface | Focal length | Lens structure length | Front principal point position | Rear principal point position |
|---|---|---|---|---|---|
| 1 | 1 | 41.06 | 64.02 | 46.35 | 44.00 |
| 2 | 14 | −30.52 | 11.32 | 0.10 | −8.61 |
| 3 | 21 | ∞ | 0.00 | 0.00 | −0.00 |
| 4 | 22 | 75.00 | 5.58 | −0.11 | −3.61 |
| 5 | 25 | 90.00 | 8.01 | 3.19 | −2.10 |
| 6 | 28 | 425.51 | 29.22 | 6.22 | −12.41 |

Numerical Embodiment 6

Unit mm

Surface Data

| Surface number i | ri | di | ndi | vdi | Effective diameter |
|---|---|---|---|---|---|
| 1* | 134.239 | 3.20 | 1.77250 | 49.6 | 80.53 |
| 2 | 41.501 | 23.47 | | | 64.82 |
| 3 | −83.617 | 2.70 | 1.77250 | 49.6 | 63.76 |
| 4 | 595.315 | 4.92 | | | 63.99 |
| 5 | 124.540 | 4.85 | 1.89286 | 20.4 | 65.04 |
| 6 | 542.396 | 2.01 | | | 64.75 |
| 7 | 891.609 | 7.62 | 1.59522 | 67.7 | 64.34 |
| 8 | −103.942 | 7.03 | | | 63.97 |
| 9 | 1,089.788 | 2.10 | 1.85478 | 24.8 | 57.74 |
| 10 | 66.895 | 9.54 | 1.49700 | 81.5 | 58.62 |
| 11 | −378.166 | 0.20 | | | 59.25 |
| 12 | 210.995 | 4.45 | 1.49700 | 81.5 | 61.08 |
| 13 | −629.084 | 0.20 | | | 61.42 |
| 14 | 145.928 | 9.06 | 1.59522 | 67.7 | 62.72 |
| 15 | −119.124 | 0.20 | | | 62.74 |
| 16 | 66.144 | 4.45 | 1.76385 | 48.5 | 59.20 |
| 17 | 123.151 | (Variable) | | | 58.61 |
| 18* | 214.375 | 1.40 | 1.88300 | 40.8 | 32.43 |
| 19 | 32.320 | 5.32 | | | 30.47 |
| 20 | −136.253 | 1.20 | 1.59522 | 67.7 | 30.55 |
| 21 | 34.069 | 5.54 | 1.85478 | 24.8 | 31.48 |
| 22 | −397.458 | 3.46 | | | 31.46 |
| 23 | −49.569 | 1.20 | 1.76385 | 48.5 | 31.34 |
| 24 | 281.941 | (Variable) | | | 32.32 |
| 25 (Stop) | ∞ | (Variable) | | | 32.99 |
| 26 | 51.039 | 3.92 | 1.59522 | 67.7 | 36.51 |
| 27* | 139.136 | (Variable) | | | 36.50 |
| 28 | 108.640 | 5.45 | 1.49700 | 81.5 | 41.11 |
| 29 | −136.833 | 0.20 | | | 41.18 |
| 30 | 79.210 | 1.66 | 2.00100 | 29.1 | 40.75 |
| 31 | 46.824 | 8.11 | 1.49700 | 81.5 | 39.68 |
| 32 | −99.285 | (Variable) | | | 39.49 |
| 33 | 60.126 | 5.87 | 1.95906 | 17.5 | 34.25 |
| 34 | −166.195 | 1.66 | 2.00069 | 25.5 | 33.36 |
| 35 | 33.049 | 2.95 | | | 31.18 |
| 36 | 33.456 | 7.69 | 1.48749 | 70.2 | 32.49 |
| 37 | −77.237 | 0.20 | | | 32.29 |
| 38 | 92.545 | 7.28 | 1.49700 | 81.5 | 31.04 |
| 39 | −36.721 | 1.87 | 1.95375 | 32.3 | 30.01 |
| 40 | 189.601 | 39.99 | | | 29.68 |
| Image surface | ∞ | | | | |

Aspherical surface data

First surface

K = 3.48651e+000  A4 = 1.59139e−007  A6 = 1.90332e−011
A8 = −4.47085e−014

Eighteenth surface

K = 0.00000e+000  A4 = 3.24271e−007  A6 = −2.92296e−011
A8 = −8.99730e−013

Twenty-seventh surface

K = 0.00000e+000  A4 = 3.14085e−006  A6 = 1.30590e−010
A8 = −2.00080e−013

Various data
Zoom ratio 7.06

| | Wide angle | Intermediate | Telephoto |
|---|---|---|---|
| Focal length | 17.00 | 50.00 | 120.00 |
| F-number | 2.80 | 2.80 | 3.60 |
| Half angle of view | 42.45 | 17.27 | 7.38 |
| Image height | 15.55 | 15.55 | 15.55 |
| Total lens length | 300.05 | 300.05 | 300.05 |
| BF | 39.99 | 39.99 | 39.99 |
| d17 | 1.17 | 31.16 | 41.24 |
| d24 | 41.84 | 11.85 | 1.77 |
| d25 | 13.02 | 13.42 | 1.89 |
| d27 | 40.21 | 22.33 | 4.82 |
| d32 | 12.85 | 30.34 | 59.38 |
| Entrance pupil position | 46.69 | 68.71 | 78.09 |
| Exit pupil position | −186.88 | −96.87 | −64.64 |
| Front principal point position | 62.42 | 100.45 | 60.47 |
| Rear principal point position | 22.99 | −10.01 | −80.01 |

Zoom lens unit data

| Unit | First surface | Focal length | Lens structure length | Front principal point position | Rear principal point position |
|---|---|---|---|---|---|
| 1 | 1 | 53.03 | 85.98 | 58.93 | 39.17 |
| 2 | 18 | −25.25 | 18.12 | 5.44 | −7.10 |
| 3 | 25 | ∞ | 0.00 | 0.00 | −0.00 |
| 4 | 26 | 132.74 | 3.92 | −1.40 | −3.82 |
| 5 | 28 | 67.92 | 15.41 | 4.20 | −6.13 |
| 6 | 33 | −324.09 | 27.52 | 54.51 | 31.46 |

Numerical Embodiment 7

Unit mm

Surface data

| Surface number i | ri | di | ndi | vdi | Effective diameter |
|---|---|---|---|---|---|
| 1* | 95.906 | 2.70 | 1.77250 | 49.6 | 52.12 |
| 2 | 30.349 | 14.15 | | | 42.97 |
| 3 | −62.227 | 1.98 | 1.79952 | 42.2 | 41.78 |
| 4 | 180.947 | 0.28 | | | 41.52 |
| 5 | 69.713 | 2.97 | 1.89286 | 20.4 | 41.79 |
| 6 | 93.661 | 2.00 | | | 41.31 |
| 7 | 95.036 | 7.06 | 1.59522 | 67.7 | 41.23 |
| 8 | −76.951 | 0.15 | | | 40.85 |
| 9 | 66.914 | 1.89 | 1.85478 | 24.8 | 37.79 |
| 10 | 37.821 | 3.46 | 1.49700 | 81.5 | 35.73 |
| 11 | 60.427 | 3.68 | | | 35.04 |
| 12 | 76.256 | 5.37 | 1.59522 | 67.7 | 36.89 |
| 13 | −129.240 | 0.18 | | | 37.14 |
| 14 | 52.144 | 4.40 | 1.76385 | 48.5 | 37.37 |
| 15 | 254.740 | (Variable) | | | 36.89 |
| 16* | −412.116 | 1.26 | 1.88300 | 40.8 | 23.86 |
| 17 | 30.078 | 3.71 | | | 22.51 |
| 18 | −83.197 | 1.08 | 1.59522 | 67.7 | 22.77 |
| 19 | 38.774 | 3.97 | 1.85478 | 24.8 | 23.98 |
| 20 | −149.522 | 2.27 | | | 24.26 |
| 21 | −60.042 | 1.08 | 1.76385 | 48.5 | 24.54 |
| 22 | 1,372.603 | (Variable) | | | 25.23 |
| 23 (Stop) | ∞ | (Variable) | | | 26.93 |
| 24* | 62.152 | 3.26 | 1.51633 | 64.1 | 28.54 |
| 25 | 389.353 | 1.00 | | | 28.94 |
| 26 | 286.095 | 2.58 | 1.48749 | 70.2 | 29.32 |
| 27 | −500.000 | (Variable) | | | 29.71 |
| 28 | 146.025 | 4.10 | 1.49700 | 81.5 | 30.49 |
| 29 | −89.281 | 0.18 | | | 30.69 |
| 30 | 46.352 | 1.49 | 2.00100 | 29.1 | 31.43 |
| 31 | 33.165 | 0.50 | | | 30.74 |
| 32 | 33.206 | 6.00 | 1.49700 | 81.5 | 31.05 |
| 33 | −204.969 | (Variable) | | | 31.01 |
| 34 | 40.973 | 3.90 | 1.95906 | 17.5 | 30.42 |
| 35 | 368.689 | 1.49 | 2.00069 | 25.5 | 29.86 |

-continued

Unit mm

| | | | | | |
|---|---|---|---|---|---|
| 36 | 27.667 | (Variable) | | | 27.72 |
| 37 | 28.197 | 6.18 | 1.48749 | 70.2 | 28.66 |
| 38 | −155.495 | 0.18 | | | 28.32 |
| 39 | 46.760 | 5.09 | 1.49700 | 81.5 | 27.16 |
| 40 | −78.080 | 1.68 | 1.95375 | 32.3 | 26.23 |
| 41 | 27.832 | 1.91 | | | 24.69 |
| 42 | 41.980 | 3.47 | 1.48749 | 70.2 | 25.11 |
| 43 | 336.276 | 39.97 | | | 25.24 |
| Image surface | ∞ | | | | |

Aspherical surface data

First surface

K = 5.79245e+000   A4 = 8.63641e−008   A6 = 2.25702e−010
A8 = −8.35034e−013

Sixteenth surface

K = 0.00000e+000   A4 = 1.72589e−006   A6 = −3.68621e−009
A8 = 3.39175e−012

Twenty-fourth surface

K = 0.00000e+000   A4 = −4.00518e−006   A6 = 3.28035e−009
A8 = −2.56707e−012

Various data
Zoom ratio 4.74

| | Wide angle | Intermediate | Telephoto |
|---|---|---|---|
| Focal length | 19.00 | 40.00 | 90.00 |
| F-number | 4.00 | 4.00 | 4.00 |
| Half angle of view | 39.30 | 21.24 | 9.80 |
| Image height | 15.55 | 15.55 | 15.55 |
| Total lens length | 230.00 | 230.00 | 230.00 |
| BF | 39.97 | 39.97 | 39.97 |
| d15 | 1.43 | 21.22 | 32.97 |
| d22 | 34.78 | 14.99 | 3.24 |
| d23 | 1.51 | 1.51 | 1.51 |
| d27 | 40.65 | 26.00 | 1.99 |
| d33 | 1.73 | 15.81 | 38.13 |
| d36 | 3.29 | 3.86 | 5.54 |
| Entrance pupil position | 33.31 | 46.57 | 55.74 |
| Exit pupil position | −103.58 | −63.48 | −47.07 |
| Front principal point position | 49.80 | 71.11 | 52.67 |
| Rear principal point position | 20.97 | −0.03 | −50.03 |

Zoom lens unit data

| Unit | First surface | Focal length | Lens structure length | Front principal point position | Rear principal point position |
|---|---|---|---|---|---|
| 1 | 1 | 58.01 | 50.26 | 44.81 | 33.40 |
| 2 | 16 | −23.88 | 13.37 | 2.43 | −7.06 |
| 3 | 23 | ∞ | 0.00 | 0.00 | −0.00 |
| 4 | 24 | 103.76 | 6.84 | 0.76 | −4.15 |
| 5 | 28 | 56.28 | 12.27 | 2.84 | −5.43 |
| 6 | 34 | −96.83 | 5.39 | 9.60 | 6.26 |
| 7 | 37 | 170.80 | 18.51 | −28.67 | −36.09 |

Numerical Embodiment 8

Unit mm

Surface data

| Surface number i | ri | di | ndi | vdi | Effective diameter |
|---|---|---|---|---|---|
| 1* | 99.898 | 2.70 | 1.77250 | 49.6 | 53.20 |
| 2 | 29.917 | 14.55 | | | 43.56 |
| 3 | −65.290 | 1.98 | 1.79952 | 42.2 | 42.52 |
| 4 | 135.585 | 0.28 | | | 42.38 |
| 5 | 65.783 | 4.00 | 1.89286 | 20.4 | 42.87 |
| 6 | 94.748 | 2.02 | | | 42.29 |
| 7 | 97.634 | 8.36 | 1.58913 | 61.1 | 42.31 |
| 8 | −70.877 | 0.18 | | | 41.85 |
| 9 | 66.062 | 1.89 | 1.85478 | 24.8 | 38.69 |
| 10 | 35.191 | 4.40 | 1.49700 | 81.5 | 36.83 |
| 11 | 72.331 | 3.34 | | | 36.43 |
| 12 | 78.941 | 5.19 | 1.59522 | 67.7 | 38.20 |
| 13 | −150.082 | 0.18 | | | 38.40 |
| 14 | 53.548 | 4.56 | 1.76385 | 48.5 | 38.62 |
| 15 | 679.842 | (Variable) | | | 38.25 |
| 16* | 841.829 | 1.26 | 1.88300 | 40.8 | 24.42 |
| 17 | 26.179 | 3.85 | | | 22.37 |
| 18 | −96.185 | 1.08 | 1.59522 | 67.7 | 22.59 |
| 19 | 30.046 | 4.24 | 1.85478 | 24.8 | 23.79 |
| 20 | −269.880 | 2.68 | | | 23.96 |
| 21 | −48.855 | 1.08 | 1.76385 | 48.5 | 24.15 |
| 22 | 1,984.051 | (Variable) | | | 24.93 |
| 23 | 44.357 | 3.27 | 1.59522 | 67.7 | 27.02 |
| 24* | 151.463 | (Variable) | | | 27.17 |
| 25 (Stop) | ∞ | (Variable) | | | 28.37 |
| 26 | 74.652 | 4.81 | 1.49700 | 81.5 | 29.11 |
| 27 | −76.289 | 0.18 | | | 29.24 |
| 28 | 44.024 | 1.49 | 2.00100 | 29.1 | 28.86 |
| 29 | 28.957 | 5.87 | 1.49700 | 81.5 | 27.84 |
| 30 | −160.652 | (Variable) | | | 27.56 |
| 31 | 42.316 | 2.41 | 1.95906 | 17.5 | 22.77 |
| 32 | 104.687 | 1.49 | 2.00069 | 25.5 | 22.37 |
| 33 | 31.942 | 18.36 | | | 21.59 |
| 34 | 71.905 | 5.58 | 1.49700 | 81.5 | 24.37 |
| 35 | −29.860 | 1.68 | 2.00100 | 29.1 | 24.35 |
| 36 | −89.165 | 39.95 | | | 25.08 |
| Image surface | ∞ | | | | |

Aspherical surface data

First surface

K = 5.68145e+000   A4 = 2.72649e−007   A6 = 1.02630e−010
A8 = −6.89945e−013

Sixteenth surface

K = 0.00000e+000   A4 = 1.18094e−006   A6 = −2.36052e−009
A8 = 1.32385e−015

Twenty-fourth surface

K = 0.00000e+000   A4 = 5.98096e−006   A6 = −9.26771e−010
A8 = −5.22395e−014

Various data
Zoom ratio 4.74

| | Wide angle | Intermediate | Telephoto |
|---|---|---|---|
| Focal length | 19.00 | 40.00 | 90.00 |
| F-number | 4.00 | 4.00 | 4.00 |
| Half angle of view | 39.30 | 21.24 | 9.80 |
| Image height | 15.55 | 15.55 | 15.55 |
| Total lens length | 220.03 | 220.03 | 220.03 |
| BF | 39.95 | 39.95 | 39.95 |
| d15 | 1.04 | 19.68 | 29.57 |
| d22 | 29.48 | 14.58 | 1.75 |
| d24 | 5.53 | 1.79 | 4.73 |

-continued

Unit mm

| | | | |
|---|---|---|---|
| d25 | 29.07 | 19.76 | 0.97 |
| d30 | 1.98 | 11.30 | 30.09 |
| Entrance pupil position | 33.20 | 47.10 | 57.66 |
| Exit pupil position | −86.90 | −66.42 | −54.93 |
| Front principal point position | 49.36 | 72.06 | 62.30 |
| Rear principal point position | 20.95 | −0.05 | −50.05 |

Zoom lens unit data

| Unit | First surface | Focal length | Lens structure length | Front principal point position | Rear principal point position |
|---|---|---|---|---|---|
| 1 | 1 | 48.50 | 53.64 | 42.62 | 30.34 |
| 2 | 16 | −21.50 | 14.19 | 3.11 | −6.82 |
| 3 | 23 | 103.83 | 3.27 | −0.84 | −2.86 |
| 4 | 25 | ∞ | 0.00 | 0.00 | −0.00 |
| 5 | 26 | 46.70 | 12.35 | 2.40 | −5.76 |
| 6 | 31 | −183.82 | 29.53 | 8.09 | −17.14 |

Numerical Embodiment 9

Unit mm

Surface data

| Surface number i | ri | di | ndi | vdi | Effective diameter |
|---|---|---|---|---|---|
| 1 | 199.573 | 3.20 | 1.77250 | 49.6 | 64.23 |
| 2 | 47.727 | 21.73 | | | 55.55 |
| 3 | −101.417 | 2.70 | 1.77250 | 49.6 | 50.12 |
| 4 | 218.492 | 0.23 | | | 49.61 |
| 5 | 104.813 | 5.00 | 1.80809 | 22.8 | 49.70 |
| 6 | −530.991 | 2.00 | | | 49.43 |
| 7 | 1,790.657 | 4.94 | 1.59522 | 67.7 | 48.29 |
| 8 | −103.572 | 7.26 | | | 48.17 |
| 9 | 416.430 | 2.10 | 1.85478 | 24.8 | 43.86 |
| 10 | 55.581 | 7.07 | 1.49700 | 81.5 | 42.35 |
| 11 | −257.500 | 0.15 | | | 42.08 |
| 12 | 104.270 | 4.90 | 1.49700 | 81.5 | 42.20 |
| 13 | −225.293 | 0.15 | | | 42.28 |
| 14 | 75.320 | 4.77 | 1.72916 | 54.7 | 42.19 |
| 15 | −459.857 | (Variable) | | | 41.86 |
| 16* | −1,679.002 | 1.40 | 1.88300 | 40.8 | 26.37 |
| 17 | 29.493 | 3.95 | | | 23.60 |
| 18 | −549.195 | 1.20 | 1.59522 | 67.7 | 22.81 |
| 19 | 28.249 | 4.29 | 1.85478 | 24.8 | 21.64 |
| 20 | −332.249 | 2.92 | | | 21.64 |
| 21 | −39.677 | 1.20 | 1.76385 | 48.5 | 21.53 |
| 22 | 393.426 | (Variable) | | | 22.12 |
| 23 (Stop) | ∞ | (Variable) | | | 25.52 |
| 24 | 47.914 | 3.28 | 1.59522 | 67.7 | 33.37 |
| 25* | 106.481 | (Variable) | | | 33.31 |
| 26 | 124.675 | 5.43 | 1.49700 | 81.5 | 36.01 |
| 27 | −83.443 | 0.20 | | | 36.11 |
| 28 | 115.151 | 1.66 | 2.00069 | 25.5 | 35.57 |
| 29 | 59.046 | 5.71 | 1.49700 | 81.5 | 34.90 |
| 30 | −102.432 | (Variable) | | | 34.74 |
| 31 | 76.292 | 3.70 | 1.95906 | 17.5 | 27.67 |
| 32 | −65.732 | 1.66 | 2.00069 | 25.5 | 27.42 |
| 33 | 36.085 | 4.57 | | | 26.10 |
| 34 | 35.994 | 8.27 | 1.43875 | 94.9 | 27.63 |
| 35 | −26.859 | 1.87 | 1.88300 | 40.8 | 27.55 |
| 36 | −64.356 | 45.27 | | | 28.53 |
| Image surface | ∞ | | | | |

-continued

Unit mm

Aspherical surface data

Sixteenth surface

K = −5.41916e+002  A4 = 2.05800e−006  A6 = −8.75128e−010
A8 = −1.60841e−012

Twenty-fifth surface

K = 0.00000e+000  A4 = 3.50176e−006  A6 = 1.15409e−010
A8 = −2.29043e−013

Various data
Zoom ratio 10.00

| | Wide angle | Intermediate | Telephoto |
|---|---|---|---|
| Focal length | 22.00 | 70.02 | 220.00 |
| F-number | 4.00 | 4.00 | 8.00 |
| Half angle of view | 35.25 | 12.52 | 4.04 |
| Image height | 15.55 | 15.55 | 15.55 |
| Total lens length | 290.22 | 290.22 | 290.22 |
| BF | 45.27 | 45.27 | 45.27 |
| d15 | 0.80 | 28.69 | 40.38 |
| d22 | 41.22 | 13.33 | 1.64 |
| d23 | 23.40 | 20.73 | 1.11 |
| d25 | 30.20 | 15.02 | 1.54 |
| d30 | 31.83 | 49.69 | 82.78 |
| Entrance pupil position | 45.70 | 76.30 | 95.14 |
| Exit pupil position | −177.84 | −109.14 | −79.30 |
| Front principal point position | 65.53 | 114.57 | −73.42 |
| Rear principal point position | 23.27 | −24.75 | −174.73 |

Zoom lens unit data

| Unit | First surface | Focal length | Lens structure length | Front principal point position | Rear principal point position |
|---|---|---|---|---|---|
| 1 | 1 | 54.00 | 66.20 | 50.99 | 25.96 |
| 2 | 16 | −22.42 | 14.95 | 4.08 | −6.17 |
| 3 | 23 | ∞ | 0.00 | 0.00 | −0.00 |
| 4 | 24 | 142.85 | 3.28 | −1.65 | −3.66 |
| 5 | 26 | 68.27 | 13.00 | 3.82 | −4.80 |
| 6 | 31 | −200.58 | 20.07 | 1.09 | −13.30 |

Numerical Embodiment 10

Unit mm

Surface data

| Surface number i | ri | di | ndi | vdi | Effective diameter |
|---|---|---|---|---|---|
| 1 | 144.538 | 2.85 | 1.77250 | 49.6 | 51.01 |
| 2 | 37.247 | 11.10 | | | 44.20 |
| 3 | −102.691 | 2.38 | 1.77250 | 49.6 | 43.50 |
| 4 | 194.836 | 5.10 | | | 43.16 |
| 5 | 82.821 | 4.23 | 1.85478 | 24.8 | 43.64 |
| 6 | 652.055 | 1.19 | | | 43.28 |
| 7 | 144.761 | 5.33 | 1.59522 | 67.7 | 42.46 |
| 8 | −126.425 | 7.08 | | | 41.80 |
| 9 | 144.229 | 1.90 | 1.85478 | 24.8 | 35.67 |
| 10 | 42.161 | 5.32 | 1.49700 | 81.5 | 33.82 |
| 11 | 188.338 | 0.47 | | | 33.23 |
| 12 | 92.559 | 4.67 | 1.59522 | 67.7 | 32.96 |
| 13 | −111.501 | 0.19 | | | 32.40 |

-continued

Unit mm

| | | | | | |
|---|---|---|---|---|---|
| 14 | 47.013 | 4.25 | 1.58913 | 61.1 | 31.86 |
| 15 | 307.335 | (Variable) | | | 31.22 |
| 16* | −60,798.810 | 1.33 | 1.88300 | 40.8 | 21.51 |
| 17 | 25.245 | 2.71 | | | 19.27 |
| 18 | 207.761 | 1.14 | 1.53775 | 74.7 | 18.68 |
| 19 | 24.750 | 3.04 | 1.85478 | 24.8 | 18.96 |
| 20 | 133.621 | 4.28 | | | 18.87 |
| 21 | −33.039 | 1.14 | 1.53775 | 74.7 | 18.89 |
| 22 | 159.777 | (Variable) | | | 19.48 |
| 23 (Stop) | ∞ | (Variable) | | | 20.07 |
| 24 | 47.858 | 3.05 | 1.58313 | 59.4 | 21.11 |
| 25* | 1,474.678 | (Variable) | | | 21.26 |
| 26 | 46.226 | 3.69 | 1.49700 | 81.5 | 21.87 |
| 27 | −156.528 | 0.19 | | | 22.07 |
| 28 | 69.175 | 1.57 | 1.88300 | 40.8 | 22.19 |
| 29 | 26.432 | 4.74 | 1.49700 | 81.5 | 21.85 |
| 30 | −94.711 | (Variable) | | | 22.02 |
| 31 | 44.613 | 1.57 | 1.48749 | 70.2 | 22.33 |
| 32 | 26.917 | 10.18 | | | 21.95 |
| 33 | 140.562 | 4.92 | 1.43875 | 94.9 | 23.77 |
| 34 | −30.637 | 1.78 | 1.88300 | 40.8 | 23.97 |
| 35 | −57.531 | 49.51 | | | 24.75 |
| Image surface | ∞ | | | | |

Aspherical surface data

Sixteenth surface

K = −3.51290e+008  A4 = 2.19875e−006  A6 = −1.30354e−009
A8 = −4.81192e−012

Twenty-fifth surface

K = 0.00000e+000  A4 = 4.55231e−006  A6 = 1.08190e−010
A8 = −8.44991e−013

Various data
Zoom ratio 5.00

| | Wide angle | Intermediate | Telephoto |
|---|---|---|---|
| Focal length | 24.00 | 55.00 | 120.00 |
| F-number | 5.60 | 5.60 | 5.60 |
| Half angle of view | 32.94 | 15.79 | 7.38 |
| Image height | 15.55 | 15.55 | 15.55 |
| Total lens length | 220.04 | 220.04 | 220.04 |
| BF | 49.51 | 49.51 | 49.51 |
| d15 | 1.40 | 18.41 | 24.99 |
| d22 | 25.37 | 8.36 | 1.78 |
| d23 | 11.03 | 10.77 | 1.42 |
| d25 | 22.81 | 12.68 | 0.50 |
| d30 | 8.52 | 18.91 | 40.45 |
| Entrance pupil position | 39.05 | 55.48 | 62.79 |
| Exit pupil position | −123.27 | −88.95 | −66.57 |
| Front principal point position | 59.72 | 88.64 | 58.73 |
| Rear principal point position | 25.51 | −5.49 | −70.49 |

Zoom lens unit data

| Unit | First surface | Focal length | Lens structure length | Front principal point position | Rear principal point position |
|---|---|---|---|---|---|
| 1 | 1 | 46.00 | 56.05 | 41.14 | 19.75 |
| 2 | 16 | −20.00 | 13.64 | 3.98 | −5.79 |
| 3 | 23 | ∞ | 0.00 | 0.00 | −0.00 |
| 4 | 24 | 84.42 | 3.05 | −0.06 | −1.98 |
| 5 | 26 | 58.32 | 10.20 | 1.52 | −5.26 |
| 6 | 31 | −394.26 | 18.46 | −18.11 | −35.67 |

Numerical Embodiment 11

Unit mm

Surface data

| Surface number i | ri | di | ndi | vdi | Effective diameter |
|---|---|---|---|---|---|
| 1* | 78.796 | 2.35 | 1.77250 | 49.6 | 61.22 |
| 2 | 30.245 | 19.27 | | | 49.77 |
| 3 | −66.908 | 1.90 | 1.72916 | 54.7 | 48.91 |
| 4 | 127.672 | 1.80 | | | 49.29 |
| 5 | 78.337 | 5.48 | 1.84666 | 23.8 | 50.65 |
| 6 | 1,181.435 | 1.19 | | | 50.46 |
| 7 | 870.713 | 6.87 | 1.59522 | 67.7 | 50.22 |
| 8 | −71.173 | 8.04 | | | 49.95 |
| 9 | −72.063 | 5.10 | 1.48749 | 70.2 | 42.81 |
| 10 | −37.378 | 1.50 | 1.85478 | 24.8 | 42.35 |
| 11 | −49.740 | 0.20 | | | 42.62 |
| 12 | 87.378 | 1.50 | 1.85478 | 24.8 | 37.70 |
| 13 | 40.514 | 6.38 | 1.49700 | 81.5 | 37.18 |
| 14 | 1,833.504 | 0.20 | | | 37.35 |
| 15 | 63.701 | 5.57 | 1.76385 | 48.5 | 37.77 |
| 16 | −294.752 | (Variable) | | | 37.37 |
| 17 | 246.226 | 1.00 | 1.59522 | 67.7 | 26.86 |
| 18 | 46.163 | 3.69 | | | 24.85 |
| 19 | −79.103 | 1.00 | 1.49700 | 81.5 | 24.67 |
| 20 | 27.826 | 4.20 | 1.85478 | 24.8 | 24.64 |
| 21 | 185.220 | 1.19 | | | 24.30 |
| 22 | −101.517 | 1.00 | 1.88300 | 40.8 | 24.28 |
| 23 | 53.663 | (Variable) | | | 24.23 |
| 24 (Stop) | ∞ | (Variable) | | | 24.83 |
| 25 | 41.591 | 1.00 | 1.85478 | 24.8 | 26.67 |
| 26 | 31.100 | 4.26 | 1.59282 | 68.6 | 26.47 |
| 27* | 353.621 | (Variable) | | | 26.52 |
| 28 | 46.718 | 1.15 | 1.85478 | 24.8 | 27.85 |
| 29 | 35.817 | 5.97 | 1.48749 | 70.2 | 27.82 |
| 30 | −64.682 | (Variable) | | | 28.14 |
| 31 | 37.254 | 3.28 | 1.95906 | 17.5 | 28.62 |
| 32 | 141.175 | 1.15 | 2.00069 | 25.5 | 28.20 |
| 33 | 26.308 | (Variable) | | | 26.73 |
| 34 | 34.396 | 5.26 | 1.48749 | 70.2 | 28.93 |
| 35 | −261.226 | 0.20 | | | 28.93 |
| 36 | 45.385 | 1.00 | 1.90366 | 31.3 | 28.75 |
| 37 | 24.440 | 4.75 | 1.49700 | 81.5 | 27.73 |
| 38 | 49.020 | 6.22 | | | 27.54 |
| 39 | −26.774 | 4.23 | 1.49700 | 81.5 | 27.61 |
| 40 | −21.898 | 1.00 | 1.69680 | 55.5 | 28.91 |
| 41 | −28.921 | 47.77 | | | 30.28 |
| Image surface | ∞ | | | | |

Aspherical surface data

First surface

K = −1.92711e+000  A4 = 1.29364e−006  A6 = 2.52635e−011
A8 = −3.53242e−014  A10 = 4.47343e−016  A12 = −5.62580e−019
A14 = 2.49738e−022  A16 = −3.18391e−026

Twenty-seventh surface

K = 0.00000e+000  A4 = 3.93101e−006  A6 = 1.31088e−009
A8 = 3.86330e−013

Various data
Zoom ratio 3.04

| | Wide angle | Intermediate | Telephoto |
|---|---|---|---|
| Focal length | 28.00 | 45.00 | 85.00 |
| F-number | 4.00 | 4.00 | 4.00 |
| Half angle of view | 37.69 | 25.67 | 14.28 |
| Image height | 21.63 | 21.63 | 21.63 |
| Total lens length | 230.06 | 230.06 | 230.06 |
| BF | 47.77 | 47.77 | 47.77 |
| d16 | 0.99 | 15.35 | 25.71 |

-continued

Unit mm

| | | | |
|---|---|---|---|
| d23 | 28.12 | 16.56 | 2.91 |
| d24 | 5.00 | 5.48 | 2.46 |
| d27 | 22.57 | 12.46 | 0.83 |
| d30 | 1.75 | 6.03 | 16.38 |
| d33 | 4.96 | 7.52 | 15.11 |
| Entrance pupil position | 39.61 | 47.81 | 51.06 |
| Exit pupil position | −79.06 | −65.49 | −65.22 |
| Front principal point position | 61.43 | 74.93 | 72.12 |
| Rear principal point position | 19.77 | 2.77 | −37.23 |

Zoom lens unit data

| Unit | First surface | Focal length | Lens structure length | Front principal point position | Rear principal point position |
|---|---|---|---|---|---|
| 1 | 1 | 50.35 | 67.34 | 50.39 | 35.70 |
| 2 | 17 | −28.30 | 12.08 | 6.38 | −2.12 |
| 3 | 24 | ∞ | 0.00 | 0.00 | −0.00 |
| 4 | 25 | 94.19 | 5.26 | −0.95 | −4.12 |
| 5 | 28 | 65.01 | 7.12 | 1.87 | −2.87 |
| 6 | 31 | −102.06 | 4.43 | 8.71 | 5.97 |
| 7 | 34 | 125.27 | 22.67 | −4.70 | −22.45 |

Numerical Embodiment 12

Unit mm

Surface data

| Surface number i | ri | di | ndi | vdi | Effective diameter |
|---|---|---|---|---|---|
| 1* | 90.018 | 2.43 | 1.77250 | 49.6 | 50.18 |
| 2 | 29.155 | 14.22 | | | 41.53 |
| 3 | −54.305 | 1.78 | 1.79952 | 42.2 | 40.38 |
| 4 | 122.610 | 0.14 | | | 40.48 |
| 5 | 70.338 | 2.99 | 1.89286 | 20.4 | 40.93 |
| 6 | 118.582 | 1.59 | | | 40.70 |
| 7 | 104.039 | 7.42 | 1.59522 | 67.7 | 40.81 |
| 8 | −66.784 | 0.17 | | | 40.55 |
| 9 | 67.246 | 1.70 | 1.85478 | 24.8 | 37.19 |
| 10 | 36.249 | 4.20 | 1.49700 | 81.5 | 35.68 |
| 11 | 70.880 | 3.18 | | | 36.03 |
| 12 | 88.009 | 5.60 | 1.59522 | 67.7 | 37.72 |
| 13 | −104.103 | 0.16 | | | 38.04 |
| 14 | 52.994 | 4.79 | 1.76385 | 48.5 | 38.39 |
| 15 | 608.171 | (Variable) | | | 37.94 |
| 16* | 508.798 | 1.13 | 1.88300 | 40.8 | 23.98 |
| 17 | 26.562 | 4.25 | | | 22.39 |
| 18 | −61.676 | 0.97 | 1.59522 | 67.7 | 22.61 |
| 19 | 38.656 | 3.62 | 1.85478 | 24.8 | 23.90 |
| 20 | −290.093 | (Variable) | | | 24.17 |
| 21 | −44.416 | 0.97 | 1.59522 | 67.7 | 24.78 |
| 22 | −225.471 | (Variable) | | | 25.68 |
| 23 (Stop) | ∞ | (Variable) | | | 26.78 |
| 24* | 82.314 | 3.30 | 1.51633 | 64.1 | 28.06 |
| 25 | −376.727 | 0.90 | | | 28.55 |
| 26 | 257.485 | 2.59 | 1.48749 | 70.2 | 29.09 |
| 27 | −450.000 | (Variable) | | | 29.45 |
| 28 | 98.474 | 4.44 | 1.49700 | 81.5 | 30.30 |
| 29 | −93.631 | 0.16 | | | 30.70 |
| 30 | 52.574 | 1.34 | 2.00100 | 29.1 | 31.21 |
| 31 | 35.362 | 0.45 | | | 30.61 |
| 32 | 34.832 | 5.71 | 1.49700 | 81.5 | 30.92 |
| 33 | −359.393 | (Variable) | | | 30.89 |
| 34 | 172.943 | 1.34 | 2.00100 | 29.1 | 30.68 |
| 35 | 38.007 | 3.15 | 1.95906 | 17.5 | 30.21 |
| 36 | 82.821 | 14.20 | | | 30.06 |
| 37 | −240.951 | 4.03 | 1.58913 | 61.1 | 31.82 |
| 38 | −46.688 | 0.16 | | | 32.06 |
| 39 | 57.168 | 7.52 | 1.49700 | 81.5 | 30.96 |
| 40 | −35.265 | 1.52 | 2.00100 | 29.1 | 30.32 |
| 41 | −6,190.993 | 49.53 | | | 30.37 |
| Image surface | ∞ | | | | |

Aspherical surface data

First surface

K = 5.13319e+000    A4 = 1.30284e−007    A6 = 6.56299e−011
A8 = −1.04805e−012

Sixteenth surface

K = 0.00000e+000    A4 = 1.42898e−006    A6 = −4.50847e−009
A8 = 3.50934e−012

Twenty-fourth surface

K = 0.00000e+000    A4 = −3.52306e−006    A6 = 3.74831e−009
A8 = −2.64711e−012

Various data
Zoom ratio 4.74

| | Wide angle | Intermediate | Telephoto |
|---|---|---|---|
| Focal length | 19.00 | 40.00 | 90.00 |
| F-number | 4.00 | 4.00 | 4.00 |
| Half angle of view | 39.30 | 21.25 | 9.80 |
| Image height | 15.55 | 15.55 | 15.55 |
| Total lens length | 240.58 | 240.58 | 240.58 |
| BF | 49.53 | 49.53 | 49.53 |
| d15 | 1.09 | 20.04 | 30.31 |
| d20 | 10.25 | 2.90 | 3.79 |
| d22 | 24.37 | 12.77 | 1.62 |
| d23 | 1.23 | 1.23 | 1.23 |
| d27 | 39.96 | 27.32 | 1.98 |
| d33 | 2.00 | 14.63 | 39.97 |
| Entrance pupil position | 32.12 | 44.43 | 52.82 |
| Exit pupil position | −265.20 | −132.66 | −83.51 |
| Front principal point position | 49.98 | 75.64 | 81.94 |
| Rear principal point position | 30.53 | 9.55 | −40.47 |

Zoom lens unit data

| Unit | First surface | Focal length | Lens structure length | Front principal point position | Rear principal point position |
|---|---|---|---|---|---|
| 1 | 1 | 50.50 | 50.39 | 42.19 | 31.15 |
| 2 | 16 | −32.24 | 9.97 | 0.22 | −7.31 |
| 3 | 21 | −92.79 | 0.97 | −0.15 | −0.76 |
| 4 | 23 | ∞ | 0.00 | 0.00 | −0.00 |
| 5 | 24 | 94.70 | 6.80 | 1.33 | −3.52 |
| 6 | 28 | 59.84 | 12.10 | 2.40 | −5.73 |
| 7 | 34 | −1,860.86 | 31.92 | −41.59 | −66.77 |

Numerical Embodiment 13

Unit mm

Surface data

| Surface number i | ri | di | ndi | vdi | Effective diameter |
|---|---|---|---|---|---|
| 1* | 91.439 | 2.29 | 1.77250 | 49.6 | 60.19 |
| 2 | 30.650 | 16.18 | | | 48.43 |
| 3 | −90.113 | 1.70 | 1.77250 | 49.6 | 47.62 |
| 4 | 82.752 | 0.20 | | | 46.59 |
| 5 | 59.860 | 4.88 | 1.85478 | 24.8 | 47.09 |
| 6 | 186.894 | 4.58 | | | 46.76 |
| 7 | −208.155 | 4.27 | 1.59522 | 67.7 | 46.65 |
| 8 | −68.920 | 8.65 | | | 46.76 |
| 9 | 78.112 | 1.40 | 1.85478 | 24.8 | 44.04 |
| 10 | 40.332 | 8.26 | 1.43875 | 94.9 | 42.63 |
| 11 | −332.216 | 0.20 | | | 42.53 |
| 12 | 83.842 | 4.17 | 1.49700 | 81.5 | 42.02 |
| 13 | −746.759 | 0.20 | | | 42.08 |
| 14 | 62.546 | 6.35 | 1.65160 | 58.5 | 42.47 |
| 15 | −157.017 | (Variable) | | | 42.19 |
| 16 | −183.698 | 0.90 | 1.81600 | 46.6 | 22.69 |
| 17 | 23.639 | 3.73 | | | 21.29 |
| 18 | −67.380 | 0.90 | 1.75500 | 52.3 | 21.42 |
| 19 | 165.971 | 0.20 | | | 22.18 |
| 20 | 39.342 | 4.33 | 1.85478 | 24.8 | 23.43 |
| 21 | −61.566 | 0.90 | 1.81600 | 46.6 | 23.54 |
| 22 | 60.666 | (Variable) | | | 23.77 |
| 23 (Stop) | ∞ | (Variable) | | | 24.77 |
| 24 | 201.877 | 3.28 | 1.61800 | 63.3 | 25.53 |
| 25 | −98.250 | 0.20 | | | 26.01 |
| 26 | 49.409 | 5.53 | 1.65160 | 58.5 | 26.65 |
| 27 | −41.463 | 1.20 | 1.74950 | 35.3 | 26.52 |
| 28 | 352.441 | (Variable) | | | 26.35 |
| 29 | 43.099 | 1.20 | 2.00069 | 25.5 | 26.28 |
| 30 | 34.211 | 0.75 | | | 25.96 |
| 31 | 43.005 | 4.16 | 1.48749 | 70.2 | 26.06 |
| 32 | −138.159 | (Variable) | | | 26.19 |
| 33 | −327.586 | 1.20 | 2.00069 | 25.5 | 26.29 |
| 34 | 207.682 | 0.20 | | | 26.40 |
| 35 | 41.219 | 3.69 | 1.92286 | 18.9 | 26.91 |
| 36 | −2,687.752 | 1.20 | 1.78470 | 26.3 | 26.63 |
| 37 | 32.044 | 5.66 | | | 25.75 |
| 38 | 69.333 | 3.40 | 1.53775 | 74.7 | 27.05 |
| 39 | −126.138 | 0.20 | | | 27.12 |
| 40 | 47.255 | 6.41 | 1.43875 | 94.9 | 27.02 |
| 41 | −34.706 | 1.20 | 1.95375 | 32.3 | 26.66 |
| 42 | −1,068.251 | 34.42 | | | 26.94 |
| Image surface | ∞ | | | | |

Aspherical surface data
First surface

K = −1.81302e+000   A4 = 8.42998e−007   A6 = 4.16656e−010
A8 = −2.88945e−013

Zoom movement amount data

U21 = 32.14740
U31 = 7.05092   U32 = −5.98070   U33 = 35.14777
U34 = −39.19330   U35 = 3.90115   U36 = −9.37366

Various data
Zoom ratio 5.29

| | Wide angle | Intermediate | Telephoto |
|---|---|---|---|
| Focal length | 17.00 | 37.03 | 90.00 |
| F-number | 4.00 | 4.00 | 4.00 |
| Half angle of view | 42.45 | 22.78 | 9.80 |
| Image height | 15.55 | 15.55 | 15.55 |
| Total lens length | 235.17 | 235.17 | 235.17 |
| BF | 34.42 | 34.42 | 34.42 |
| d15 | 1.11 | 23.61 | 33.26 |
| d22 | 35.41 | 12.90 | 3.26 |
| d23 | 9.63 | 13.84 | 1.19 |
| d28 | 38.86 | 18.64 | 1.19 |
| d32 | 2.00 | 18.01 | 48.11 |
| Entrance pupil position | 34.55 | 49.40 | 57.97 |
| Exit pupil position | −121.13 | −97.40 | −68.58 |
| Front principal point position | 49.70 | 76.02 | 69.34 |
| Rear principal point position | 17.42 | −2.61 | −55.58 |

Zoom lens unit data

| Unit | First surface | Focal length | Lens structure length | Front principal point position | Rear principal point position |
|---|---|---|---|---|---|
| 1 | 1 | 42.01 | 63.31 | 45.63 | 31.62 |
| 2 | 16 | −20.89 | 10.96 | 1.61 | −5.75 |
| 3 | 24 | 54.55 | 10.21 | 0.88 | −5.30 |
| 4 | 29 | 110.63 | 6.12 | 1.40 | −2.80 |
| 5 | 33 | −1,202.51 | 23.15 | 63.68 | 45.16 |

Single lens data

| Lens | First surface | Focal length |
|---|---|---|
| 1 | 1 | −60.39 |
| 2 | 3 | −55.34 |
| 3 | 5 | 100.27 |
| 4 | 7 | 170.54 |
| 5 | 9 | −98.33 |
| 6 | 10 | 82.33 |
| 7 | 12 | 151.48 |
| 8 | 14 | 69.16 |
| 9 | 16 | −25.49 |
| 10 | 18 | −63.08 |
| 11 | 20 | 28.38 |
| 12 | 21 | −37.13 |
| 13 | 24 | 106.98 |
| 14 | 26 | 35.31 |
| 15 | 27 | −49.10 |
| 16 | 29 | −176.20 |
| 17 | 31 | 67.56 |
| 18 | 33 | −125.71 |
| 19 | 35 | 43.48 |
| 20 | 36 | −39.99 |
| 21 | 38 | 83.44 |
| 22 | 40 | 46.60 |
| 23 | 41 | −37.36 |

Numerical Embodiment 14

Unit mm

Surface data

| Surface number i | ri | di | ndi | vdi | Effective diameter |
|---|---|---|---|---|---|
| 1 | 151.182 | 2.85 | 1.77250 | 49.6 | 51.61 |
| 2 | 37.054 | 11.23 | | | 44.62 |
| 3 | −108.262 | 2.38 | 1.77250 | 49.6 | 43.97 |
| 4 | 306.424 | 5.44 | | | 43.69 |
| 5 | 79.631 | 4.06 | 1.85478 | 24.8 | 43.84 |
| 6 | 428.229 | 1.27 | | | 43.46 |
| 7 | 213.865 | 4.94 | 1.59522 | 67.7 | 42.77 |
| 8 | −119.863 | 8.00 | | | 42.14 |
| 9 | 144.587 | 1.90 | 1.85478 | 24.8 | 35.38 |

-continued

Unit mm

| | | | | |
|---|---|---|---|---|
| 10 | 42.296 | 4.59 | 1.49700 | 81.5 | 33.61 |
| 11 | 170.717 | 0.47 | | | 33.21 |
| 12 | 78.853 | 4.98 | 1.59522 | 67.7 | 32.91 |
| 13 | −101.573 | 0.19 | | | 32.36 |
| 14 | 46.628 | 3.84 | 1.58913 | 61.1 | 31.64 |
| 15 | 174.884 | (Variable) | | | 30.99 |
| 16* | ∞ | 1.33 | 1.88300 | 40.8 | 21.46 |
| 17 | 25.235 | 2.74 | | | 19.23 |
| 18 | 232.123 | 1.14 | 1.53775 | 74.7 | 18.62 |
| 19 | 24.583 | 3.03 | 1.85478 | 24.8 | 18.89 |
| 20 | 131.571 | 4.19 | | | 18.80 |
| 21 | −33.021 | 1.14 | 1.53775 | 74.7 | 18.83 |
| 22 | 172.990 | (Variable) | | | 19.42 |
| 23 (Stop) | ∞ | (Variable) | | | 20.01 |
| 24 | 48.026 | 3.01 | 1.58313 | 59.4 | 21.00 |
| 25* | 1,306.064 | (Variable) | | | 21.14 |
| 26 | 46.277 | 3.67 | 1.49700 | 81.5 | 21.81 |
| 27 | −154.226 | 0.19 | | | 22.01 |
| 28 | 69.084 | 1.57 | 1.88300 | 40.8 | 22.13 |
| 29 | 26.494 | 4.70 | 1.49700 | 81.5 | 21.80 |
| 30 | −93.642 | (Variable) | | | 21.97 |
| 31 | 44.710 | 1.57 | 1.48749 | 70.2 | 22.24 |
| 32 | 26.789 | 10.58 | | | 21.86 |
| 33 | 133.694 | 4.86 | 1.43875 | 94.9 | 23.78 |
| 34 | −31.673 | 1.78 | 1.88300 | 40.8 | 23.97 |
| 35 | −59.962 | 50.01 | | | 24.72 |
| Image surface | ∞ | | | | |

Aspherical surface data

Sixteenth surface

K = −2.37744e+009  A4 = 2.06174e−006  A6 = −1.42423e−009
A8 = −4.74999e−012

Twenty-fifth surface

K = 0.00000e+000  A4 = 4.59584e−006  A6 = 2.07147e−010
A8 = −1.15848e−012

Zoom movement amount data

U21 = 23.66823
U31 = −4.76378   U32 = 24.32548   U33 = 15.97729
U34 = −99.12101  U35 = 68.59309   U36 = −14.78897

Focus movement amount data

Movement amount of U12    5.16022
C13 = −0.77175

Various data
Zoom ratio 5.00

| | Wide angle | Intermediate | Telephoto |
|---|---|---|---|
| Focal length | 24.00 | 53.14 | 120.00 |
| F-number | 5.60 | 5.60 | 5.60 |
| Half angle of view | 32.94 | 16.31 | 7.38 |
| Image height | 15.55 | 15.55 | 15.55 |
| Total lens length | 220.06 | 220.06 | 220.06 |
| BF | 50.01 | 50.01 | 50.01 |
| d15 | 1.33 | 17.90 | 25.00 |
| d22 | 25.43 | 8.86 | 1.76 |
| d23 | 11.12 | 11.17 | 1.34 |
| d25 | 22.55 | 12.90 | 0.98 |
| d30 | 7.97 | 17.56 | 39.31 |
| Entrance pupil position | 39.31 | 55.29 | 63.23 |
| Exit pupil position | −122.49 | −90.25 | −66.14 |
| Front principal point position | 59.97 | 88.30 | 59.26 |
| Rear principal point position | 26.01 | −3.14 | −69.99 |

Zoom lens unit data

| Unit | First surface | Focal length | Lens structure length | Front principal point position | Rear principal point position |
|---|---|---|---|---|---|
| 1 | 1 | 46.00 | 56.15 | 41.35 | 19.58 |
| 2 | 16 | −20.00 | 13.57 | 3.92 | −5.81 |
| 3 | 24 | 85.09 | 3.01 | −0.07 | −1.97 |
| 4 | 26 | 57.85 | 10.13 | 1.53 | −5.21 |
| 5 | 31 | −379.11 | 18.79 | −17.55 | −35.46 |

Single lens data

| Lens | First surface | Focal length |
|---|---|---|
| 1 | 1 | −63.93 |
| 2 | 3 | −102.81 |
| 3 | 5 | 112.75 |
| 4 | 7 | 129.31 |
| 5 | 9 | −69.88 |
| 6 | 10 | 111.47 |
| 7 | 12 | 75.09 |
| 8 | 14 | 106.32 |
| 9 | 16 | −28.41 |
| 10 | 18 | −51.07 |
| 11 | 19 | 34.58 |
| 12 | 21 | −51.30 |
| 13 | 24 | 85.09 |
| 14 | 26 | 71.85 |
| 15 | 28 | −49.24 |
| 16 | 29 | 41.98 |
| 17 | 31 | −140.69 |
| 18 | 33 | 58.74 |
| 19 | 34 | −77.89 |

Numerical Embodiment 15

Unit mm

Surface data

| Surface number i | ri | di | ndi | vdi | Effective diameter |
|---|---|---|---|---|---|
| 1* | 65.303 | 1.70 | 1.80100 | 35.0 | 49.05 |
| 2 | 24.818 | 11.07 | | | 40.26 |
| 3 | 827.587 | 1.20 | 1.80100 | 35.0 | 39.75 |
| 4 | 66.619 | 5.75 | | | 38.61 |
| 5 | −70.568 | 1.20 | 1.61800 | 63.3 | 38.60 |
| 6 | 991.530 | 0.20 | | | 39.35 |
| 7 | 82.201 | 4.68 | 2.00069 | 25.5 | 40.16 |
| 8 | −326.872 | 1.15 | | | 40.02 |
| 9 | 110.763 | 3.48 | 1.59522 | 67.7 | 39.10 |
| 10* | −429.302 | 9.59 | | | 38.69 |
| 11 | 64.145 | 1.00 | 1.85478 | 24.8 | 34.03 |
| 12 | 33.449 | 6.07 | 1.43875 | 94.9 | 33.58 |
| 13 | 251.523 | 0.20 | | | 34.00 |
| 14 | 79.048 | 5.59 | 1.49700 | 81.5 | 34.54 |
| 15 | −177.233 | 0.20 | | | 34.76 |
| 16 | 153.550 | 4.76 | 1.72916 | 54.7 | 34.80 |
| 17 | −78.097 | (Variable) | | | 34.65 |
| 18 | −270.879 | 0.80 | 1.88300 | 40.8 | 23.31 |
| 19 | 30.151 | 4.21 | | | 22.59 |
| 20 | −69.579 | 0.80 | 1.65160 | 58.5 | 22.92 |
| 21 | 268.975 | 1.59 | | | 23.55 |
| 22 | 48.249 | 4.62 | 1.85478 | 24.8 | 25.38 |

-continued

Unit mm

| | | | | | |
|---|---|---|---|---|---|
| 23 | −89.785 | 0.80 | 1.77250 | 49.6 | 25.47 |
| 24 | 64.341 | (Variable) | | | 25.57 |
| 25 (Stop) | ∞ | (Variable) | | | 26.46 |
| 26* | 37.838 | 4.39 | 1.58313 | 59.4 | 28.00 |
| 27 | −293.530 | 0.20 | | | 27.95 |
| 28 | 92.127 | 2.62 | 1.65160 | 58.5 | 27.77 |
| 29 | −1,462.645 | 1.00 | 1.74950 | 35.3 | 27.49 |
| 30 | 77.003 | (Variable) | | | 27.09 |
| 31 | 54.510 | 1.00 | 2.00069 | 25.5 | 26.90 |
| 32 | 39.212 | 1.00 | | | 26.45 |
| 33 | 58.977 | 4.08 | 1.48749 | 70.2 | 26.49 |
| 34 | −82.461 | (Variable) | | | 26.43 |
| 35 | 80.352 | 3.32 | 1.95906 | 17.5 | 27.34 |
| 36 | −207.144 | 1.83 | | | 27.20 |
| 37 | −138.477 | 1.00 | 1.85478 | 24.8 | 26.73 |
| 38 | 45.409 | 1.30 | | | 26.50 |
| 39 | 58.043 | 5.70 | 1.59522 | 67.7 | 26.89 |
| 40 | −45.171 | 1.60 | 1.72047 | 34.7 | 27.06 |
| 41 | −14,897.747 | 10.72 | | | 27.50 |
| 42 | −634.337 | 5.75 | 1.43875 | 94.9 | 29.68 |
| 43 | −32.789 | 1.00 | 2.00100 | 29.1 | 30.04 |
| 44 | −57.248 | 51.00 | | | 31.03 |
| Image surface | ∞ | | | | |

Aspherical surface data

First surface

K = −2.55264e−001　A4 = 1.52446e−006　A6 = 3.70002e−010
A8 = −1.76324e−013

Tenth surface

K = −3.63095e+001　A4 = 1.61251e−006　A6 = −4.24700e−010
A8 = −9.14016e−013

Twenty-sixth surface

K = 5.35918e−001　A4 = −4.47817e−006　A6 = −1.20201e−009
A8 = −2.26122e−012

Zoom movement amount data

U21 = 19.58464
U31 = 3.72449　U32 = −17.34816　U33 = 15.38325
U34 = −24.42959　U35 = 14.48850　U36 = −6.24911

Various data
Zoom ratio 3.00

| | Wide angle | Intermediate | Telephoto |
|---|---|---|---|
| Focal length | 28.00 | 46.66 | 84.00 |
| F-number | 4.00 | 4.50 | 4.50 |
| Half angle of view | 37.69 | 24.87 | 14.44 |
| Image height | 21.63 | 21.63 | 21.63 |
| Total lens length | 235.02 | 235.02 | 235.02 |
| BF | 51.00 | 51.00 | 51.00 |
| d17 | 0.98 | 12.73 | 20.57 |
| d24 | 23.17 | 11.42 | 3.59 |
| d25 | 14.84 | 11.82 | 1.41 |
| d30 | 25.05 | 15.18 | 4.43 |
| d34 | 2.80 | 15.69 | 36.85 |
| Entrance pupil position | 31.32 | 37.27 | 41.66 |
| Exit pupil position | −100.85 | −84.93 | −72.71 |
| Front principal point position | 54.15 | 67.91 | 68.62 |
| Rear principal point position | 23.00 | 4.35 | −33.00 |

-continued

Unit mm

Zoom lens unit data

| Unit | First surface | Focal length | Lens structure length | Front principal point position | Rear principal point position |
|---|---|---|---|---|---|
| 1 | 1 | 38.68 | 57.84 | 40.83 | 29.07 |
| 2 | 18 | −25.82 | 12.83 | 1.38 | −7.87 |
| 3 | 26 | 65.55 | 8.21 | −1.53 | −6.44 |
| 4 | 31 | 139.23 | 6.07 | 3.47 | −0.80 |
| 5 | 35 | −4,432.96 | 32.23 | 242.63 | 204.86 |

Single lens data

| Lens | First surface | Focal length |
|---|---|---|
| 1 | 1 | −50.59 |
| 2 | 3 | −89.91 |
| 3 | 5 | −106.16 |
| 4 | 7 | 65.41 |
| 5 | 9 | 147.76 |
| 6 | 11 | −82.25 |
| 7 | 12 | 86.97 |
| 8 | 14 | 110.47 |
| 9 | 16 | 71.31 |
| 10 | 18 | −30.51 |
| 11 | 20 | −84.41 |
| 12 | 22 | 36.94 |
| 13 | 23 | −48.18 |
| 14 | 26 | 57.53 |
| 15 | 28 | 132.56 |
| 16 | 29 | −96.92 |
| 17 | 31 | −143.05 |
| 18 | 33 | 70.97 |
| 19 | 35 | 59.91 |
| 20 | 37 | −39.53 |
| 21 | 39 | 43.42 |
| 22 | 40 | −62.46 |
| 23 | 42 | 78.38 |
| 24 | 43 | −77.65 |

Numerical Embodiment 16

Unit mm

Surface data

| Surface number i | ri | di | ndi | vdi | Effective diameter |
|---|---|---|---|---|---|
| 1* | 97.792 | 2.70 | 1.77250 | 49.6 | 53.27 |
| 2 | 29.474 | 15.34 | | | 43.47 |
| 3 | −56.318 | 1.98 | 1.77250 | 49.6 | 42.47 |
| 4 | 256.814 | 1.68 | | | 42.77 |
| 5 | 75.034 | 2.96 | 1.89286 | 20.4 | 43.60 |
| 6 | 121.200 | 2.03 | | | 43.30 |
| 7 | 134.312 | 7.69 | 1.62041 | 60.3 | 43.27 |
| 8 | −76.682 | 0.20 | | | 42.88 |
| 9 | 109.133 | 1.89 | 1.85478 | 24.8 | 39.65 |
| 10 | 40.897 | 6.51 | 1.49700 | 81.5 | 37.59 |
| 11 | 1,047.450 | 3.57 | | | 38.11 |
| 12 | 115.553 | 5.76 | 1.59522 | 67.7 | 40.10 |
| 13 | −97.158 | 0.18 | | | 40.30 |
| 14 | 57.813 | 4.39 | 1.76385 | 48.5 | 39.78 |
| 15 | 272.396 | (Variable) | | | 39.22 |
| 16* | 126.593 | 1.26 | 1.88300 | 40.8 | 24.15 |
| 17 | 25.583 | 4.21 | | | 22.23 |
| 18 | −89.927 | 1.08 | 1.59522 | 67.7 | 22.37 |
| 19 | 30.964 | 4.01 | 1.85478 | 24.8 | 23.12 |
| 20 | −241.861 | 2.97 | | | 23.18 |

-continued

Unit mm

| | | | | | |
|---|---|---|---|---|---|
| 21 | −38.064 | 1.08 | 1.76385 | 48.5 | 23.17 |
| 22 | −424.205 | (Variable) | | | 23.91 |
| 23 (Stop) | ∞ | (Variable) | | | 24.76 |
| 24 | 37.406 | 3.24 | 1.59522 | 67.7 | 26.48 |
| 25* | 97.863 | (Variable) | | | 26.43 |
| 26 | 86.583 | 4.63 | 1.49700 | 81.5 | 27.37 |
| 27 | −61.314 | 0.18 | | | 27.42 |
| 28 | 74.947 | 1.49 | 2.00100 | 29.1 | 26.85 |
| 29 | 37.523 | 4.89 | 1.49700 | 81.5 | 26.12 |
| 30 | −147.368 | (Variable) | | | 25.89 |
| 31 | 37.376 | 2.81 | 1.95906 | 17.5 | 25.89 |
| 32 | 88.563 | 1.49 | 2.00069 | 25.5 | 25.39 |
| 33 | 33.580 | 5.36 | | | 24.37 |
| 34 | 459.108 | 3.75 | 1.48749 | 70.2 | 24.55 |
| 35 | −45.965 | 0.18 | | | 24.60 |
| 36 | 132.563 | 5.48 | 1.49700 | 81.5 | 24.00 |
| 37 | −25.588 | 1.68 | 1.95375 | 32.3 | 23.54 |
| 38 | 1,781.582 | 43.52 | | | 23.90 |
| Image surface | ∞ | | | | |

Aspherical surface data

First surface

K = 5.58587e+000   A4 = 6.89166e−008   A6 = 1.67536e−010
A8 = −7.81810e−013

Sixteenth surface

K = 0.00000e+000   A4 = 1.99972e−007   A6 = −1.99181e−009
A8 = 6.32825e−013

Twenty-fifth surface

K = 0.00000e+000   A4 = 6.56253e−006   A6 = −6.81552e−011
A8 = 2.40306e−012

Zoom movement amount data

U21 = 28.55285
Usp1 = 10.44733   Usp2 = −18.81152   Usp3 = −7.30782
Usp4 = 4.06481    Usp5 = 11.94457    Usp6 = −9.34884E−006
U31 = −0.95657    U32 = 21.01994     U33 = 17.62048
U34 = −93.71109   U35 = 62.61010     U36 = −14.01060

Various data
Zoom ratio 4.74

| | Wide angle | Intermediate | Telephoto |
|---|---|---|---|
| Focal length | 19.00 | 39.17 | 90.00 |
| F-number | 4.00 | 4.00 | 4.00 |
| Half angle of view | 39.30 | 21.65 | 9.80 |
| Image height | 15.55 | 15.55 | 15.55 |
| Total lens length | 220.02 | 220.02 | 220.02 |
| BF | 43.52 | 43.52 | 43.52 |
| d15 | 0.98 | 19.54 | 29.53 |
| d22 | 29.98 | 10.37 | 1.77 |
| d23 | 9.24 | 12.87 | 1.48 |
| d25 | 25.72 | 14.74 | 4.71 |
| d30 | 3.90 | 12.31 | 32.34 |
| Entrance pupil position | 33.55 | 45.40 | 53.68 |
| Exit pupil position | −79.89 | −65.37 | −44.34 |
| Front principal point position | 49.63 | 70.48 | 51.48 |
| Rear principal point position | 24.52 | 4.35 | −46.48 |

Zoom lens unit data

| Unit | First surface | Focal length | Lens structure length | Front principal point position | Rear principal point position |
|---|---|---|---|---|---|
| 1 | 1 | 45.00 | 56.89 | 42.94 | 30.86 |
| 2 | 16 | −22.80 | 14.60 | 4.00 | −6.37 |
| 3 | 24 | 99.38 | 3.24 | −1.23 | −3.22 |
| 4 | 26 | 58.95 | 11.20 | 2.33 | −5.04 |
| 5 | 31 | −245.97 | 20.75 | 40.56 | 21.94 |

Single lens data

| Lens | First surface | Focal length |
|---|---|---|
| 1 | 1 | −55.31 |
| 2 | 3 | −59.34 |
| 3 | 5 | 211.66 |
| 4 | 7 | 79.48 |
| 5 | 9 | −76.79 |
| 6 | 10 | 85.20 |
| 7 | 12 | 89.27 |
| 8 | 14 | 94.77 |
| 9 | 16 | −36.31 |
| 10 | 18 | −38.43 |
| 11 | 19 | 32.03 |
| 12 | 21 | −54.54 |
| 13 | 24 | 99.38 |
| 14 | 26 | 72.77 |
| 15 | 28 | −75.99 |
| 16 | 29 | 60.53 |
| 17 | 31 | 64.79 |
| 18 | 32 | −54.29 |
| 19 | 34 | 85.63 |
| 20 | 36 | 43.53 |
| 21 | 37 | −26.25 |

Numerical Embodiment 17

Unit mm

Surface data

| Surface number i | ri | di | ndi | vdi | Effective diameter |
|---|---|---|---|---|---|
| 1* | 113.703 | 2.35 | 1.77250 | 49.6 | 67.99 |
| 2 | 22.597 | 16.64 | | | 44.28 |
| 3 | 73.335 | 1.90 | 1.58313 | 59.4 | 42.54 |
| 4* | 20.187 | 9.03 | | | 35.99 |
| 5 | 195.447 | 1.90 | 1.69680 | 55.5 | 35.65 |
| 6 | 36.621 | 4.90 | | | 34.16 |
| 7 | 52.226 | 1.90 | 1.59522 | 67.7 | 36.86 |
| 8 | 30.482 | 9.20 | 1.67270 | 32.1 | 37.64 |
| 9 | −193.358 | 1.19 | | | 37.76 |
| 10 | 82.793 | 5.21 | 1.62041 | 60.3 | 37.69 |
| 11 | −168.583 | 3.69 | | | 37.31 |
| 12 | 466.888 | 1.50 | 1.85478 | 24.8 | 34.98 |
| 13 | 26.287 | 7.31 | 1.49700 | 81.5 | 33.03 |
| 14 | 489.422 | 0.20 | | | 33.09 |
| 15 | 51.952 | 7.52 | 1.76385 | 48.5 | 33.30 |
| 16 | −52.718 | (Variable) | | | 32.77 |
| 17 | 18,789.032 | 1.00 | 1.88300 | 40.8 | 18.53 |
| 18 | 19.460 | 2.95 | | | 16.68 |
| 19 | −86.466 | 1.00 | 1.77250 | 49.6 | 16.42 |
| 20 | 80.818 | 1.00 | | | 16.19 |
| 21 | 40.320 | 1.00 | 1.49700 | 81.5 | 16.08 |
| 22 | 31.256 | 2.29 | 1.85478 | 24.8 | 16.39 |
| 23 | −4,187.237 | (Variable) | | | 16.55 |
| 24 (Stop) | ∞ | (Variable) | | | 17.03 |
| 25 | 63.477 | 2.42 | 1.69680 | 55.5 | 17.52 |

-continued

Unit mm

| | | | | | |
|---|---|---|---|---|---|
| 26 | 317.373 | (Variable) | | | 17.58 |
| 27 | 26.860 | 1.15 | 1.95375 | 32.3 | 17.79 |
| 28 | 17.290 | 0.18 | | | 17.23 |
| 29 | 17.166 | 5.97 | 1.48749 | 70.2 | 17.37 |
| 30 | -63.521 | (Variable) | | | 17.24 |
| 31 | -51.444 | 1.15 | 1.88300 | 40.8 | 15.57 |
| 32 | 32.658 | 3.40 | 1.84666 | 23.8 | 16.39 |
| 33 | -54.456 | 11.52 | | | 16.91 |
| 34 | 40.309 | 4.42 | 1.48749 | 70.2 | 21.04 |
| 35 | -45.849 | 0.20 | | | 21.08 |
| 36 | -110.756 | 1.30 | 1.95375 | 32.3 | 20.89 |
| 37 | 18.035 | 5.95 | 1.49700 | 81.5 | 20.84 |
| 38 | -209.702 | 7.42 | | | 21.95 |
| 39 | 98.419 | 10.44 | 1.49700 | 81.5 | 27.80 |
| 40 | -19.310 | 2.00 | 2.00100 | 29.1 | 28.79 |
| 41* | -26.367 | 39.94 | | | 31.15 |
| Image surface | ∞ | | | | |

Aspherical surface data

First surface

K = -1.92284e+000   A4 = 7.15243e-006   A6 = -3.60896e-009
A8 = 1.30630e-012

Fourth surface

K = -8.97019e-001   A4 = 9.29083e-006   A6 = 1.50655e-008
A8 = -7.25000e-011

Forty-first surface

K = 2.73821e-001   A4 = 9.23770e-007   A6 = -1.89961e-009
A8 = 4.87802e-014

Zoom movement amount data

U21 = 22.3598
U31 = 22.69680   U32 = -23.26067   U33 = 19.88770
U34 = 2.95128   U35 = -11.09764   U36 = -10.81065

Various data
Zoom ratio 2.50

| | Wide angle | Intermediate | Telephoto |
|---|---|---|---|
| Focal length | 10.00 | 16.00 | 25.00 |
| F-number | 4.00 | 4.00 | 4.00 |
| Half angle of view | 57.26 | 44.19 | 31.88 |
| Image height | 15.55 | 15.55 | 15.55 |
| Total lens length | 221.23 | 221.23 | 221.23 |
| BF | 39.94 | 39.94 | 39.94 |
| d16 | 0.90 | 17.67 | 23.26 |
| d23 | 24.23 | 7.46 | 1.87 |
| d24 | 0.99 | 9.70 | 1.36 |
| d26 | 11.70 | 3.04 | 0.88 |
| d30 | 2.27 | 2.23 | 12.73 |
| Entrance pupil position | 22.42 | 24.57 | 25.31 |
| Exit pupil position | -365.80 | -412.19 | -261.70 |
| Front principal point position | 32.17 | 40.00 | 48.24 |
| Rear principal point position | 29.94 | 23.94 | 14.94 |

Zoom lens unit data

| Unit | First surface | Focal length | Lens structure length | Front principal point position | Rear principal point position |
|---|---|---|---|---|---|
| 1 | 1 | 22.35 | 74.42 | 36.29 | 51.30 |
| 2 | 17 | -27.26 | 9.24 | -1.08 | -8.52 |
| 3 | 25 | 112.94 | 2.42 | -0.35 | -1.77 |
| 4 | 27 | 60.11 | 7.30 | 1.60 | -3.32 |
| 5 | 31 | 93.44 | 47.81 | 48.37 | 20.31 |

Single lens data

| Lens | First surface | Focal length |
|---|---|---|
| 1 | 1 | -36.75 |
| 2 | 3 | -48.21 |
| 3 | 5 | -64.72 |
| 4 | 7 | -126.71 |
| 5 | 8 | 39.51 |
| 6 | 10 | 89.86 |
| 7 | 12 | -32.33 |
| 8 | 13 | 55.44 |
| 9 | 15 | 35.19 |
| 10 | 17 | -21.93 |
| 11 | 19 | -53.68 |
| 12 | 21 | -289.58 |
| 13 | 22 | 35.96 |
| 14 | 25 | 112.94 |
| 15 | 27 | -53.67 |
| 16 | 29 | 28.32 |
| 17 | 31 | -22.35 |
| 18 | 32 | 24.31 |
| 19 | 34 | 44.60 |
| 20 | 36 | -16.06 |
| 21 | 37 | 33.61 |
| 22 | 39 | 33.37 |
| 23 | 40 | -83.37 |

Numerical Embodiment 18

Unit mm

Surface data

| Surface number i | ri | di | ndi | vdi | Effective diameter |
|---|---|---|---|---|---|
| 1 | 562.934 | 3.20 | 1.77250 | 49.6 | 71.99 |
| 2 | 57.833 | 13.95 | | | 63.02 |
| 3 | -156.055 | 2.70 | 1.77250 | 49.6 | 62.38 |
| 4 | 317.697 | 0.09 | | | 61.97 |
| 5 | 102.927 | 5.17 | 1.89286 | 20.4 | 62.15 |
| 6 | 502.336 | 1.20 | | | 61.79 |
| 7 | 456.378 | 7.09 | 1.59522 | 67.7 | 61.27 |
| 8 | -113.573 | 10.11 | | | 60.69 |
| 9 | 717.505 | 2.10 | 1.85478 | 24.8 | 51.44 |
| 10 | 58.493 | 7.53 | 1.49700 | 81.5 | 49.38 |
| 11 | -306.332 | 0.20 | | | 49.23 |
| 12 | 80.052 | 6.77 | 1.48749 | 70.2 | 47.81 |
| 13 | -168.517 | 0.20 | | | 47.23 |
| 14 | 73.153 | 4.39 | 1.76385 | 48.5 | 43.37 |
| 15 | 545.404 | (Variable) | | | 42.86 |
| 16* | -1,688.576 | 1.40 | 1.88300 | 40.8 | 29.57 |
| 17 | 29.494 | 3.94 | | | 25.99 |
| 18 | -550.701 | 1.20 | 1.59522 | 67.7 | 25.47 |
| 19 | 28.246 | 4.27 | 1.85478 | 24.8 | 23.91 |
| 20 | -331.870 | 2.91 | | | 23.25 |
| 21 | -39.684 | 1.20 | 1.76385 | 48.5 | 22.73 |
| 22 | 393.767 | (Variable) | | | 23.35 |
| 23 (Stop) | ∞ | (Variable) | | | 25.62 |
| 24 | 47.943 | 3.66 | 1.59522 | 67.7 | 31.57 |
| 25* | 106.370 | (Variable) | | | 31.53 |
| 26 | 124.725 | 4.89 | 1.49700 | 81.5 | 33.90 |
| 27 | -83.433 | 0.20 | | | 34.00 |
| 28 | 115.133 | 1.66 | 2.00069 | 25.5 | 33.60 |
| 29 | 59.080 | 5.46 | 1.49700 | 81.5 | 33.01 |
| 30 | -102.429 | (Variable) | | | 32.91 |
| 31 | 76.122 | 5.81 | 1.95906 | 17.5 | 29.64 |
| 32 | -83.750 | 1.66 | 2.00069 | 25.5 | 28.86 |
| 33 | 36.953 | 4.23 | | | 27.52 |

-continued

Unit mm

| 34 | 38.834 | 8.65 | 1.43875 | 94.9 | 28.99 |
| 35 | −27.698 | 1.87 | 1.88300 | 40.8 | 28.94 |
| 36 | −57.527 | 45.24 | | | 29.99 |
| Image surface | ∞ | | | | |

Aspherical surface data

Sixteenth surface

K = −2.44922e+004  A4 = 1.54355e−006  A6 = 5.37127e−011
A8 = −2.02838e−012

Twenty-fifth surface

K = 0.00000e+000  A4 = 3.53769e−006  A6 = −9.81912e−011
A8 = 1.21613e−013

Zoom movement amount data

U21 = 39.65971
U31 = 14.86705  U32 = −44.26662  U33 = 38.37101
U34 = 0.27553  U35 = −14.80050  U36 = −17.69515
U37 = −0.65142  U38 = 1.67986

Various data
Zoom ratio 10.00

| | Wide angle | Intermediate | Telephoto |
|---|---|---|---|
| Focal length | 22.00 | 70.00 | 220.00 |
| F-number | 4.00 | 4.00 | 6.99 |
| Half angle of view | 35.25 | 12.52 | 4.04 |
| Image height | 15.55 | 15.55 | 15.55 |
| Total lens length | 285.09 | 285.09 | 285.09 |
| BF | 45.24 | 45.24 | 45.24 |
| d15 | 1.18 | 29.12 | 40.84 |
| d22 | 41.26 | 13.32 | 1.60 |
| d23 | 23.61 | 20.91 | 1.39 |
| d25 | 30.19 | 15.06 | 1.49 |
| d30 | 25.90 | 43.73 | 76.83 |
| Entrance pupil position | 49.00 | 86.86 | 110.10 |
| Exit pupil position | −280.28 | −135.33 | −88.72 |
| Front principal point position | 69.52 | 129.72 | −31.20 |
| Rear principal point position | 23.24 | −24.76 | −174.76 |

Zoom lens unit data

| Unit | First surface | Focal length | Lens structure length | Front principal point position | Rear principal point position |
|---|---|---|---|---|---|
| 1 | 1 | 60.17 | 64.70 | 48.84 | 20.32 |
| 2 | 16 | −22.43 | 14.92 | 4.07 | −6.16 |
| 3 | 24 | 142.78 | 3.66 | −1.84 | −4.08 |
| 4 | 26 | 68.13 | 12.20 | 3.49 | −4.58 |
| 5 | 31 | −366.38 | 22.22 | 0.20 | −15.53 |

Single lens data

| Lens | First surface | Focal length |
|---|---|---|
| 1 | 1 | −83.27 |
| 2 | 3 | −134.49 |
| 3 | 5 | 142.46 |
| 4 | 7 | 152.96 |
| 5 | 9 | −73.91 |
| 6 | 10 | 99.22 |
| 7 | 12 | 111.95 |
| 8 | 14 | 109.62 |
| 9 | 16 | −32.63 |
| 10 | 18 | −44.95 |
| 11 | 19 | 30.33 |
| 12 | 21 | −46.91 |
| 13 | 24 | 142.78 |
| 14 | 26 | 101.08 |
| 15 | 28 | −121.96 |
| 16 | 29 | 76.02 |
| 17 | 31 | 41.78 |
| 18 | 32 | −25.21 |
| 19 | 34 | 38.28 |
| 20 | 35 | −61.97 |

Numerical Embodiment 19

Unit mm
Surface data

| Surface number i | ri | di | ndi | vdi | Effective diameter |
|---|---|---|---|---|---|
| 1 | 241.893 | 2.85 | 1.81600 | 46.6 | 51.67 |
| 2 | 41.243 | 12.84 | | | 45.57 |
| 3 | −120.340 | 2.38 | 1.81600 | 46.6 | 44.40 |
| 4 | 1,290.230 | 2.49 | | | 44.43 |
| 5 | 80.751 | 4.50 | 1.85478 | 24.8 | 44.67 |
| 6 | 555.686 | 1.99 | | | 44.23 |
| 7 | 881.945 | 4.05 | 1.59522 | 67.7 | 43.53 |
| 8 | −113.225 | 9.59 | | | 43.10 |
| 9 | 171.531 | 1.90 | 1.85478 | 24.8 | 38.18 |
| 10 | 47.819 | 5.28 | 1.49700 | 81.5 | 38.01 |
| 11 | 472.324 | 0.47 | | | 38.30 |
| 12 | 96.571 | 5.62 | 1.53775 | 74.7 | 38.91 |
| 13 | −87.790 | 0.19 | | | 38.98 |
| 14 | 44.779 | 4.20 | 1.58913 | 61.1 | 37.80 |
| 15 | 182.756 | (Variable) | | | 37.36 |
| 16* | ∞ | 1.33 | 1.88300 | 40.8 | 22.67 |
| 17 | 25.459 | 3.81 | | | 21.51 |
| 18 | −237.682 | 1.14 | 1.53775 | 74.7 | 21.77 |
| 19 | 26.955 | 3.56 | 1.85478 | 24.8 | 22.46 |
| 20 | 276.273 | 2.59 | | | 22.44 |
| 21 | −33.375 | 1.14 | 1.53775 | 74.7 | 22.46 |
| 22 | 341.208 | (Variable) | | | 23.36 |
| 23 | 48.863 | 3.19 | 1.59522 | 67.7 | 24.96 |
| 24* | 1,448.195 | 1.00 | | | 25.10 |
| 25 (Stop) | ∞ | (Variable) | | | 25.25 |
| 26 | 45.952 | 4.09 | 1.49700 | 81.5 | 25.74 |
| 27 | −148.523 | 0.19 | | | 25.62 |
| 28 | 68.973 | 1.57 | 1.88300 | 40.8 | 25.24 |
| 29 | 26.343 | 5.28 | 1.49700 | 81.5 | 24.29 |
| 30 | −91.443 | (Variable) | | | 24.15 |
| 31 | 34.572 | 1.57 | 1.51633 | 64.1 | 19.35 |
| 32 | 23.749 | 15.20 | | | 18.99 |
| 33 | 170.302 | 4.16 | 1.43875 | 94.9 | 21.78 |
| 34 | −31.731 | 1.78 | 1.88300 | 40.8 | 21.97 |
| 35 | −70.888 | 44.46 | | | 22.68 |
| Image surface | ∞ | | | | |

Aspherical surface data

Sixteenth surface

K = −1.33729e+016  A4 = 1.41985e−006  A6 = −5.85000e−010
A8 = −5.40164e−012

Twenty-fourth surface

K = 0.00000e+000  A4 = 4.60897e−006  A6 = 3.13168e−010
A8 = −7.78343e−013

-continued

Unit mm

Zoom movement amount data

U21 = 24.18000
U31 = −4.77841  U32 = 24.30657  U33 = 15.95279
U34 = −99.15343  U35 = 68.55736  U36 = −14.78897

Focus movement amount data

Movement amount of U12  4.086359
C13 = −0.755270

Various data
Zoom ratio 5.00

| | Wide angle | Intermediate | Telephoto |
|---|---|---|---|
| Focal length | 26.00 | 58.00 | 130.00 |
| F-number | 5.00 | 5.00 | 5.00 |
| Half angle of view | 30.88 | 15.01 | 6.82 |
| Image height | 15.55 | 15.55 | 15.55 |
| Total lens length | 222.20 | 222.20 | 222.20 |
| BF | 44.46 | 44.46 | 44.46 |
| d15 | 1.22 | 17.99 | 25.40 |
| d22 | 36.07 | 19.43 | 1.99 |
| d25 | 20.14 | 10.70 | 0.87 |
| d30 | 10.39 | 19.71 | 39.56 |
| Entrance pupil position | 41.74 | 62.81 | 69.38 |
| Exit pupil position | −61.62 | −54.92 | −59.33 |
| Front principal point position | 61.37 | 86.96 | 36.54 |
| Rear principal point position | 18.46 | −13.54 | −85.54 |

-continued

Unit mm

Zoom lens unit data

| Unit | First surface | Focal length | Lens structure length | Front principal point position | Rear principal point position |
|---|---|---|---|---|---|
| 1 | 1 | 46.00 | 58.34 | 42.17 | 18.91 |
| 2 | 16 | −20.00 | 13.57 | 3.37 | −6.23 |
| 3 | 23 | 84.59 | 4.19 | −0.07 | −3.06 |
| 4 | 26 | 57.18 | 11.12 | 1.79 | −5.64 |
| 5 | 31 | −191.66 | 22.70 | −0.76 | −21.43 |

Single lens data

| Lens | First surface | Focal length |
|---|---|---|
| 1 | 1 | −61.01 |
| 2 | 3 | −134.11 |
| 3 | 5 | 109.01 |
| 4 | 7 | 168.25 |
| 5 | 9 | −77.39 |
| 6 | 10 | 106.30 |
| 7 | 12 | 86.16 |
| 8 | 14 | 99.17 |
| 9 | 16 | −28.66 |
| 10 | 18 | −44.81 |
| 11 | 19 | 34.39 |
| 12 | 21 | −56.29 |
| 13 | 23 | 84.59 |
| 14 | 26 | 70.90 |
| 15 | 28 | −48.84 |
| 16 | 29 | 41.65 |
| 17 | 31 | −154.04 |
| 18 | 33 | 61.19 |
| 19 | 34 | −66.09 |

TABLE 1

Results of calculation of numerical values in the conditional expressions (1) to (8) for Embodiments 1 to 12

| Conditional Expression | | Numerical Embodiment | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| (1) | $(ft \times \beta 2w^2)/(fw \times \beta 2t^2)$ | 0.776 | 0.675 | 0.749 | 0.730 | 0.990 | 0.797 | 1.206 | 1.018 | 0.617 | 0.864 | 0.787 | 0.990 |
| (2) | f1/f2 | −1.974 | −0.820 | −1.240 | −1.707 | −1.345 | −2.101 | −2.429 | −2.256 | −2.409 | −2.300 | −1.779 | −2.405 |
| (3) | f3/f4 | 1.308 | 1.879 | 0.613 | — | 0.833 | 1.954 | — | 2.224 | 2.092 | 1.447 | 1.449 | — |
| (4) | L34t/L34w | 0.083 | 0.075 | 0.070 | — | 0.488 | 0.120 | — | 0.165 | 0.051 | 0.022 | 0.037 | — |
| (5) | f11/f1 | −0.688 | −0.997 | −0.993 | −0.823 | −0.729 | −1.028 | −0.495 | −0.575 | −1.294 | −1.304 | −0.862 | −0.520 |
| (6) | z | 4.737 | 2.500 | 2.500 | 5.000 | 2.813 | 7.059 | 4.737 | 4.737 | 10.000 | 5.000 | 3.036 | 4.737 |
| (7) | z2 | 2.470 | 1.924 | 1.827 | 2.617 | 1.686 | 2.976 | 1.982 | 2.157 | 4.025 | 2.406 | 1.964 | 2.188 |
| (8) | z2ex | 1.917 | 1.299 | 1.368 | 1.910 | 1.669 | 2.372 | 2.390 | 2.196 | 2.484 | 2.078 | 1.546 | 2.165 |
| | fw | 19 | 10 | 14 | 14 | 16 | 17 | 19 | 19 | 22 | 24 | 28 | 19 |
| | ft | 90 | 25 | 35 | 70 | 45 | 120 | 90 | 90 | 220 | 120 | 85 | 90 |
| | $\beta 2w$ | −0.472 | −0.586 | −0.543 | −0.399 | −0.573 | −0.418 | −0.375 | −0.404 | −0.426 | −0.496 | −0.562 | −0.379 |
| | $\beta 2t$ | −1.167 | −1.126 | −0.992 | −1.045 | −0.966 | −1.245 | −0.744 | −0.872 | −1.714 | −1.192 | −1.103 | −0.829 |
| | f1 | 45.000 | 22.347 | 30.993 | 42.911 | 41.061 | 53.032 | 58.011 | 48.500 | 54.000 | 46.000 | 50.349 | 50.500 |
| | f2 | −22.800 | −27.260 | −25.003 | −25.135 | −30.524 | −25.246 | −23.883 | −21.500 | −22.417 | −20.000 | −28.302 | −21.000 |
| | f3 | 85.000 | 112.943 | 55.147 | 80.344 | 75.000 | 132.740 | 103.762 | 103.831 | 142.847 | 84.418 | 94.186 | 94.697 |
| | f4 | 65.000 | 60.114 | 89.958 | 68.749 | 90.000 | 67.919 | 56.283 | 46.695 | 68.271 | 58.323 | 65.006 | 59.841 |
| | L34w | 24.429 | 11.700 | 12.519 | 16.893 | 18.794 | 40.214 | 40.650 | 34.600 | 30.204 | 22.811 | 22.566 | 39.956 |
| | L34wt | 2.025 | 0.878 | 0.873 | 2.556 | 9.167 | 4.820 | 1.994 | 5.698 | 1.538 | 0.496 | 0.828 | 1.985 |
| | f11 | −30.945 | −22.291 | −30.773 | −35.297 | −29.936 | −54.500 | −28.737 | −27.871 | −69.883 | −59.970 | −43.395 | −26.284 |
| | f12 | 80.121 | 89.858 | 144.723 | 152.245 | 84.555 | 156.294 | 102.058 | 91.679 | 164.075 | 113.820 | 110.452 | 90.263 |
| | f13 | 50.545 | 56.014 | 46.816 | 54.361 | 60.763 | 66.809 | 41.830 | 41.023 | 62.560 | 57.612 | 60.590 | 39.432 |

TABLE 2

Results of calculation of numerical values in the conditional expressions (9) to (15) for Embodiments 13 to 19

| Conditional Expression | | Numerical Embodiment | | | | | | |
|---|---|---|---|---|---|---|---|---|
| | | 13 | 14 | 15 | 16 | 17 | 18 | 19 |
| (9) | Lw/Lt | 1.8 | 1.7 | 1.7 | 1.5 | 1.3 | 4.9 | 1.6 |
| (10) | Dw/Dt | 32.5 | 23.0 | 5.7 | 5.5 | 13.3 | 20.3 | 23.1 |
| (11) | f1/f2 | −2.0 | −2.3 | −1.5 | −2.0 | −0.8 | −2.7 | −2.3 |
| (12) | fw/f1 | 0.4 | 0.5 | 0.7 | 0.4 | 0.4 | 0.4 | 0.6 |
| (13) | ft/fw | 5.3 | 5.0 | 3.0 | 4.7 | 2.5 | 10.0 | 5.0 |
| (14) | f3/f4 | 0.5 | 1.5 | 0.5 | 1.7 | 1.9 | 2.1 | 1.5 |
| (15) | (Mmax − Mw)/Mw | 7.9E−02 | 2.8E−02 | 4.2E−03 | 5.4E−02 | 2.5E−01 | 1.9E−02 | 4.5E−03 |
| | Focal length at wide angle end: fw | 17.0 | 24.0 | 28.0 | 19.0 | 10.0 | 22.0 | 26.0 |
| | Focal length at telephoto end: ft | 90.0 | 120.0 | 84.0 | 90.0 | 25.0 | 220.0 | 130.0 |
| | Zoom magnification | 5.3 | 5.0 | 3.0 | 4.7 | 2.5 | 10.0 | 5.0 |
| | f1 | 42.0 | 46.0 | 38.7 | 45.0 | 22.3 | 60.2 | 46.0 |
| | f2 | −20.9 | −20.0 | −25.8 | −22.8 | −27.3 | −22.4 | −20.0 |
| | f3 | 54.6 | 85.1 | 65.5 | 99.4 | 112.9 | 142.8 | 84.6 |
| | f4 | 110.6 | 57.8 | 139.2 | 58.9 | 60.1 | 68.1 | 57.2 |
| | Lw | 106.2 | 77.0 | 85.1 | 83.8 | 49.5 | 113.6 | 75.2 |
| | Lt | 60.1 | 45.7 | 51.0 | 55.3 | 39.0 | 23.1 | 46.0 |
| | Dw | 38.9 | 22.6 | 25.1 | 25.7 | 11.7 | 30.2 | 20.1 |
| | Dt | 1.2 | 1.0 | 4.4 | 4.7 | 0.9 | 1.5 | 0.9 |
| | Mw | 57.1 | 51.4 | 51.8 | 54.8 | 35.4 | 79.8 | 50.9 |
| | Mmax | 61.6 | 52.9 | 52.0 | 57.8 | 44.2 | 81.3 | 51.1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-206172, filed Oct. 20, 2015, and Japanese Patent Application No. 2016-067561, filed Mar. 30, 2016, which are hereby incorporated by reference herein in their entirety.

What is claimed is:

1. A zoom lens comprising in order from an object side to an image side: a first lens unit having a positive refractive power; a second lens unit; a third lens unit having a positive refractive power; a fourth lens unit having a positive refractive power; and a rear lens unit including at least one lens unit, wherein
the second lens unit includes one or more lens sub-units, and has a negative refractive power as a whole,
the first lens unit does not move for zooming, the second lens unit moves during zooming, the fourth lens unit moves during zooming,
the zoom lens includes a stop between the second lens unit and the third lens unit or between the third lens unit and the fourth lens unit, and
the zoom lens satisfies the following expressions:

$$0.50 < (ft \times \beta 2w^2)/(fw \times \beta 2t^2) < 1.40 \text{ and}$$

$$-2.45 < f1/f2 < -0.50,$$

where β2w and β2t respectively represent lateral magnifications of the second lens unit at a wide angle end and a telephoto end when a light beam enters from infinity, fw and ft respectively represent focal lengths of the zoom lens at the wide angle end and the telephoto end, f1 represents a focal length of the first lens unit, and f2 represents a focal length of the second lens unit at the wide angle end.

2. A zoom lens according to claim 1, wherein the stop is configured not to move in an optical axis direction for zooming.

3. A zoom lens according to claim 1, wherein the third lens unit and the fourth lens unit are configured to move during zooming, and satisfy the following expression:

$$0.40 < f3/f4 < 2.50,$$

where f3 and f4 respectively represent focal lengths of the third lens unit and the fourth lens unit.

4. A zoom lens according to claim 3, wherein the following expression is satisfied:

$$0.01 < L34t/L34w < 0.60,$$

where L34w and L34t respectively represent intervals between the third lens unit and the fourth lens unit at the wide angle end and the telephoto end.

5. A zoom lens according to claim 1, wherein the rear lens unit is configured not to move for zooming.

6. A zoom lens according to claim 1, wherein the first lens unit comprises in order from the object side to the image side: a first lens sub-unit having a negative refractive power, which is configured not to move for focusing; a second lens sub-unit having a positive refractive power, which is configured to move during focusing; and a third lens sub-unit having a positive refractive power, and satisfies the following expression:

$$-1.5 < f11/f1 < -0.4,$$

where f11 represents a focal length of the first lens sub-unit.

7. A zoom lens according to claim 1, wherein the rear lens unit comprises three or more lenses.

8. A zoom lens according to claim 1, wherein the second lens unit comprises two or more lens sub-units that move along mutually different loci during zooming.

9. A zoom lens comprising in order from an object side to an image side: a first lens unit having a positive refractive power that does not move for zooming; a second lens unit having a negative refractive power that moves during zooming; a third lens unit having a positive refractive power that moves during zooming; a fourth lens unit having a positive refractive power that moves during zooming; and a fifth lens unit, in which an interval between each pair of all of the first lens unit, the second lens unit, the third lens unit, the fourth lens unit, and the fifth lens unit is changed during zooming, wherein the third lens unit moves during zooming along a locus having a zoom position at which a distance between a surface closest to the image side of the first lens unit and a surface closest to the object side of the third lens unit on an optical axis is longer than that at a wide angle end, and the zoom lens satisfies the following conditions:

$$1.0 < Lw/Lt < 10.0,$$

$$1.0 < Dw/Dt < 100.0, \text{ and}$$

$$-5.0 < f1/f2 < -0.5,$$

where Lw and Lt respectively represent distances between the surface closest to the image side of the first lens unit and a surface closest to the object side of the fourth lens unit on the optical axis at the wide angle end and a telephoto end, Dw and Dt respectively represent distances between a surface closest to the image side of the third lens unit and the surface closest to the object side of the fourth lens unit on the optical axis at the wide angle end and the telephoto end, and f1 and f2 respectively represent focal lengths of the first lens unit and the second lens unit.

10. A zoom lens according to claim 9, wherein the following conditions are satisfied:

$$0.1 < fw/f1 < 1.5 \text{ and}$$

$$2.0 < ft/fw < 30.0,$$

where fw and ft respectively represent focal lengths of the zoom lens at the wide angle end and the telephoto end.

11. A zoom lens according to claim 9, wherein the following condition is satisfied:

$$0.1 < f3/f4 < 5.0,$$

where f3 represents a focal length of the third lens unit, and f4 represents a focal length of the fourth lens unit.

12. A zoom lens according to claim 9, wherein the following condition is satisfied:

$$0.0 < (M\text{max} - Mw)/Mw < 1.0,$$

where Mw and Mmax respectively represent ones of a first distance between the surface closest to the image side of the first lens unit and the surface closest to the object side of the third lens unit on the optical axis at the wide angle end and a zoom position at which the first distance is longest.

13. A zoom lens according to claim 9, further comprising an aperture stop arranged between the second lens unit and the third lens unit or between the third lens unit and the fourth lens unit.

14. A zoom lens according to claim 13, wherein the aperture stop does not move for zooming.

15. A zoom lens according to claim 9, wherein the third lens unit is composed of one lens.

16. A zoom lens according to claim 9, wherein the fourth lens unit is composed of one lens having a positive refractive power and one lens having a negative refractive power.

17. A zoom lens according to claim 9, wherein the fifth lens unit does not move for zooming.

18. An image pickup apparatus comprising:
a zoom lens; and
an image pickup element that receives light of an image formed by the zoom lens,
the zoom lens comprising in order from an object side to an image side: a first lens unit having a positive refractive power; a second lens unit; a third lens unit having a positive refractive power; a fourth lens unit having a positive refractive power; and a rear lens unit including at least one lens unit, wherein
the second lens unit includes one or more lens sub-units, and has a negative refractive power as a whole,
the first lens unit does not move for zooming, the second lens unit moves during zooming, the fourth lens unit moves during zooming,
the zoom lens includes a stop between the second lens unit and the third lens unit or between the third lens unit and the fourth lens unit, and
the zoom lens satisfies the following expressions:

$$0.50 < (ft \times \beta 2w^2)/(fw \times \beta 2t^2) < 1.40 \text{ and}$$

$$-2.45 < f1/f2 < -0.50,$$

where $\beta 2w$ and $\beta 2t$ respectively represent lateral magnifications of the second lens unit at a wide angle end and a telephoto end when a light beam enters from infinity, fw and ft respectively represent focal lengths of the zoom lens at the wide angle end and the telephoto end, f1 represents a focal length of the first lens unit, and f2 represents a focal length of the second lens unit at the wide angle end.

19. An image pickup apparatus comprising:
a zoom lens; and
an image pickup element that receives light of an image formed by the zoom lens,
the zoom lens comprising in order from an object side to an image side: a first lens unit having a positive refractive power that does not move for zooming; a second lens unit having a negative refractive power that moves during zooming; a third lens unit having a positive refractive power that moves during zooming; a fourth lens unit having a positive refractive power that moves during zooming; and a fifth lens unit, in which an interval between each pair of all of the first lens unit, the second lens unit, the third lens unit, the fourth lens unit, and the fifth lens unit is changed during zooming, wherein
the third lens unit moves during zooming along a locus having a zoom position at which a distance between a surface closest to the image side of the first lens unit and a surface closest to the object side of the third lens unit on an optical axis is longer than that at a wide angle end, and
the zoom lens satisfies the following conditions:

$$1.0 < Lw/Lt < 10.0,$$

$$1.0 < Dw/Dt < 100.0, \text{ and}$$

$$-5.0 < f1/f2 < -0.5,$$

where Lw and Lt respectively represent distances between the surface closest to the image side of the first lens unit and a surface closest to the object side of the fourth lens unit on the optical axis at the wide angle end and a telephoto end, Dw and Dt respectively represent distances between a surface closest to the image side of the third lens unit and the surface closest to the object side of the fourth lens unit on the optical axis at the wide angle end and the telephoto end, and f1 and f2 respectively represent focal lengths of the first lens unit and the second lens unit.

\* \* \* \* \*